US012783279B2

(12) United States Patent
Devarakonda et al.

(10) Patent No.: US 12,783,279 B2
(45) Date of Patent: Nov. 3, 2026

(54) METHODS AND SYSTEMS THAT MANAGE CLOUD-COMPUTING INFRASTRUCTURE BY IDEMPOTENT APPLICATION OF DATA SPECIFICATIONS AND ENFORCED-STATE MANAGEMENT

(71) Applicant: VMware LLC, Palo Alto, CA (US)

(72) Inventors: Kalyan Devarakonda, Bangalore (IN); Praneeth Bobba, Hyderabad (IN); Prasanna Ganapathi, Bangalore (IN); Murali Sampangiramiaiah, Bangalore (IN)

(73) Assignee: VMware LLC, Palo Alto, CA (US)

( * ) Notice: Subject to any disclaimer, the term of this patent is extended or adjusted under 35 U.S.C. 154(b) by 377 days.

(21) Appl. No.: 18/379,689

(22) Filed: Oct. 13, 2023

(65) Prior Publication Data

US 2025/0060984 A1 Feb. 20, 2025

(30) Foreign Application Priority Data

Aug. 18, 2023 (IN) ............................. 202341055469

(51) Int. Cl.
*G06F 9/45* (2006.01)
*G06F 9/455* (2018.01)

(52) U.S. Cl.
CPC .. *G06F 9/45558* (2013.01); *G06F 2009/4557* (2013.01); *G06F 2009/45583* (2013.01)

(58) Field of Classification Search
CPC ......... G06F 9/45558; G06F 2009/4557; G06F 2009/45583
See application file for complete search history.

(56) References Cited

U.S. PATENT DOCUMENTS 11,218,511 B1 * 1/2022 Pugalia ................. H04L 63/102
2024/0420052 A1 * 12/2024 Mickey ............ G06Q 10/06316

FOREIGN PATENT DOCUMENTS

WO 2021150307 A1 7/2021

OTHER PUBLICATIONS

European Patent Office, Extended Search Report, Application No. 24191413.4, Jan. 27, 2025, 12 pages.

* cited by examiner

*Primary Examiner* — Craig C Dorais
(74) *Attorney, Agent, or Firm* — Quarles & Brady LLP

(57) ABSTRACT

The current document is directed to an infrastructure-as-code ("IaC") cloud-infrastructure-management service or system that allows users and upstream management systems to define and deploy infrastructure, such as virtual networks, virtual machines, load balancers, and connection topologies, within cloud-computing systems. The IaC cloud-infrastructure-management service or system includes a service frontend, a task manager, an event-processing component, and multiple Idem-service workers. The task manager manages execution of commands and requests received from the service frontend, using multiple queues, provides for prioritization of command-and-request execution by the multiple Idem-service workers, and provides for preemption of long-running executing commands and requests. The IaC cloud-infrastructure-management service or system enforces specified states of the cloud infrastructure using enforced-state identifiers and enforced-state versions supplied in state commands and enforce requests.

21 Claims, 58 Drawing Sheets

```
enum BoxType {                                  1302
    CARDBOARD
    METAL
    SOFT_PLASTIC
    RIGID_PLASTIC
}

enum ProductType {                              1304
    PENCIL_SET
    ERASER_SET
    INK_SET
    PEN_SET
    INDIVIDUAL_PENCIL
    INDIVIDUAL_ERASER
    INDIVIDUAL_INK
    INDIVIDUAL_PEN
}

enum SubjectType {                              1306
    PERSON
    BUILDING
    ANIMAL
    UNKNOWN
}

interface Labeled {                             1308
1309    id: ID!
    name: String
}

union Item = Box | Product                      1312

type Box implements Labeled {  1315             1314
1316 {  id: ID!
        name: String
    length:Float          1317
    height:Float          1318
    width:Float           1319
    weight: Float         1320
    boxType: BoxType!     1321
    contents: [Item!]     1322
    numItems: Int         1323
}
```

FIG. 13A

```
type Product implements Labeled {
    id: ID!
    name: String                          1326
    pType: ProductType!  —— 1327
}

scalar ImageURL @specifiedBy (url:"httpe://images.org/hyml/ref ') —— 1328

type Photo {
    name: String!
    imageSize: Int
    subject: SubjectType                  1330
    url: ImageURL!
}

type Query {                          1334
    getBox(id: ID!): Box
    getBoxes: [Box!]  —— 1335             1332
    getPhoto(name: String): Photo
}                                        1336

type Mutation {
    addProduct(boxId: ID, pType: ProductType!): Product —— 1338
}

type Subscription {
    getBoxUpdates(id: [ID!]): [Box!] —— 1340
}

fragment boxFields on Box {
    name                                  1342
}

fragment productFields on Product {
    pType                                 1344
}
```

FIG. 13B

```
query getBox {
     getBox(id:"A31002") {
          id
          name
          weight
          boxType
     }
}
```

1404

1402

```
{
     "data": {
          "getBox {
               "id": ""A31002",
               "name": "Shipment to John Stevens",
               "weight": 16.23,
               "boxType" : "CARDBOARD"
          }
     }
}
```

1406

FIG. 14A

```
query getBoxes {
    getBoxes {
        id
        name
        contents {
            ...boxFields
            ...productFields
        }
    }
}
```

1408 1410 1412

```
{
    "data" : {
        "getBoxes" : [
            {
                "id" : "S2130",
                "name" : "Shipment to Mary Johnson",
                "contents" :
                    {
                        "name" : "Sub-shipment 1",
                    }
                    {
                        "pType" : "PENCIL_SET"
                    },
                    {
                        "pType" : "ERASERSET"
                    }
                ]
            },
            ⋮
            {
                "id" : "G7133",
                "name" : "Shipment to Zelda Zabinovich",
                "contents" : [
                    {
                        "pType" : " INK_SET "
                    }
                ]
            }
        ]
    }
}
```

1414 1415 1416 1417 1418 1419 1422 1424 1425 1426

FIG. 14B

```
mutation {
    addProduct(boxId:"12345", pType: INK_SET) {
        id
        pType
        name
}
```

1430

```
{
    "data": {
        " addProduct":{
            "id": "12345", .
            "pType": INK_SET,
            "name": "Shipment to Jean Buffet"
        }
    }
}
```

1432

FIG. 14C

```
subscription {
    getBoxUpdates (["F3266", "H89000"]) {
        name
        id
        boxType
        numItems
    }
}
```

1434

```
{
    "data" : {
        "getBoxeUpdates" : [
            {
                "name" : "Shipment to Dawn Blaine",
                "id" : "F3266",
                "boxType : "SOFT PLASTIC ",
                "numItems" : 4
            },
            {
                "name" : "Shipment to Jerry Feldman",
                "id" : "H89000",
                "boxType : "METAL",
                "numItems" : 12
            }
        ]
    }
}
```

1436

FIG. 14D

```
type Price {
    dollars: Int
    cents: Int
}                                   1440

extend type Box {
    price: Price!
}                                   1442

extend type Query {
    getFee(length: Float!, height: Float!, width: Float, weight: Float): Price!   1444
}
```

FIG. 14E

```
---                                                          1602
# Mapping a scalar to a scalar                               1604
x: 35                                                        1605
chairman: Bill Johnson                                       1606

# Scalars
n1 : 1234         # n1 is mapped to an integer 1234          1608
n2 : 0x4d2        # n2 is mapped to the integer 1234         1609
n3 : 02322        # n3 is mapped to the integer 1234         1610
n4 : 1.234e+03    # n4 is mapped to the floating-point number 1234.0   1611
n5 : Yes          # n5 is mapped to Boolean value 1 or true  1612
n6 : No           # n6 is mapped to Boolean value 0 or false 1613
n7 : true         # n7 is mapped to Boolean value 1 or true  1614
n8 : false        # n8 is mapped to Boolean value 0 or false 1615
n9 : On           # n9 is mapped to Boolean value 1 or true     } 1616
n10 : Off         # n10 is mapped to Boolean value 0 or false   }
n11: .inf         # n11 is mapped to the value infinity      1617
n12: .NaN         # n12 is mapped to the value "not a number"   1618
                                                  (n1–n12: 1607)

text_stuff : |
  this text preserves the newline characters      } 1619
  as they are written
# text_stuff contains the string "this text preserves the newline characters\n as they are written"

f_text_stuff : >
  this text folds the two lines                   } 1620
  to produce a single line of text
# f_text_stuff contains the string "this text folds the two lines to produce a single line of text"

ne_text_stuff_1 : the cost is 2
# ne_text_stuff_1 contains the string "the cost is 2"

ne_text_stuff_2 : the cost is 2\n
# ne_text_stuff_2 contains the string "the cost is 2\n"             } 1621

ne_text_stuff_3 : "the cost is 2\n"
# ne_text_stuff_3 contains the string "the cost is 2" with a terminal newline character

# explicit data types

string_value: !!str 17
# string_value contains the string "17"
                                                  } 1622
int_value: !!int 17
# int_value contains the integer 17
```

FIG. 16A

```
# sequences

  # sequence of animals

  - frog
  - squirrel
  - fish
  - bear

  #sequence of vehicles

  [ automobile, train, airplane, steamship ]

# mapping scalars to lists

animals:
  - frog
  - squirrel
  - fish
  - bear

# mapping scalars to lists of blocks

members:
- name: Jerry Winkle
  address: |
     3361 Cherry Lane
     Pottersville, Iowa  50666
  age: 47
  phone: (319) 476-7705
- name: Linda Evers
  address: |
     921 Fairlow Street
     Rabbitsfoot, Iowa  50465
  age: 54
  phone: (319) 521-9087
- name: Brenda Nix
  address: |
     1101 Hamplebuckle Road
     Pottersville, Iowa  50666
  age: 61
  phone: (319) 476-1144

# mapping scalars to lists of blocks with anchor

chapter: &chapter
  chapter: Pottersville
  region: central

members:
```

1623 1624 1625 1626 1627 1628 1629 1630 1631 1632 1633 1634 1636

FIG. 16B

```
- name: Jerry Winkle
  address: |
     3361 Cherry Lane
     Pottersville, Iowa  50666
  age: 47
  phone: (319) 476-7705
  <<: *chapter
- name: Linda Evers
  address: |
     921 Fairlow Street
     Rabbitsfoot, Iowa  50465
  age: 54
  phone: (319) 521-9087
  <<: *chapter
- name: Brenda Nix
  address: |
     1101 Hamplebuckle Road
     Pottersville, Iowa  50666
  age: 61
  phone: (319) 476-1144
  <<: *chapter
```

1637 1638 1639 1635

```
# the above mapping of "members" to the list of blocks if equivalent to the following
# mapping

members:
- name: Jerry Winkle
  address: |
     3361 Cherry Lane
     Pottersville, Iowa  50666
  age: 47
  phone: (319) 476-7705
  chapter: Pottersville
  region: central
- name: Linda Evers
  address: |
     921 Fairlow Street
     Rabbitsfoot, Iowa  50465
  age: 54
  phone: (319) 521-9087
  chapter: Pottersville
  region: central
- name: Brenda Nix
  address: |
     1101 Hamplebuckle Road
     Pottersville, Iowa  50666
  age: 61
  phone: (319) 476-1144
  chapter: Pottersville
  region: central
```

1640

FIG. 16C

```
# complex mapping
? [ small, medium, large ] : [ 0, 1, 2 ]      1641
# map sequence
{ small: 0, medium: 1, large: 2 }      1642
...
1603
```

FIG. 16D

Idem State File: 1808

```
vpc-idem-test:                                  1810
  aws.ec2.vpc.present:
    - cidr_block_association_set:
        - CidrBlock: '172.32.0.0/16'            1812
    - instance_tenancy: 'default'                        1804
    - tags:
        Name: 'vpc-idem-demo'                   1814
        Environment: 'Development'
subnet-idem-test:
  aws.ec2.subnet.present:
    - cidr_block: '172.32.16.0/20'
    - vpc_id: ${aws.ec2.vpc:vpc-idem-test:resource_id}
    - availability_zone: us-west-2b
    - tags:
        Name: 'subnet-idem-demo'                                          1806
        Description: 'Subnet created for VPC ${aws.ec2.vpc:vpc-idem-test:name}.
                  VPC CIDR ${aws.ec2.vpc:vpc-idem-
test:cidr_block_association_set[0]:CidrBlock}
                  association ID is ${aws.ec2.vpc:vpc-idem-
test:cidr_block_association_set[0]:CidrBlock}'
                                                                                 1802
test_ami:
  exec.run:
    - path: aws.ec2.ami.get
    - kwargs:
        name: test_ami
        most_recent: true
        owners:
          - amazon
        filters:
            - name: 'description'
              values: ["{{ params['ami_desc'] }}"]
            - name: 'architecture'
              values: ["x86_64"]

instance-idem-test:
  aws.ec2.instance.present:
    - image_id: ${exec:test_ami:resource_id}
    - instance_type: 't1.micro'
    - subnet_id: ${aws.ec2.subnet:subnet-idem-test:resource_id}
    - tags:
        Name: 'instance-idem-demo'
```

Credential File:

```
environment_1:
    default_profile:
        key_1: value_1      1820
        key_2: value_2
                :                    1816
    profile_2:
        key_1: value_1      1822
        key_2: value_2
```

FIG. 18A

```
                 :  }1822  ┐
        :                  │
environment_2:             │
  default_profile:         │
    key_1: value_1         ├1818
    key_2: value_2         │
                 :         │
  profile_2:               │
    key_1: value_1         │
    key_2: value_2         ┘
                 :
        :
```

<u>Idem Describe Command:</u> idem describe aws.ec2.instance

```
i-0f2e6b9b642beaf91:
 aws.ec2.instance.present:
 - name: i-0f2e6b9b642beaf91
 - resource_id: i-0f2e6b9b642beaf91
 - image_id: ami-094125af156557ca2
 - instance_type: t1.micro
 - volume_attachments:
     /dev/xvda: vol-03724e0febe4632e7
 - block_device_mappings:
   - DeviceName: /dev/xvda
     Ebs:
       DeleteOnTermination: true
       Encrypted: false
       Iops: 100
       SnapshotId: snap-078839db345bfeece
       VolumeSize: 8                          } 1824
       VolumeType: gp2
 - ebs_optimized: false
 - subnet_id: subnet-0120b61d6c1313e1f
 - network_interfaces:
   - AssociatePublicIpAddress: false
     DeleteOnTermination: true
     Description: ''
     DeviceIndex: 0
     Groups:
     - sg-43d8c830
     InterfaceType: interface
     Ipv6Addresses: [ ]
     NetworkCardIndex: 0
     PrivateIpAddresses:
     - Primary: true
       PrivateIpAddress: 172.31.17.39
```

FIG. 18B

```
    SubnetId: subnet-0120b61d6c1313e1f
  - monitoring_enabled: false
  - root_device_name: /dev/xvda
  - client_token: eef2732c-95cf-4f05-abdd-2ff04fb4e802
  - product_codes: [ ]
  - source_dest_check: true
  - running: true
  - private_ip_address: 172.31.17.39
  - reservation_id: r-0282215c32f0d943e
  - owner_id: '840258433862'
  - availability_zone: us-west-2c
  - group_name: ''
  - tenancy: default
  - disable_api_termination: false
  - tags:
      Name: instance-idem-1
      Salutation: Hello World
  - iam_profile_arn: { }                                    } 1826
  - instance_initiated_shutdown_behavior: stop
  - auto_recovery_enabled: true
  - sriov_net_support: simple
  - nitro_enclave_enabled: false
  - license_arns: [ ]
  - hibernation_enabled: false
  - valid_until: ''
  - http_tokens: optional
  - http_put_response_hop_limit: 1
  - http_endpoint_enabled: true
  - http_protocol_ipv6_enabled: false
  - metadata_tags_enabled: false
  - hostname_type: ip-name
  - enable_resource_name_dns_a_record: false
  - enable_resource_name_dns_aaaa_record: false
  - capacity_reservation_preference: open
  - bootstrap: [ ]
```

Argument Binding:

```
State_A:
  cloud.instance.present:
    - name: "Instance A"
    - state_B_id: "${cloud:State_B:ID}"          } 1828
 State_B:
  cloud.instance.present:   1830
    - name: "Instance B"
```

FIG. 18C

METHODS AND SYSTEMS THAT MANAGE CLOUD-COMPUTING INFRASTRUCTURE BY IDEMPOTENT APPLICATION OF DATA SPECIFICATIONS AND ENFORCED-STATE MANAGEMENT

RELATED APPLICATIONS

Benefit is claimed under 35 U.S.C. 119 (a)-(d) to Foreign application No. 202341055469 filed in India entitled "METHODS AND SYSTEMS THAT MANAGE CLOUD-COMPUTING INFRASTRUCTURE BY IDEMPOTENT APPLICATION OF DATA SPECIFICATIONS AND ENFORCED-STATE MANAGEMENT", on Aug. 18, 2023, by VMware, Inc., which is herein incorporated in its entirety by reference for all purposes.

TECHNICAL FIELD

The current document is directed to distributed-computer-systems and, in particular, to an infrastructure-as-code ("IaC") cloud-infrastructure-management service or system that allows users and upstream applications to define and deploy cloud-based infrastructure, such as virtual networks, virtual machines, load balancers, and connection topologies.

BACKGROUND

During the past seven decades, electronic computing has evolved from primitive, vacuum-tube-based computer systems, initially developed during the 1940s, to modern electronic computing systems, including distributed cloud-computing systems, in which large numbers of multiprocessor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. The advent of distributed computer systems has provided a computational platform for increasingly complex distributed applications, including distributed service-oriented applications. Distributed applications, including distributed service-oriented applications and distributed microservices-based applications, provide many advantages, including efficient scaling to respond to changes in workload, efficient functionality compartmentalization that, in turn, provides development and management efficiencies, flexible response to system component failures, straightforward incorporation of existing functionalities, and straightforward expansion of functionalities and interfaces with minimal interdependencies between different types of distributed-application instances. As new distributed-computing technologies are developed, and as general hardware and software technologies continue to advance, the current trend towards ever-larger and more complex distributed computing systems appears likely to continue well into the future.

As the complexity of distributed computing systems has increased, the management and administration of distributed computing systems and applications have, in turn, become increasingly complex, involving greater computational overheads and significant inefficiencies and deficiencies. In fact, many desired management-and-administration functionalities are becoming sufficiently complex to render traditional approaches to the design and implementation of automated and semi-automated management and administration subsystems impractical, from a time and cost standpoint. Therefore, designers and developers of distributed computer systems and applications continue to seek new approaches to implementing automated and semi-automated management-and-administration facilities and functionalities.

SUMMARY

The current document is directed to an infrastructure-as-code ("IaC") cloud-infrastructure-management service or system that allows users and upstream management systems to define and deploy infrastructure, such as virtual networks, virtual machines, load balancers, and connection topologies, within cloud-computing systems. The IaC cloud-infrastructure-management service or system includes a service frontend, a task manager, an event-processing component, and multiple Idem-service workers. The task manager manages execution of commands and requests received from the service frontend, using multiple queues, provides for prioritization of command-and-request execution by the multiple Idem-service workers, and provides for preemption of long-running executing commands and requests. The IaC cloud-infrastructure-management service or system enforces specified states of the cloud infrastructure using enforced-state identifiers and enforced-state versions supplied in state commands and enforce requests.

BRIEF DESCRIPTION OF THE DRAWINGS

FIGS. 13A-14E illustrate an example schema, an extension to that example schema, and queries, a mutation, and a subscription to illustrate the GraphQL data query language.

FIGS. 16A-D illustrate the YAML Ain't Markup Language ("YAML") data serialization language.

FIGS. 18A-C illustrate a structured labor state ("SLS") data file and credential file as well as the output from an Idem describe command.

DETAILED DESCRIPTION

Figure 1:
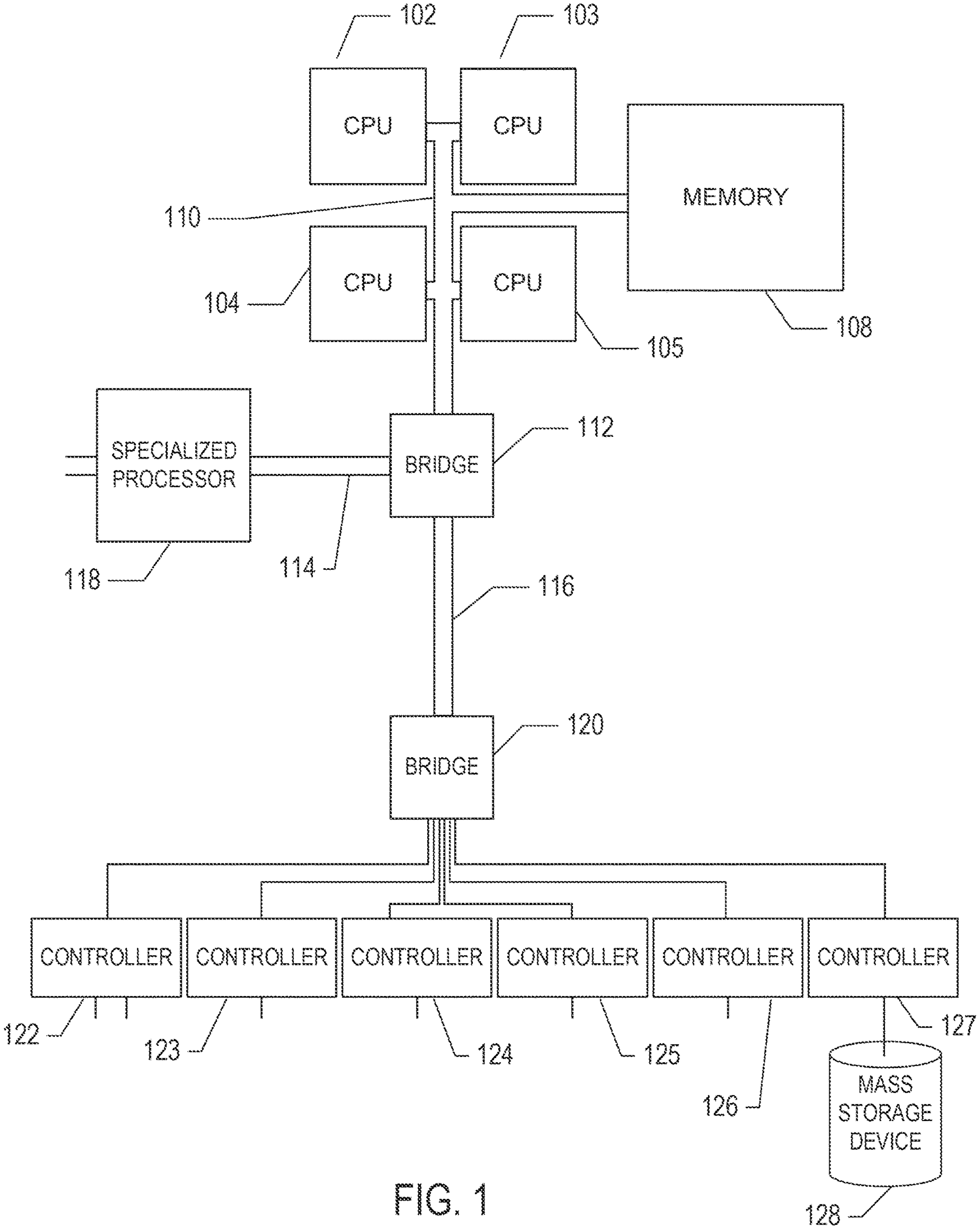
FIG. 1 provides a general architectural diagram for various types of computers.

The current application is directed to an IaC cloud-infrastructure-management service or system. In a first subsection, below, a detailed description of computer hardware, complex computational systems, and virtualization is provided with reference to FIGS. 1-7. In a second subsection, an overview of IaC cloud-infrastructure management is provided, with reference to FIGS. 8-11. A third subsection provides an overview of the GraphQL API interface with reference to FIGS. 12-15. A fourth subsection provides an overview of YAML, JINJA, and SLS documents with reference to FIGS. 16-18C. Finally, in a fifth subsection, the currently disclosed methods and systems are discussed with reference to FIGS. 19-25F.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device. Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These busses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
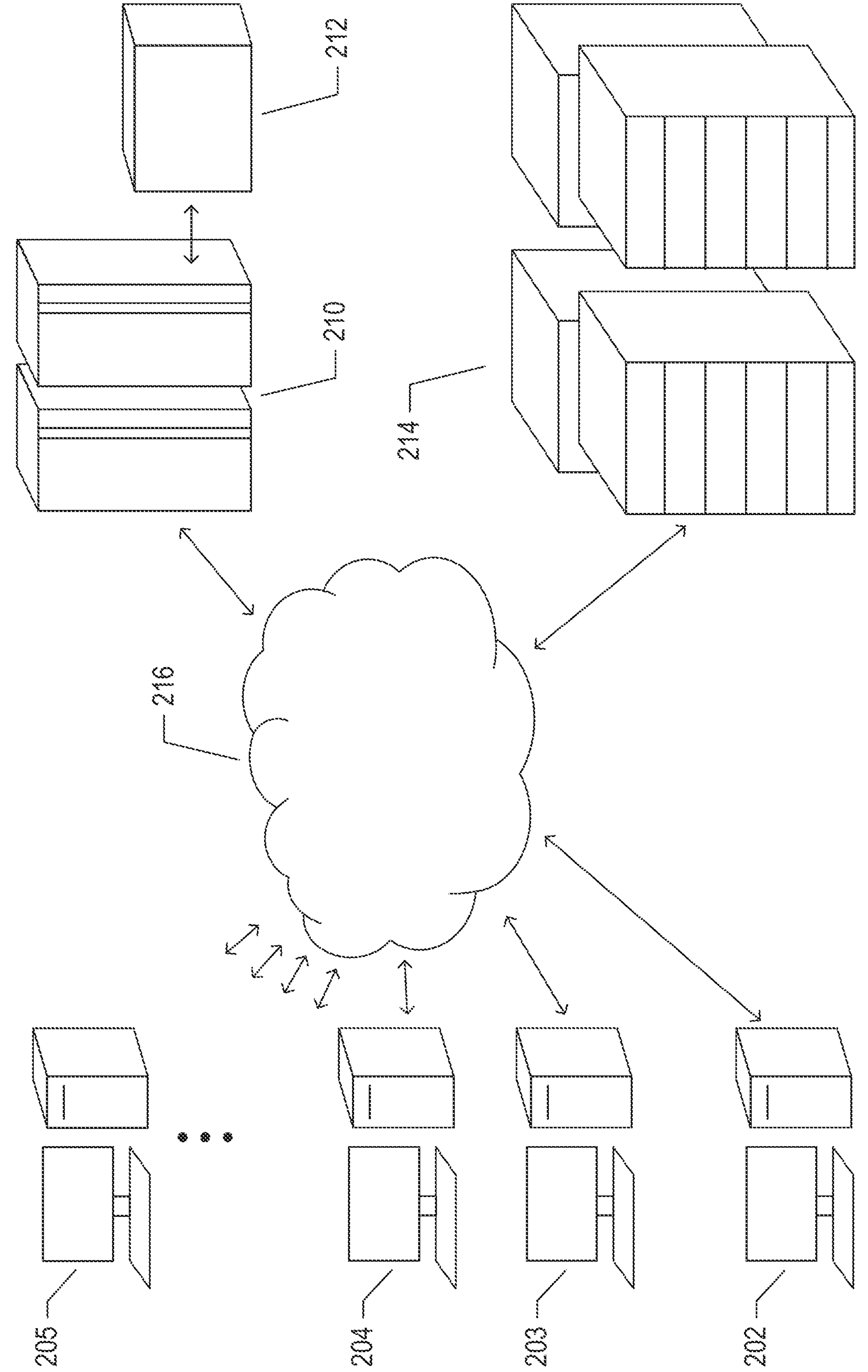
FIG. 2 illustrates an Internet-connected distributed computing system.

FIG. 2 illustrates an Internet-connected distributed computing system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
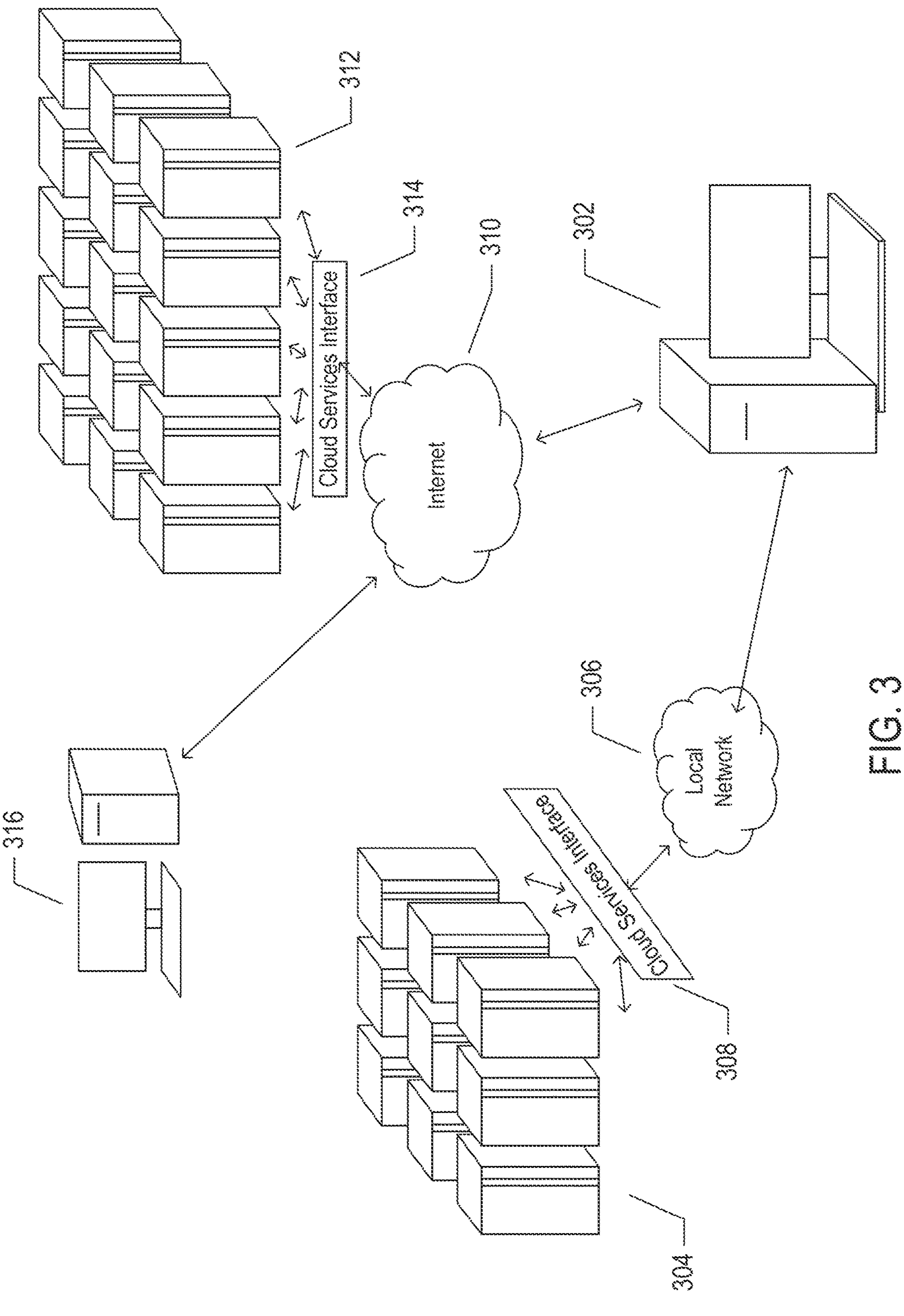
FIG. 3 illustrates cloud computing.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
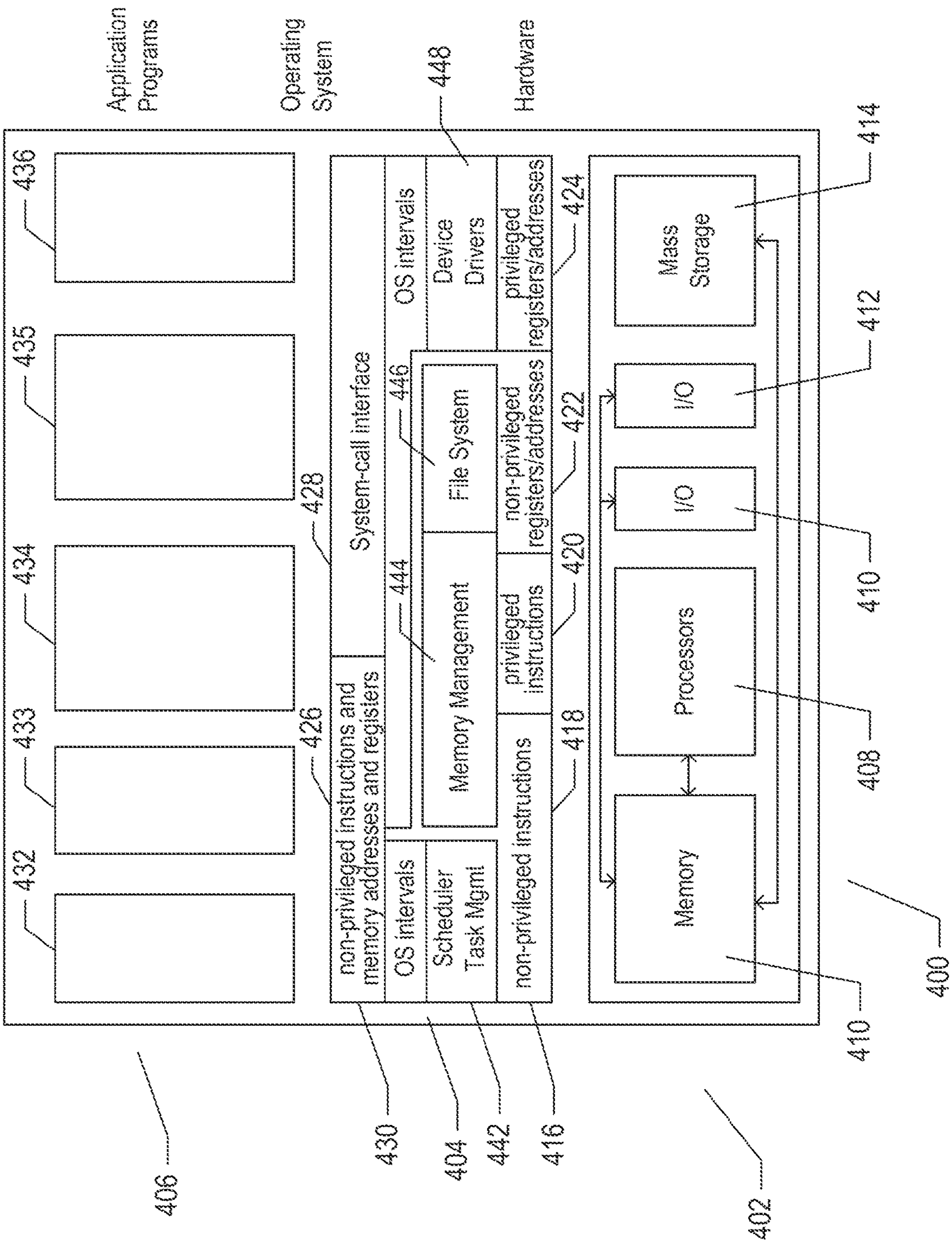
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computing system for high-availability, fault-tolerance, and load-balancing purposes. The problems are even greater in heterogeneous distributed computing systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
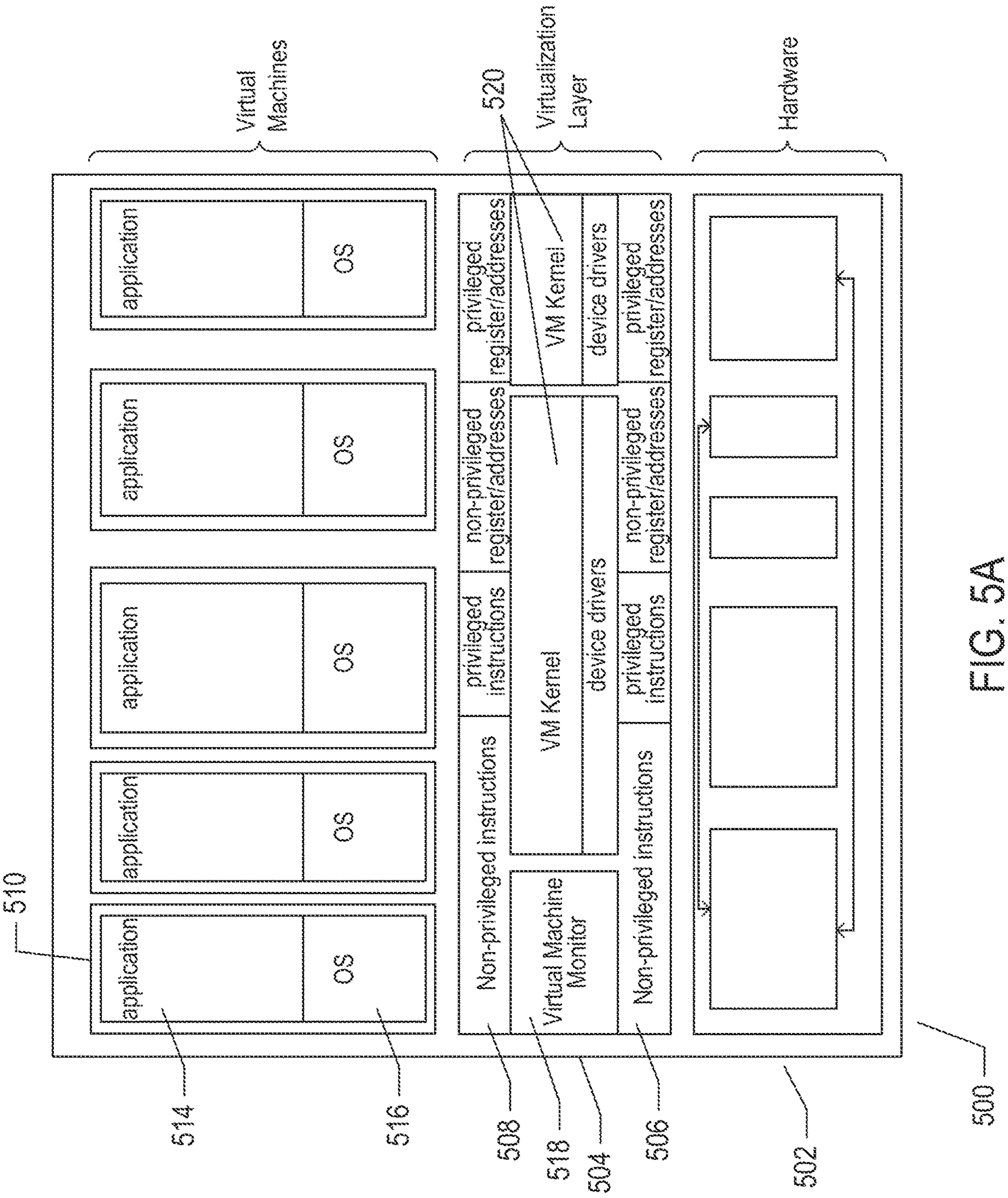
FIGS. 5A-D illustrate two types of virtual machine and virtual-machine execution environments.
Figure 5B:
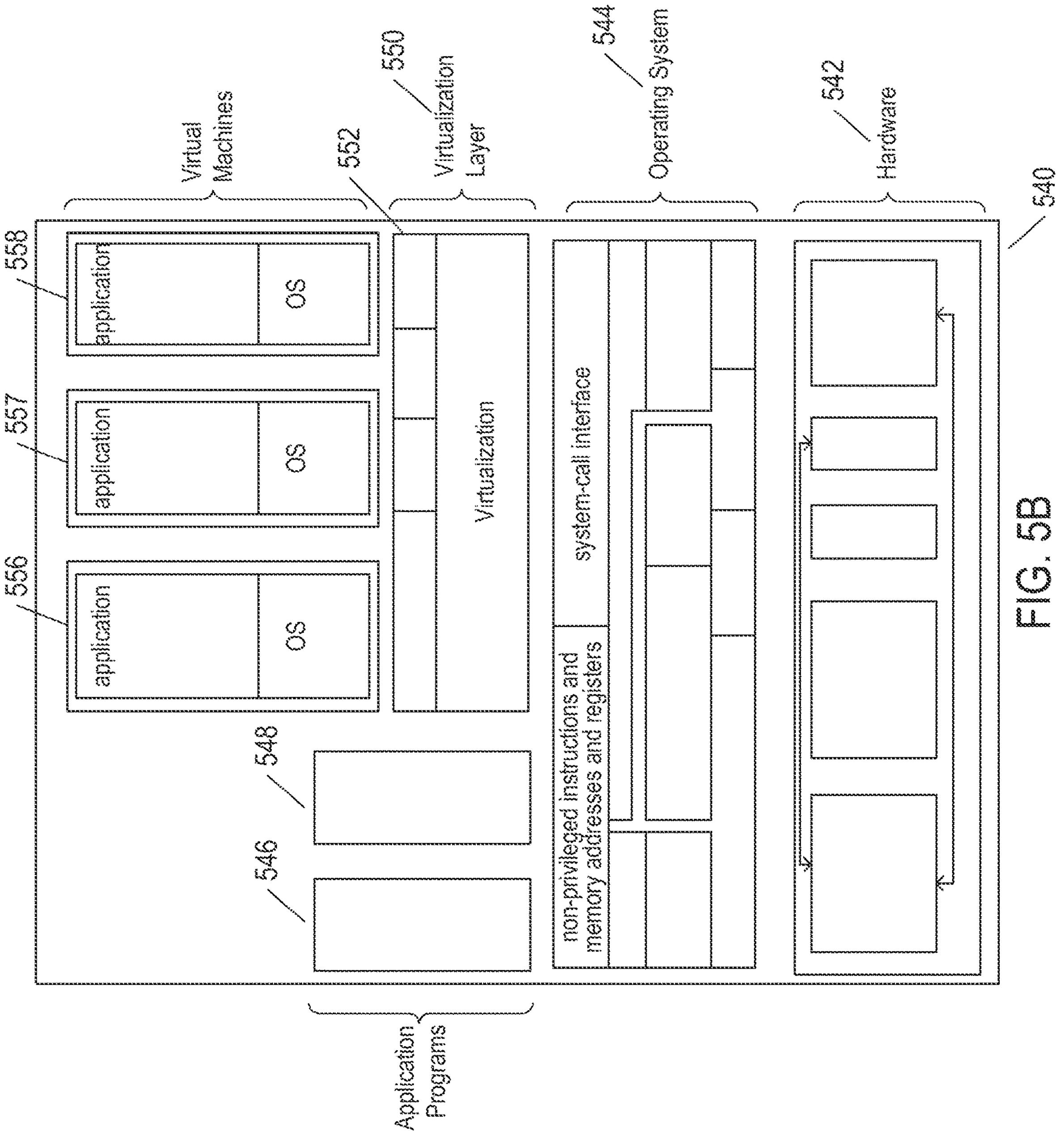

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-D illustrate several types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

Figure 5C:
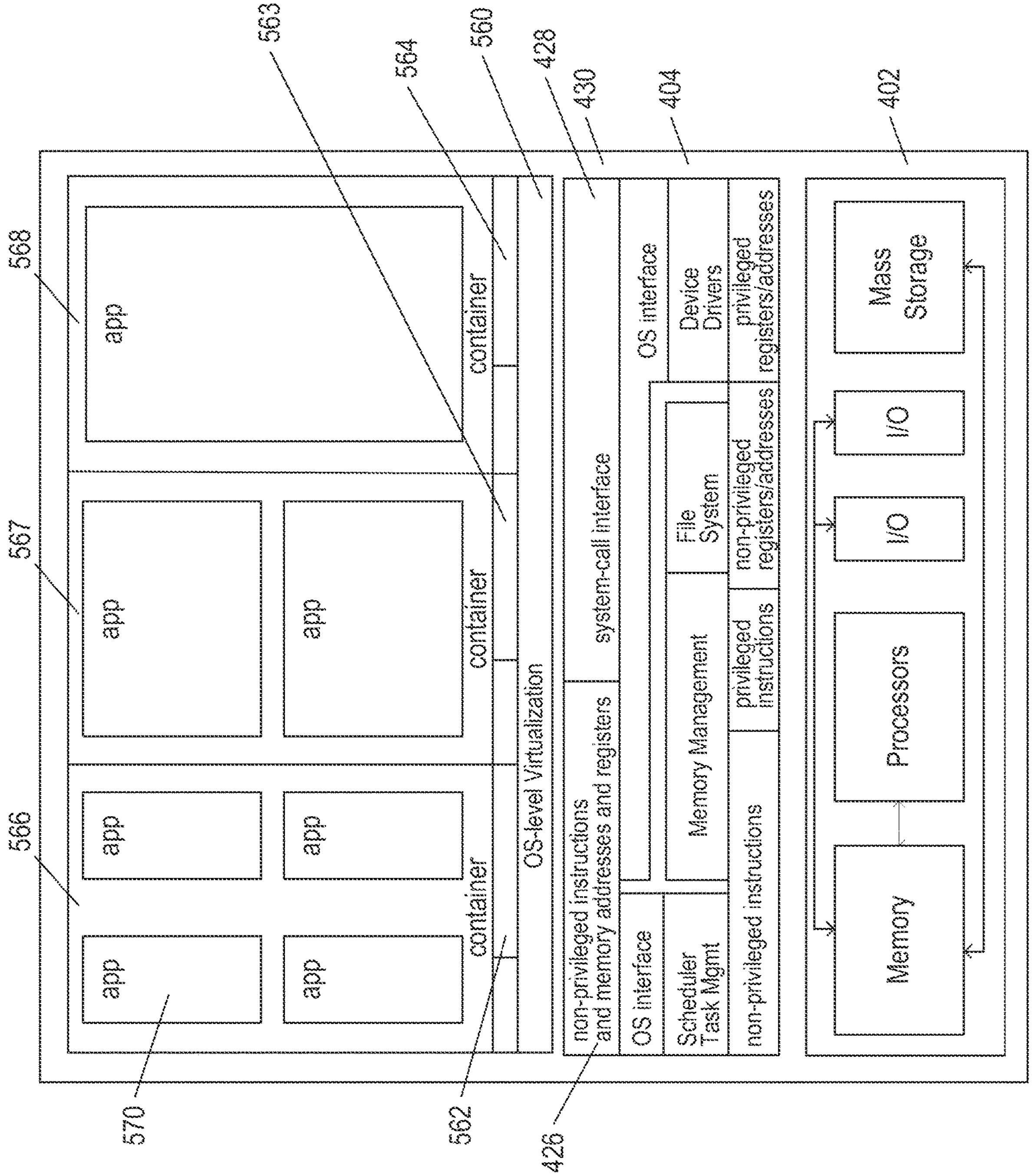

While the traditional virtual-machine-based virtualization layers, described with reference to FIGS. 5A-B, have enjoyed widespread adoption and use in a variety of different environments, from personal computers to enormous, distributed computing systems, traditional virtualization technologies are associated with computational overheads. While these computational overheads have been steadily decreased, over the years, and often represent ten percent or less of the total computational bandwidth consumed by an application running in a virtualized environment, traditional virtualization technologies nonetheless involve computational costs in return for the power and flexibility that they provide. Another approach to virtualization is referred to as operating-system-level virtualization ("OSL virtualization"). FIG. 5C illustrates the OSL-virtualization approach. In FIG. 5C, as in previously discussed FIG. 4, an operating system 404 runs above the hardware 402 of a host computer. The operating system provides an interface for higher-level computational entities, the interface including a system-call interface 428 and exposure to the non-privileged instructions and memory addresses and registers 426 of the hardware layer 402. However, unlike in FIG. 5A, rather than applications running directly above the operating system, OSL virtualization involves an OS-level virtualization layer 560 that provides an operating-system interface 562-564 to each of one or more containers 566-568. The containers, in turn, provide an execution environment for one or more applications, such as application 570 running within the execution environment provided by container 566. The container can be thought of as a partition of the resources generally available to higher-level computational entities through the operating system interface 430. While a traditional virtualization layer can simulate the hardware interface expected by any of many different operating systems, OSL virtualization essentially provides a secure partition of the execution environment provided by a particular operating system. As one example, OSL virtualization provides a file system to each container, but the file system provided to the container is essentially a view of a partition of the general file system provided by the underlying operating system. In essence, OSL virtualization uses operating-system features, such as namespace support, to isolate each container from the remaining containers so that the applications executing within the execution environment provided by a container are isolated from applications executing within the execution environments provided by all other containers. As a result, a container can be booted up much faster than a virtual machine, since the container uses operating-system-kernel features that are already available within the host computer. Furthermore, the containers share computational bandwidth, memory, network bandwidth, and other computational resources provided by the operating system, without resource overhead allocated to virtual machines and virtualization layers. Again, however, OSL virtualization does not provide many desirable features of traditional virtualization. As mentioned above, OSL virtualization does not provide a way to run different types of operating systems for different groups of containers within the same host system, nor does OSL-virtualization provide for live migration of containers between host computers, as does traditional virtualization technologies.

Figure 5D:
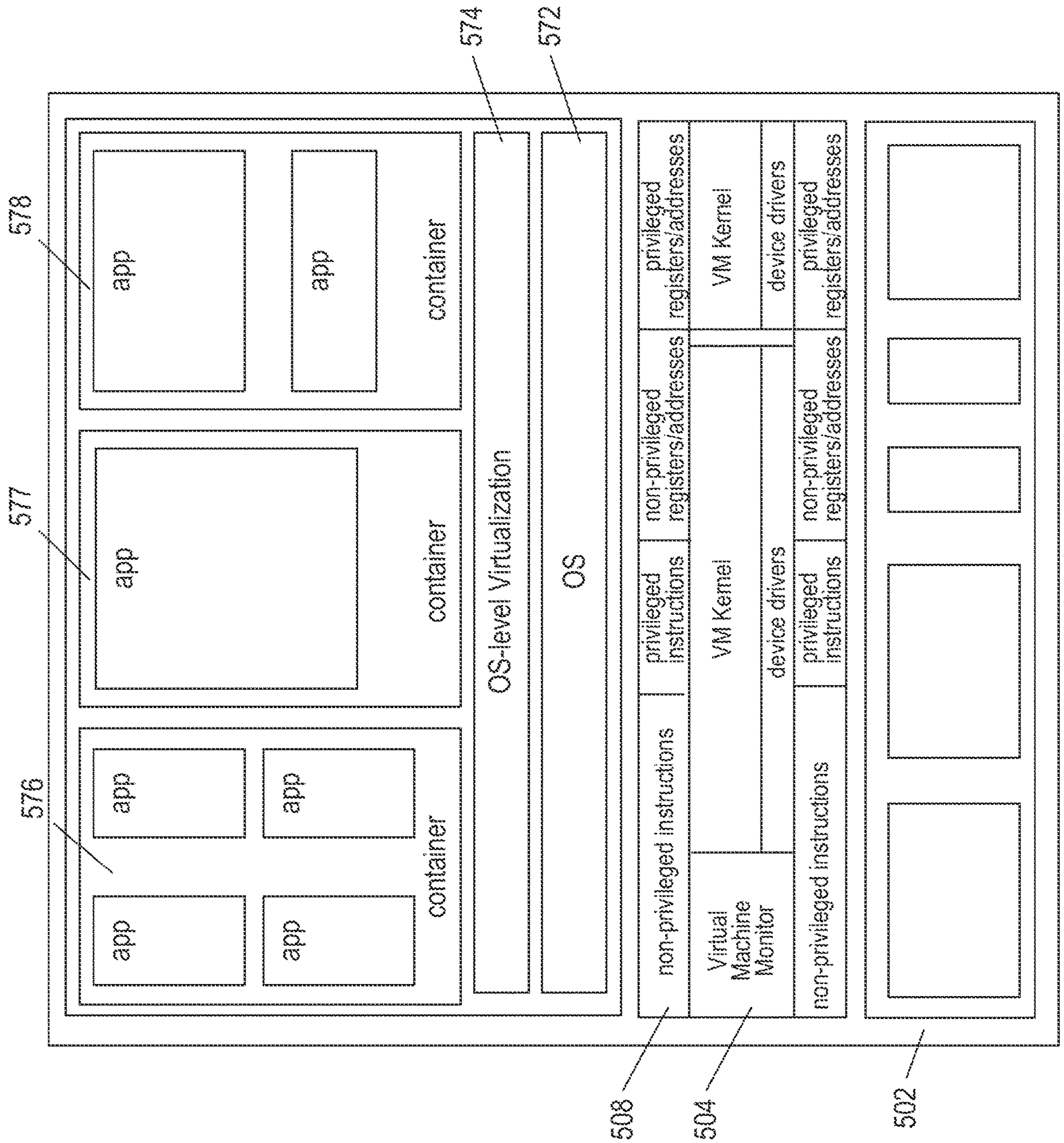

FIG. 5D illustrates an approach to combining the power and flexibility of traditional virtualization with the advantages of OSL virtualization. FIG. 5D shows a host computer similar to that shown in FIG. 5A, discussed above. The host computer includes a hardware layer 502 and a virtualization layer 504 that provides a simulated hardware interface 508 to an operating system 572. Unlike in FIG. 5A, the operating system interfaces to an OSL-virtualization layer 574 that provides container execution environments 576-578 to multiple application programs. Running containers above a guest operating system within a virtualized host computer provides many of the advantages of traditional virtualization and OSL virtualization. Containers can be quickly booted in order to provide additional execution environments and associated resources to new applications. The resources available to the guest operating system are efficiently partitioned among the containers provided by the OSL-virtualization layer 574. Many of the powerful and flexible features of the traditional virtualization technology can be applied to containers running above guest operating systems including live migration from one host computer to another, various types of high-availability and distributed resource sharing, and other such features. Containers provide share-based allocation of computational resources to groups of applications with guaranteed isolation of applications in one container from applications in the remaining containers executing above a guest operating system. Moreover, resource allocation can be modified at run time between containers. The traditional virtualization layer provides flexible and easy scaling and a simple approach to operating-system upgrades and patches. Thus, the use of OSL virtualization above traditional virtualization, as illustrated in FIG. 5D, provides much of the advantages of both a traditional virtualization layer and the advantages of OSL virtualization. Note that, although only a single guest operating system and OSL virtualization layer as shown in FIG. 5D, a single virtualized host system can run multiple different guest operating systems within multiple virtual machines, each of which supports one or more containers.

Figure 6:
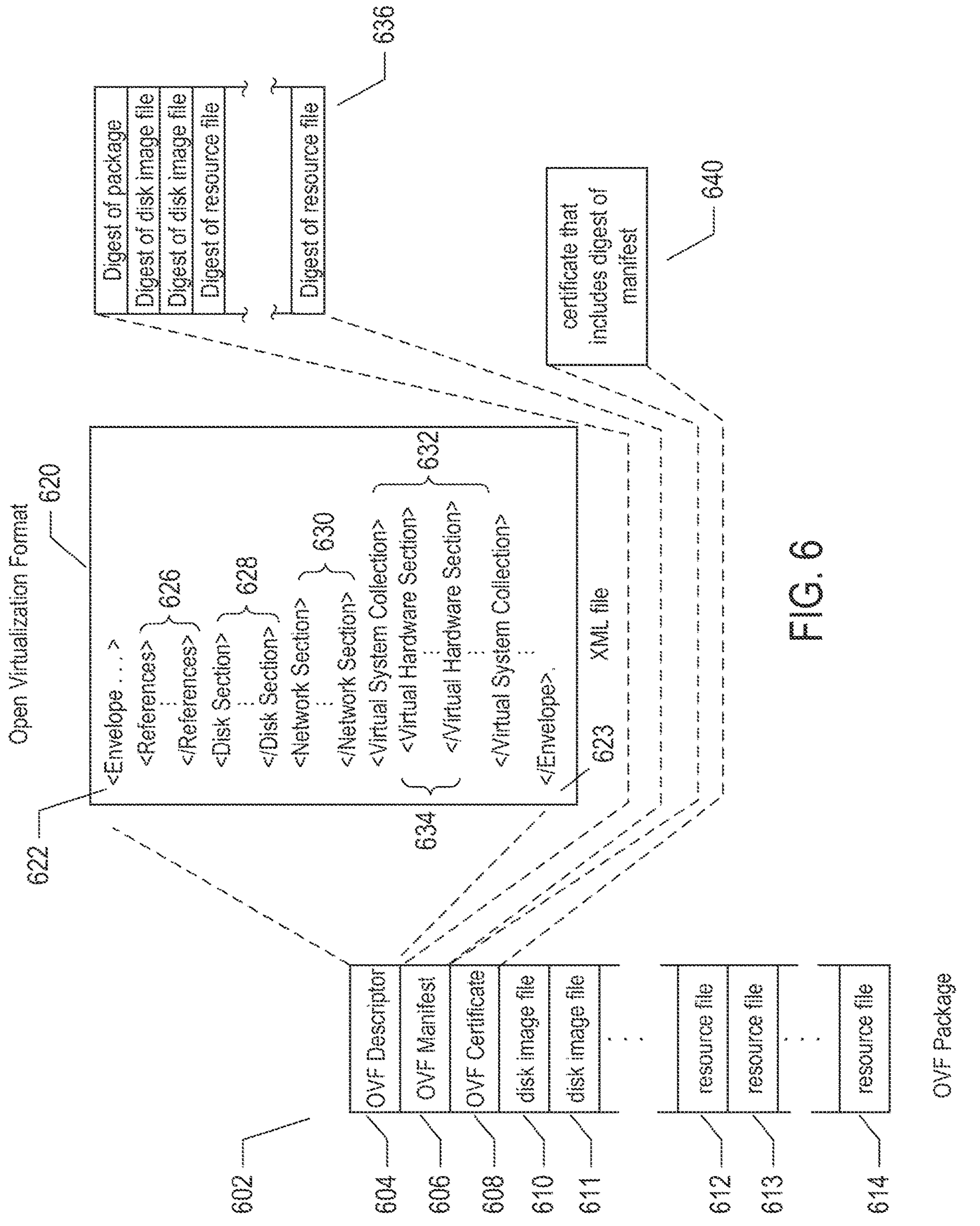
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
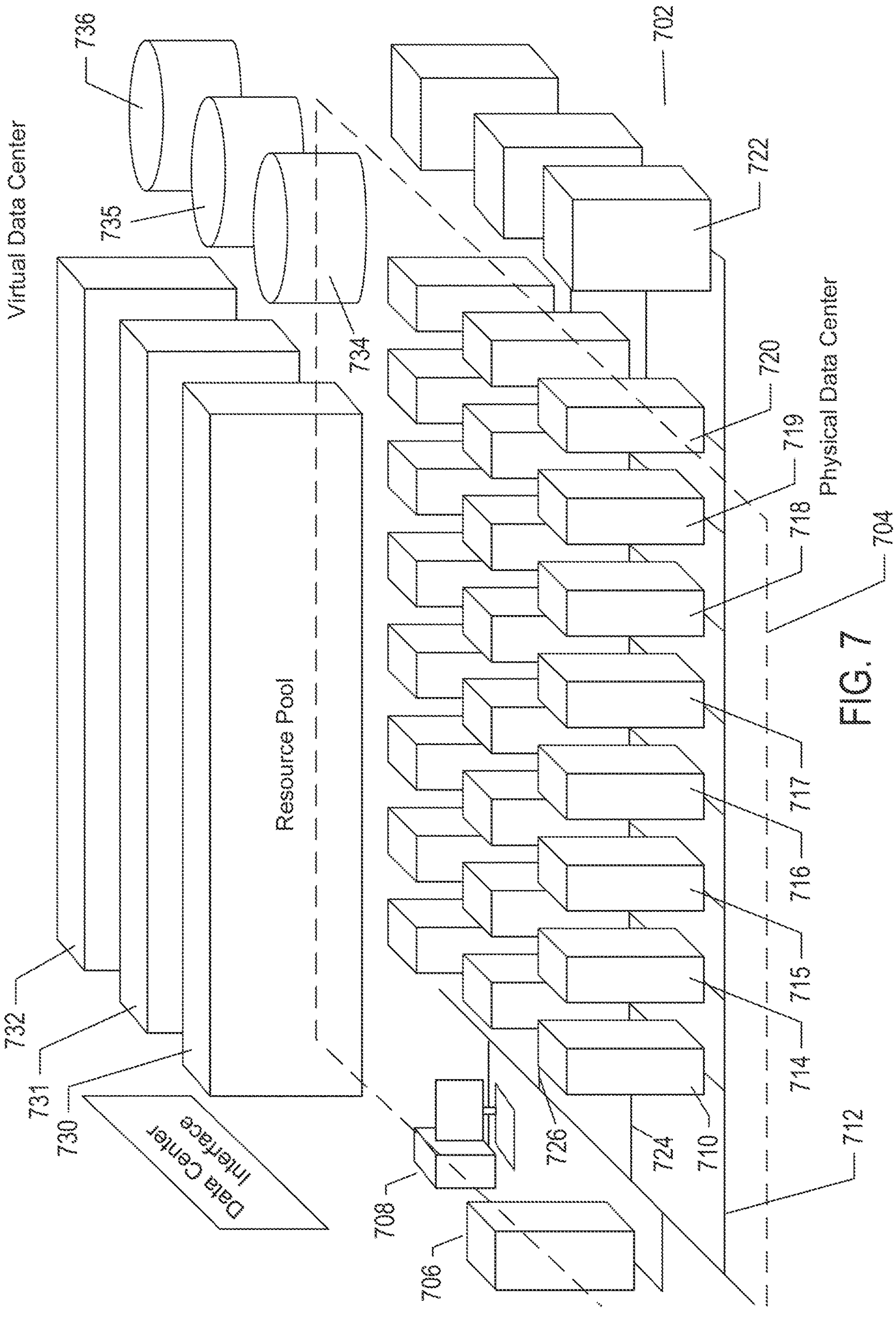
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers which are one example of a broader virtual-infrastructure category, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-infrastructure management server ("VI-management-server") 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Overview of IaC Management

Figure 8:
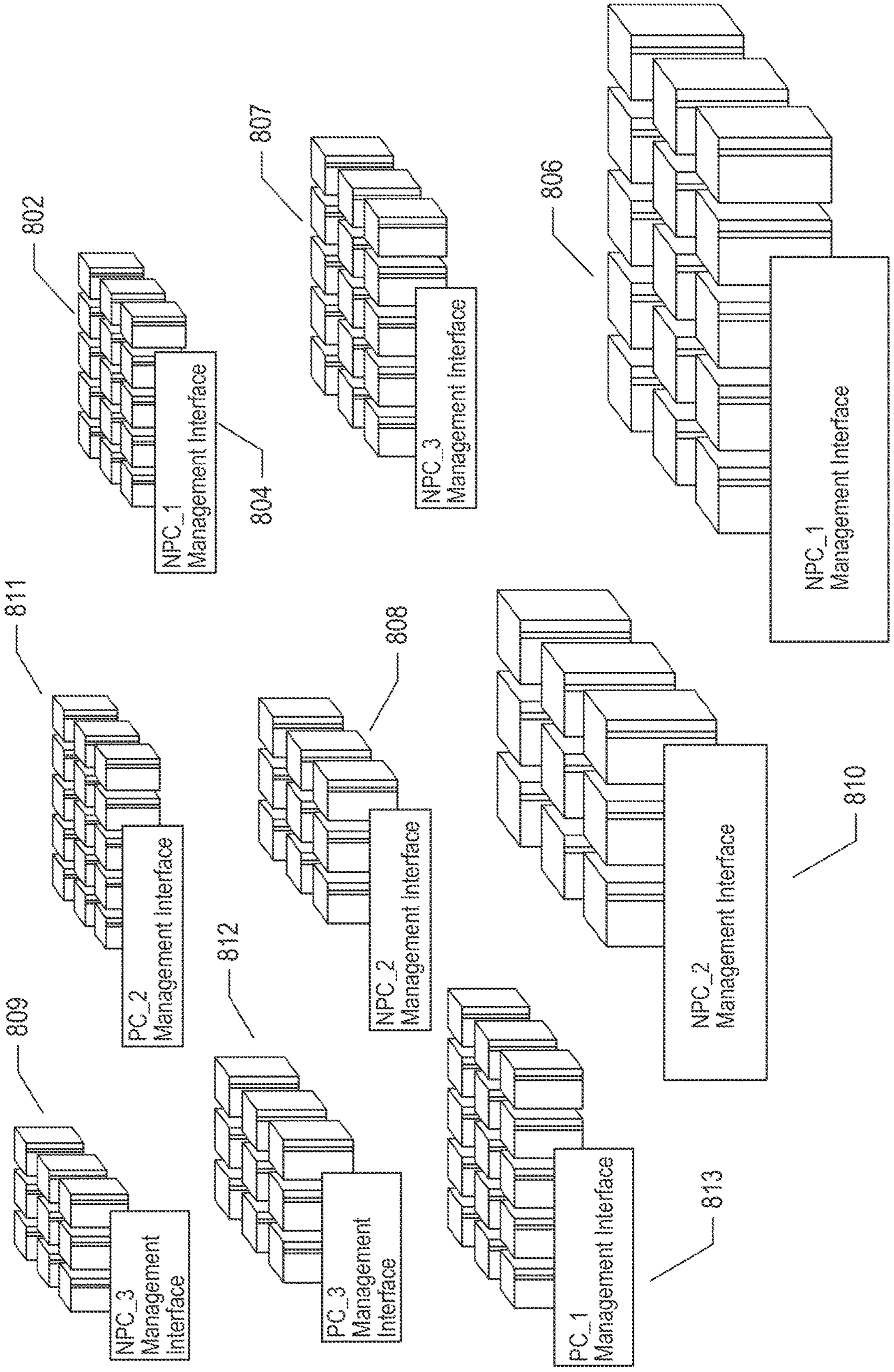
FIG. 8 illustrates a number of different cloud-computing facilities that provide computational infrastructure to an organization for supporting the organization's distributed applications and services.

FIG. 8 illustrates a number of different cloud-computing facilities that provide computational infrastructure to an organization for supporting the organization's distributed applications and services. The cloud-computing facilities are each represented by an array of cabinets containing servers, data-storage appliances, communications hardware, and other computational resources, such as the array of cabinets 802. Each cloud-computing facility provides a management interface, such as management interface 804 associated with cloud-computing facility 802. The organization leases computational resources from a number of native-public-cloud cloud-computing facilities 802 and 806-810 and also obtains computational resources from multiple private-cloud cloud-computing facilities 811-813. The organization may wish to move distributed-application and distributed-service instances among the cloud-computing facilities to take advantage of favorable leasing rates, lower communications latencies, and desirable features and policies provided by particular cloud-computing facilities. In addition, the organization may wish to scale-up or scale-down the computational resources leased from different cloud-computing facilities in order to efficiently handle dynamic workloads. All of these types of operations involve issuing commands and requests through the management interfaces associated with the cloud-computing facilities. In the example shown in FIG. 8, cloud-computing facilities 802 and 806 are accessed through a first type of management interface, cloud-computing facilities 808 in 810 are accessed through a second type of management interface, and cloud-computing facilities 807 and 809 are accessed through a third type of management interface. The management interfaces associated with private-cloud cloud-computing facilities 811-813 are different from one another and from the native-public-cloud management interfaces.

The many different management interfaces represent a challenge to management and administration personnel within the organization. The management personnel need to be familiar with a variety of different management interfaces that may involve different command sets, different command-set syntaxes, and different features, In addition, the different management interfaces may accept different types of blueprints or cloud templates that specify the infrastructure and infrastructure configuration desired by the organization. It may be difficult for management personnel to determine whether certain desired features and functionalities easily accessed and obtained through certain types of management interfaces are even provided by cloud-computing facilities associated with other types of management interfaces. Different management interfaces may require different types of authentication and authorization credentials which further complicates management operations performed by management and administration personnel. These problems may even be of greater significance when computational resources are leased from cloud-computing facilities and configured and managed by automated management systems.

Figure 9:
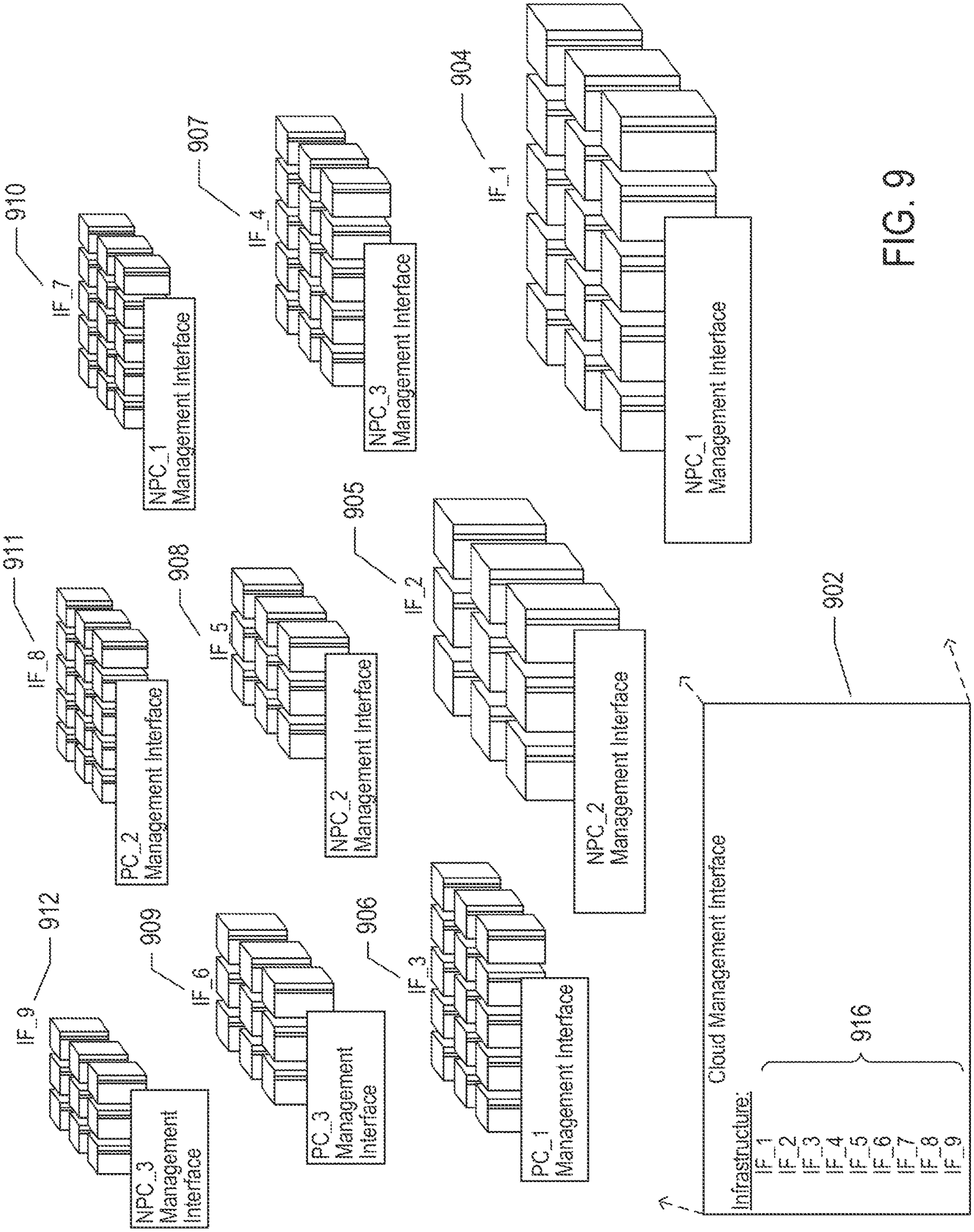
FIG. 9 illustrates a universal-management-interface provided by the currently disclosed IaC cloud-infrastructure-management service or system.

To address the problems associated with multiple different management interfaces to multiple different cloud-computing facilities, discussed in the preceding paragraph, the currently discussed IaC cloud-infrastructure-management service or system provides a single, universal management interface through which management and administration personnel as well as automated management systems define and deploy cloud-based infrastructure within many different types of cloud-computing facilities. FIG. 9 illustrates a universal-management-interface provided by the currently discussed IaC cloud-infrastructure-management service or system. The currently discussed IaC cloud-infrastructure-management service or system provides a cloud-management interface 902 through which both human management personnel and automated management systems can manage computational infrastructure provided by many different types of underlying cloud-computing facilities associated with various different types of management interfaces. The infrastructure deployed and configured within the various cloud-computing facilities is represented in FIG. 9 by the labels "IF_1" 904, "IF_2" 905, "IF_3" 906, "IF_4" 907, "IF_5" 908, "IF_6" 909, "IF_7" 910, "IF_8" 9011, and "IF_9" 912. The currently discussed IaC cloud-infrastructure-management service or system maintains the required authentication and authorization credentials for the different underlying cloud-computing facilities on behalf of human management personnel and automated management systems and automatically provides the required authentication and authorization credentials when accessing management interfaces provided by the different underlying cloud-computing facilities. A single type of cloud template or blueprint is used to specify desired infrastructure and desired infrastructure configuration within the underlying cloud-computing facilities. Each different set of computational resources that together constitute an infrastructure within each of the cloud-computing facilities is visible, and can be managed, through the cloud-management interface 902, as indicated by the infrastructure labels 916 shown within the cloud-management interface.

Figure 10:
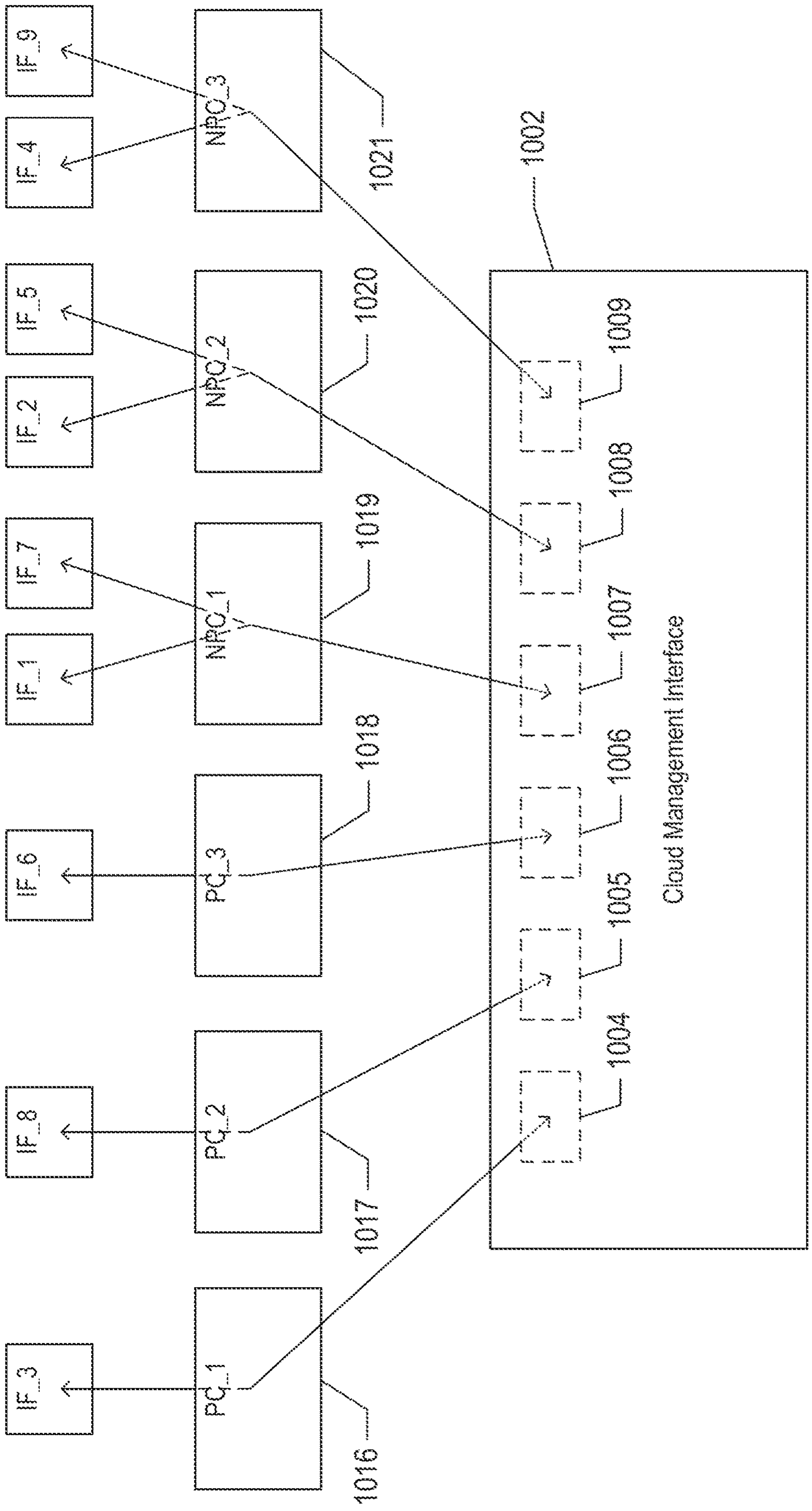
FIG. 10 illustrates the architecture of the currently disclosed IaC cloud-infrastructure-management service or system.

FIG. 10 illustrates the architecture of the currently discussed IaC cloud-infrastructure-management service or system. The IaC cloud-infrastructure-management service or system provides a cloud-management interface 1002 that includes a common or universal set of commands that can be used to deploy and configure infrastructure in many different types of private-cloud and native-public-cloud cloud-computing facilities that provide various types of cloud-management interfaces, allowing management and administration personnel and upstream automated infrastructure-management systems to deploy and configure infrastructure across the many different types of cloud-computing facilities through a common cloud-management interface 1002. The cloud-management interface 1002 is implemented by the IaC cloud-infrastructure-management service or system, discussed below. The IaC cloud-infrastructure-management service or system includes cloud-computing-facility-specific plug-ins, represented by dashed-line rectangles 1004-1009, that implement, together with control logic within the IaC cloud-infrastructure-management service or system, translation of the commands and features of the cloud-management interface 1002 to the commands and features of the underlying cloud-facility-specific management interfaces 1016-1021.

Figure 11:
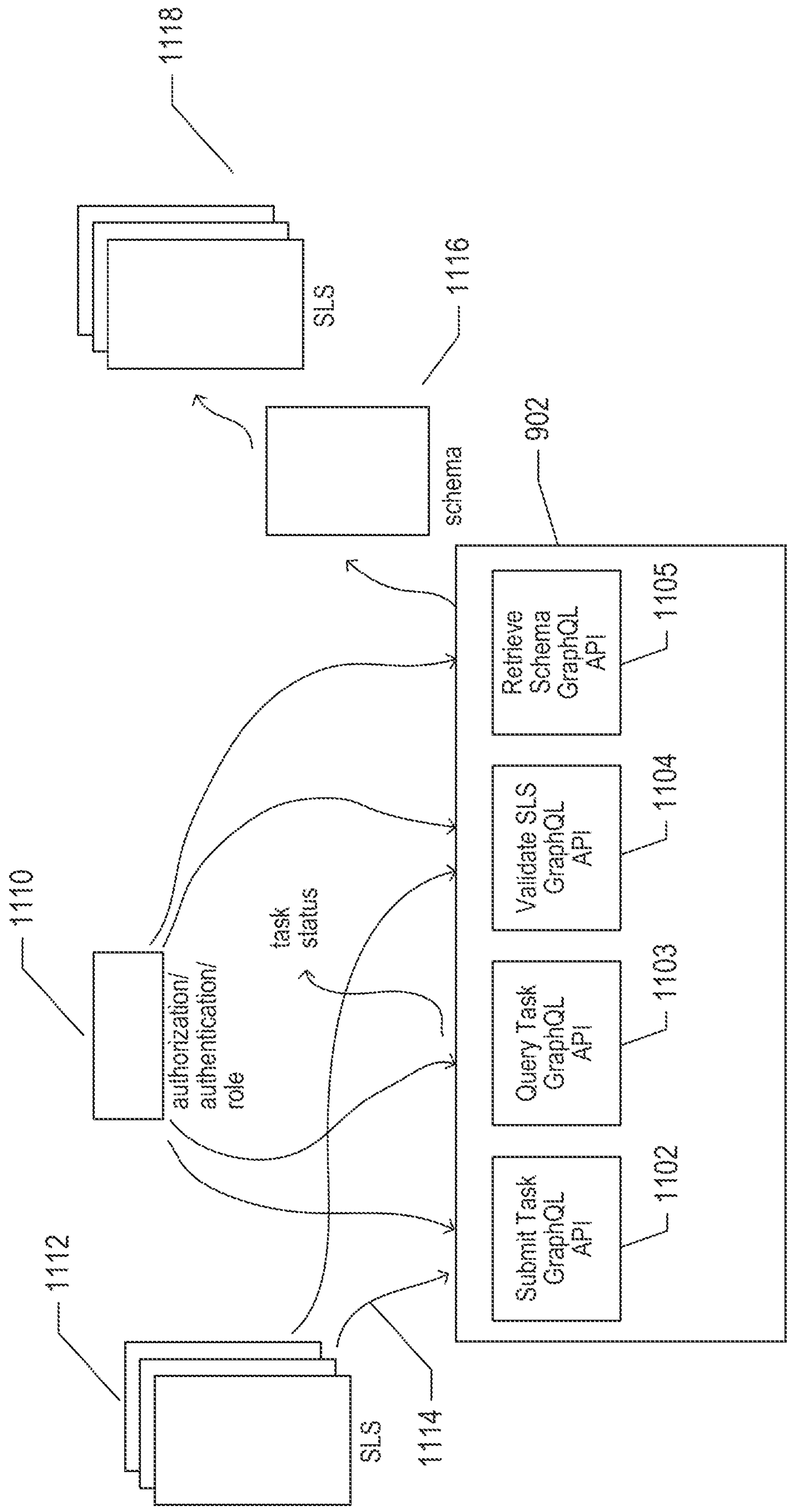
FIG. 11 illustrates the cloud-management interface provided by the currently disclosed IaC cloud-infrastructure-management service or system.

FIG. 11 illustrates the cloud-management interface provided by the currently discussed IaC cloud-infrastructure-management service or system. The cloud-management interface 902 includes four different GraphQL application programming interfaces ("APIs"): (1) Submit Task 1102, through which deployment-and-configuration commands are input to the IaC cloud-infrastructure-management service or system; (2) Query Task 1103, through which status queries for previously submitted deployment-and-configuration commands and requests are input to the IaC cloud-infrastructure-management service or system; (3) Validate SLS 1104, through which requests to validate SLS data are input to the IaC cloud-infrastructure-management service or system; and (4) Retrieved Schema 1105, through which the schemas for infrastructures within underlying computing-facilities can be requested from the IaC cloud-infrastructure-management service or system. Requests and commands input to the IaC cloud-infrastructure-management service or system are generally accompanied with an authorization/authentication/role certificate or token 1110, deployment-and-configuration tasks submitted to the Submit Task API are generally accompanied with SLS data 1112 (described below), and requests for validation of SLS data are accompanied with the SLS data to be validated, as indicated by curved arrows, such as curved arrow 1114, in FIG. 11. The schema 1116 returned when a command input to the Retrieve Schema API is executed is convertible into an SLS-data specification 1118 which can be input to the Submit Task API and/or modified and input to the Submit Task API.

GraphQL Interface

Figure 12:
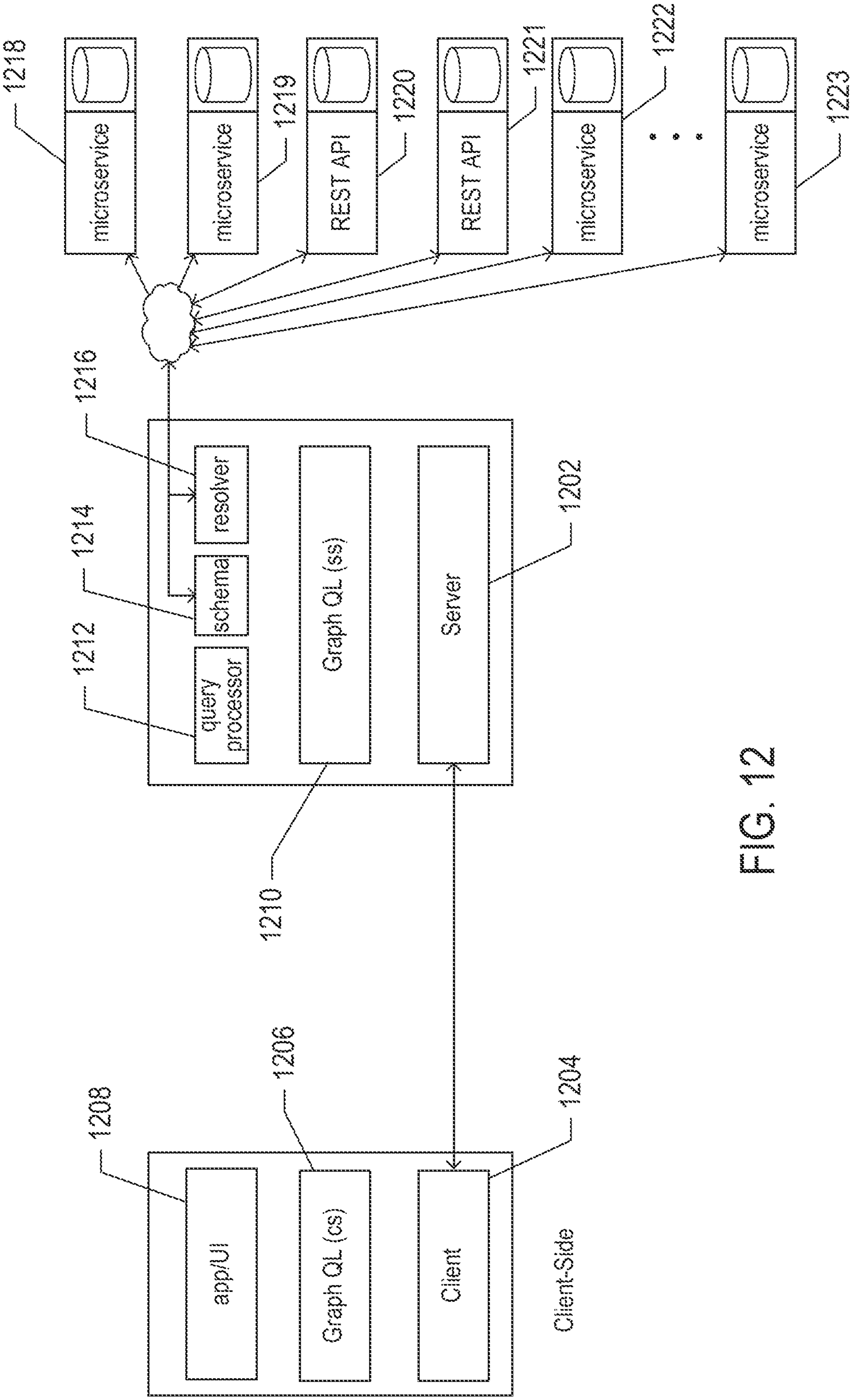
FIG. 12 illustrates components of a GraphQL API interface.

FIG. 12 illustrates components of a GraphQL interface. The GraphQL interface is used as an API interface by various types of services and distributed applications. For example, as shown in FIG. 12, a server 1202 provides a service that communicates with a service client 1204 through a GraphQL API provided by the server. The service client 1204 can be viewed as a computational process that uses client-side GraphQL functionality 1206 to allow an application or user interface 1208 to access services and information provided by the server 1202. The server uses server-side GraphQL functionality 1210, components of which include a query processor 1212, a storage schema 1214, and a resolver component 1216 that accesses various different microservices 1218-1223 to execute the GraphQL-encoded service requests made by the client to the server. Of course, a GraphQL API may be provided by multiple server processes in a distributed application and may be accessed by many different clients of the services provided by the distributed application. GraphQL provides numerous advantages with respect to the Representational State Transfer ("REST") interface technology, including increased specificity and precision with which clients can request information from servers and a potential for increased data-transfer efficiencies.

FIGS. 13A-E illustrate an example schema, an extension to that example schema, and queries, a mutation, and a subscription to illustrate the GraphQL query language. The example shown in FIGS. 13A-E does not illustrate all of the different GraphQL features and constructs, but a comprehensive specification for the GraphQL query language is provided by the GraphQL Foundation. A GraphQL schema can be thought of as the specification for an API for a service, distributed application, or other server-side entity. The example schema provided in FIGS. 13A-B is a portion of a very simple interface to a service that provides information about shipments of drafting products from a drafting-product retailer.

Three initial enumeration datatypes are specified in a first portion of FIG. 13A. The enumeration BoxType 1302 specifies an enumeration datatype with four possible values: "CARDBOARD," "METAL," "SOFT_PLASTIC," and "RIGID_PLASTIC." In the example schema, a box represents a shipment and the box type indicates the type of container in which the shipment is packaged. The enumeration ProductType 1304 specifies an enumeration datatype with eight possible values: "PENCIL_SET," "ERASER_SET," "INK_SET," "PEN_SET." "INDIVIDUAL_PENCIL," "INDIVIDUAL_ERASER," and "INDIVIDUAL_INK." "INDIVIDUAL_PEN." In the example schema, a shipment, or box, can contain products including sets of pencils, erasers, ink, and pens as well as individual pencils, erasers, ink, and pens. In addition, as discussed later, a shipment, or box, can also contain one or more boxes, or sub-shipments. The enumeration SubjectType 1306 specifies an enumeration datatype with four possible values: "PERSON," "BUILDING," "ANIMAL," and "UNKNOWN." In the example schema, the subject of a photograph is represented by one of the values of the enumeration SubjectType.

The interface datatype Labeled 1308 is next specified in the example schema. An interface datatype specifies a number of fields that are necessarily included in any object datatype that implements the interface. An example of such an object datatype is discussed below. The two fields required to be included in any object datatype that implements the interface Labeled include: (1) the field id 1309, of fundamental datatype ID; and (2) the field name 1310, of fundamental datatype String. The symbol "!" following the type specifier "ID" is a wrapping type that requires the field id to have a non-null value. The fundamental scalar datatypes in GraphQL include: (1) integers, Int; (2) floating-point values, Float; (3) Boolean values, Boolean; (4) string values, String; and (5) identifiers, ID. All of the more complex datatypes in GraphQL must ultimately comprise scalar datatypes, which can be thought of as the leaf nodes of a parse tree generated from parsing GraphQL queries, mutations, and subscriptions, discussed below. Wrapping datatypes include the non-null wrapping datatype discussed above and the list wrapping datatype indicated by bracketing a datatype, such as "[Int]," which specifies a list, or single-dimensional array, of integers or "[[Int]]," which specifies a list of lists or a two-dimensional matrix of integers.

The union Item 1312 is next specified in the example schema. A union datatype indicates that a field in an output data object can have one of the multiple datatypes indicated by the union specification. In this case, the datatype Item can be either a Box data object or a Product data object.

The Box object datatype 1314 is next specified in the example schema. An object datatype is a collection of fields that can have scalar-data-type values, wrapping-data-type values, or object data-type values. Because an object datatype may include one or more fields with object data-type values, object datatypes can describe hierarchical aggregations of data. The language "implements Labeled" 1315 indicates that the Box object datatype necessarily includes the interface Labeled fields id and name, discussed above, and those fields occur as the first two fields 1316 of the Box object datatype. The fields id and name represent a unique identifier and a name for the shipment represented by an instance of the Box object datatype. The additional fields in the Box object datatype include: (1) length 1317, of type Float, representing the length of the shipment container; (2) height 1318, of type Float, representing the height of the shipment container; (3) width 1319, of type Float, representing the width of the shipment container; (4) weight 1320, of type Float, representing the weight of the shipment container; (5) boxType 1321, of non-null enumeration type boxType, representing the type of shipment container; (6) contents 1322, an array of non-null Item data objects, representing the contents of the shipment; and (7) numItems 1323, of type Int, representing the number of items in the array contents. Since the field contents is an array of Item data objects, a box, or shipment, can contain one or more additional boxes, or sub-shipments. This illustrates how the GraphQL query language supports arbitrarily hierarchically nested data aggregations.

Turning to FIG. 13B, the example schema next specifies a Product 1326 object datatype that, like the Box object datatype, implements the interface Labeled and that additionally includes a field pType 1327 of enumeration type ProductType. An instance of the Product object datatype represents one of the different types of products that can be included in the shipment.

The example schema next specifies a custom scalar datatype ImageURL 1328 to store a Uniform Resource Locator ("URL") for an image. The language "@specifiedBy( )" is a directive that takes a URL argument that references a description of how a String serialization of the custom scalar datatype ImageURL needs to be composed and formatted in order to represent a URL for an image. GraphQL supports a number of built-in directives and allows for specification of custom directives. Directives are essentially specifications of run-time execution details that are carried out by a server-side query processor that processes GraphQL queries, mutations, and subscriptions, discussed below. As another example, built-in directives can control query-execution to omit or include certain fields in returned data objects based on variables evaluated at the query-execution time. It should also be noted that fields in object datatypes may also take arguments, since fields are actually functions that return the specified datatypes. Arguments supplied to fields, like arguments supplied to directives, are evaluated and used at query-execution time by query processors.

The example schema next specifies the Photo object datatype 1330, which represents a photograph or image that can be accessed through the service API specified by the schema. The Photo object datatype includes fields that represent the name of the photo, and image size, the type of subject of the photo or image, and in image URL.

The example schema next specifies three queries, a mutation, and a subscription for the root Query, Mutation, and Subscription operations. A query, like a database query, requests the server-side GraphQL entity to return information specified by the query. Thus, a query is essentially an information request, similar to a GET operation on a REST API. A mutation is a request to alter stored information and is thus similar to a PUT or PATCH operation on a REST API. In addition, a mutation returns requested information. A subscription is a request to open a connection or channel through which a GraphQL client receives specified information as the information becomes available to the GraphQL server that processes the subscription request. Thus, the various data objects specified in the schema provide the basis for constructing queries, mutations, and subscriptions that allow a client to request and receive information from a server. The example schema specifies three different types of queries 1332 that can be directed, by a client, to the server via the GraphQL interface: (1) getBox 1334, which receives an identifier for a Box data object as an argument and returns a Box data object in response; (2) getBoxes 1335, which returns a list or array of Box data objects in response; and (3) getPhoto 1336, which receives the name of a photo or image as an input argument and returns a Photo data object in response. These are three examples of the many different types of queries that might be implemented in the GraphQL interface. A single mutation addProduct 1338 is specified, which receives the identifier for a Box data object and a product type as arguments and, when executed by the server, adds a product of the specified product type to the box identified by the Box data-object identifier and returns a Product data object representing the product added to the box. A single subscription getBoxUpdates receives a list of Box data-object identifiers, as an argument, and returns a list of Box data objects in each response returned through the communications channel opened between the client and server for transmission of the requested information, over time, to the client. In this case, the client receives Box data objects corresponding to any of the boxes specified in the argument to the subscription getBoxUpdates when those Box data objects are updated, such as in response to addProduct mutations submitted to the server.

Finally, the example schema specifies two fragments: (1) boxFields 1342; and (2) productFields 1344. A fragment specifies one or more fields of an object datatype. Fragments can be used to simplify query construction by expanding a fragment, using the operator " . . . " in a selection set of a query, mutation, or subscription, as discussed below, rather than listing each field in the fragments separately in the selection set. A slightly different use of fragments is illustrated in example queries, below. In the current case, the fragment boxFields includes only the single field name of the Box data-object type and the fragment productFields includes only the single field name pType of the Product datatype.

FIGS. 14A-D illustrates two example queries, an example mutation, and an example subscription based on the example schema discussed with reference to FIGS. 13A-B. FIG. 14A shows an example query 1402 submitted by a client to a server and the JavaScript Object Notation ("JSON") data object returned by the server to the client. Various different types of data representations and formats can be returned by servers implementing GraphQL interfaces, but JSON is a commonly used data representation and formatting convention. The query 1402 is of the query type 1334 specified in FIG. 13B. The argument specified for the query is "A31002," the String serialization of a Box identifier. A selection set 1404 for the query specifies that the client issuing the query wishes to receive only values for the id, name, weight, and boxType fields of the Box data object with identifier "A31002." The JSON response to the query 1406 contains the requested information. This points to one of the large advantages provided by the GraphQL query language. A client can specify exactly the information the client wishes to receive from the server, rather than receiving predefined information for predefined queries provided by a REST interface. In this case, the client is not interested in receiving values for many of the fields in the Box data object and is able to use a selection set in the query to request only those fields that the client is interested in receiving.

FIG. 14B illustrates a second example query based on the example schema discussed with reference to FIGS. 13A-B. The second example query 1408 is of the query type 1335 specified in FIG. 13B. A selection set 1410 within the query requests that, for each Box data object currently maintained by the server, values for the id, name, and contents fields of the Box data object should be returned. The contents field has a list type and specifies a list of Item data objects, where an Item may be either a Box data object or a Product data object. A selection set 1412 for the contents field uses expansion of the boxFields and productFields fragments to specify that, for each Item in the list of Item data objects represented by the contents field, if the Item is a Box data object, then the value of the name field for that Box data object should be returned while, if the Item is a Product data object, then the value of the pType field of the Product data object should be returned. The JSON response 1414 to query 1408 is shown in the lower portion of FIG. 14B. The returned data is a list of the requested fields of the Box data object currently maintained by the server. That list begins with bracket 1415 and ends with bracket 1416. Ellipsis 1417 indicates that there may be additional information in the response for additional Box data objects. The requested data for the first Box data object occurs between curly brackets 1418 and 1419. The list of items for the contents of this Box data object begin with bracket 1420 and end with bracket 1422. The first Item 1424 in the list is a Box data object and the second two Item data objects 1425 and 1426 are Product data objects. The second example query illustrates that a client can receive a large amount of arbitrarily related information in one request-response interaction with a server, rather than needing to use multiple request-response interactions. In this case, a list of portions of multiple Box data objects can be obtained in one request-response interaction. As another example, in a typical REST interface, a client may need to submit a request to separately retrieve information for each Box data object contained within an outer-level Box data object, but, using a hierarchical object datatype, that information can be requested in a single GraphQL query.

FIG. 14C illustrates an example mutation based on the example schema discussed with reference to FIGS. 13A-B. The example mutation 1430 is of the mutation type 1338 specified in FIG. 13B. The mutation requests that the server add a product of type INK_SET to the Box data object identified by Box data-object identifier "12345" and return values for the id, pType, and name fields of the updated Box data object. The JSON response 1432 to query 1430 is shown in the lower portion of FIG. 14C. FIG. 14D illustrates an example subscription based on the example schema discussed with reference to FIGS. 13A-B. The example subscription 1434 is of the subscription type 1340 specified in FIG. 13B. The subscription requests that the server return, for updated Box data objects identified by Box data-object identifiers "F3266" and "H89000," current values for the name, id, boxType, and numItems fields. One of the JSON responses 1436 to subscription 1434 returned at one point in time is shown in the lower portion of FIG. 14D.

FIG. 14E illustrates a second schema, based on the first example schema of FIGS. 13A-B and generated by extending the first example schema. The second schema may be used as an interface to a different service that returns shipment fees associated with Box data objects that represent shipments. The schema extension includes specification of a new Price data object 1440, extension of the object datatype Box to include an additional field price with a Price data-object value 1442, and extending the root Query operation type to include a getFee query 1444 that receives the length, height, width, and weight of a shipment and returns the corresponding shipment price or cost. Thus, GraphQL provides for extension of schemas to generate new extended schemas to serve as interfaces for new services, distributed applications, and other such entities.

Figure 15:
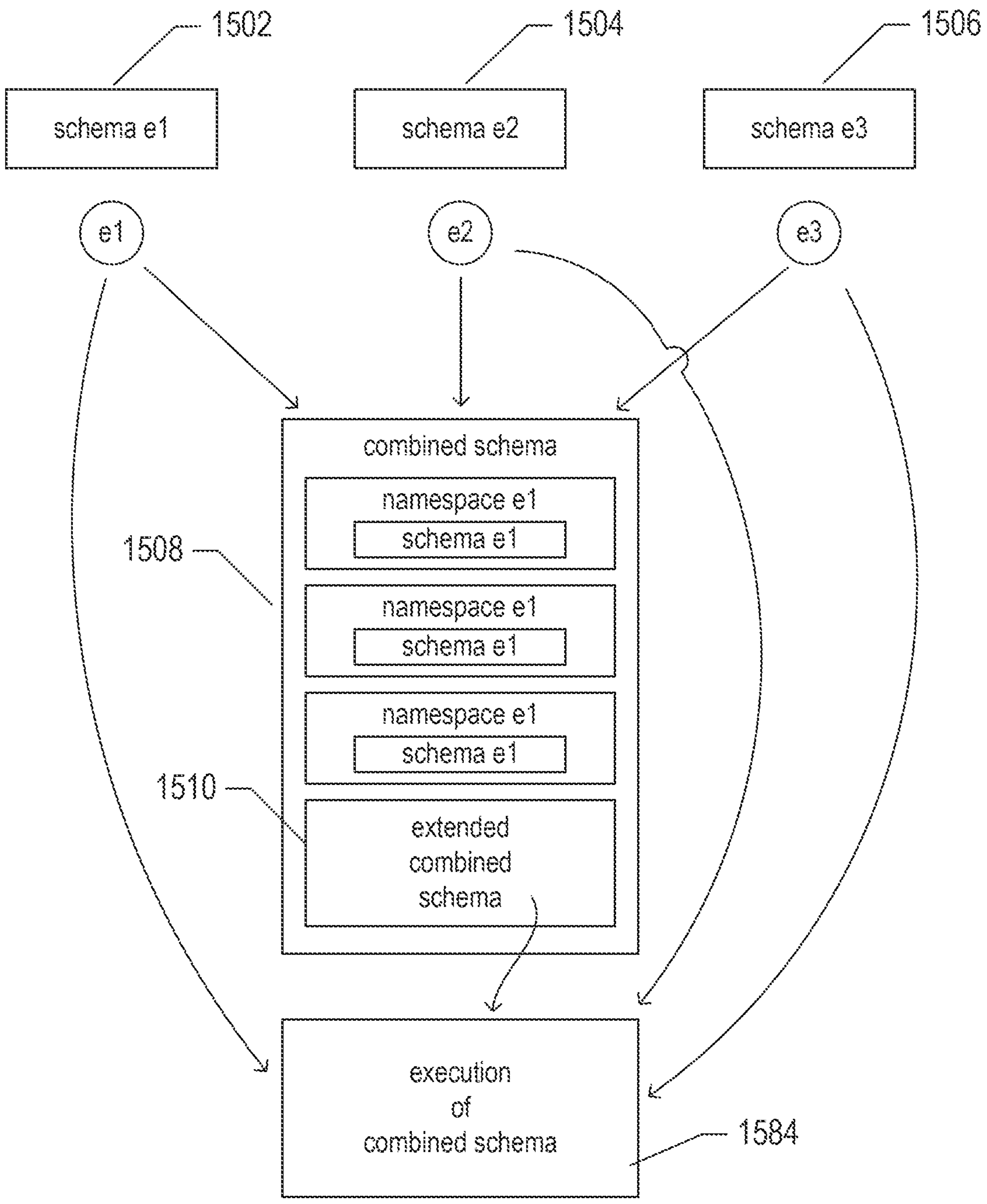
FIG. 15 illustrates a stitching process.

FIG. 15 illustrates a stitching process. Schema stitching is not formally defined by the GraphQL query-language specification. The GraphQL query-language specification specifies that a GraphQL interface is represented by a single schema. However, in many cases, it may be desirable to combine two or more schemas in order to produce a combined schema that is a superset of the two or more constituent schemas, allowing queries, mutations, and subscriptions based on the combined schema to employ object datatypes and other defined types and directives specified in two or more of the constituent schemas. There are multiple different types of implementations of schema stitching. In an example shown in FIG. 15, there are three underlying schemas 1502-1504. The stitching process combines these three schemas into a combined schema 1508. The combined schema includes the underlying schemas. In the illustrated approach to stitching, each underlying schema is embedded in a different namespace in the combined schema, which may include additional extensions 1510. The namespaces are employed in order to differentiate between identical identifiers used in two or more of the underlying schemas. Other approaches to stitching may simply add extensions to all or a portion of the type names defined in all of the underlying schemas in order to generate unique names across all of the underlying schemas. In the combined schema, queries, mutations, and subscriptions may use types from all of the underlying schemas and, in combined-schema extensions of underlying-schema types, a type defined in one underlying schema can be extended to reference a type defined in a different underlying schema. When a query, mutation, or subscription defined in the combined schema is executed, the execution 1514 may involve execution of multiple queries by multiple different services associated with the underlying schemas.

YAML/JINJA and SLS Data

FIGS. 16A-D illustrate the YAML Ain't Markup Language ("YAML") data serialization language. YAML provides for representing data in text files. Certain features of YAML are illustrated by the YAML document shown in FIGS. 16A-D. A YAML document begins with three hyphens (1602 in FIG. 16A) and ends with three periods (1603 in FIG. 16D.) Multiple YAML documents can be included in a single text file. Comments begin with a "#" symbol followed by a space, such as the comment 1604. One of the fundamental constructs in YAML is a mapping of a scalar value to a scalar string, or name, such as the mapping 1605 of the integer value 35 to the name "x" and the mapping 1606 of the string value "Bill Johnson" to the name "Chairman." YAML supports a variety of different types of scalars, as shown in the set of mappings 1607, including: integers encoded as decimal integers 1608, integers encoded as hexadecimal integers 1609, and integers encoded as octal integers 1610; floating-point numbers 1611; Boolean values "Yes" 1612 and "No" 1613, "true" 1614 and "false" 1615, and "On" and "Off" 1616; a value representing infinity 1617; and a value representing "not a number" 1618. On lines 1619, two text lines are mapped to the name "text_stuff," with the symbol "|" used to indicate that newline characters in the text should be preserved. On lines 1620, two text lines are mapped to the name "f_text_stuff," with the symbol ">" indicating that newlines should be removed in order to fold the text into a single text block. Text can be unquoted or quoted, as indicated by the examples on lines 1621. The "!!" operator can be used to explicitly assign types to values, as indicated on lines 1622.

Turning to FIG. 16B, another fundamental data structure supported by YAML is the sequence or list. Several different representations of lists are supported. In a first representation of a list 1623, the elements of the list are indicated by a preceding "-" and a space. In a second representation 1624, the elements of the list are contained within brackets and separated by commas and spaces. As indicated on lines 1625, a list can be mapped to a name. In the example of lines 1625, a list of animals is mapped to the character string, or name, "animals." Note that indentation is used, as in the Python programming language, to indicate hierarchical structure.

Lines 1626 show a mapping of a more complex type of list to the name, or character string. "members." In this example, the list is a list of blocks 1627-1629. Each block is preceded by a hyphen and a space. Each block contains a mapping of a character string to the character string "name" 1630, a mapping of two text lines to the character string "address" 1631, a mapping of an integer to the character string "age" 1632, and a mapping of an alphanumerically encoded phone number to the character string "phone" 1633. In the example of lines 1634 at the bottom of FIG. 16B and lines 1635 at the top of FIG. 16C, the mapping of the list of blocks to the character string "members" on lines 1626 of FIG. 16B is modified to include two additional lines in each block of the list. The two additional lines are specified using the anchor symbol "&" on lines 1636 at the bottom of FIG. 16B. The lines are included at the end of each block in the list using the reference prefix "<<:*" at the beginning of each of three lines referencing the anchor "chapter" 1637-1639. The modified list is equivalent to the list shown on lines 1640 of FIG. 16C. Finally, on line 1641 at the top of FIG. 16D, a more complex mapping that maps the list "[0, 1, 2]" to the list "[small, medium, large]" is shown. This mapping can alternatively be represented by the map sequence, or dictionary, shown on line 1642. The example YAML document shown in FIG. 16A-D does not, of course, provide a comprehensive description of the YAML data-representation language, but is instead intended to show some of the main features and constructs of YAML that are used in SLS documents, discussed below.

Figure 17:
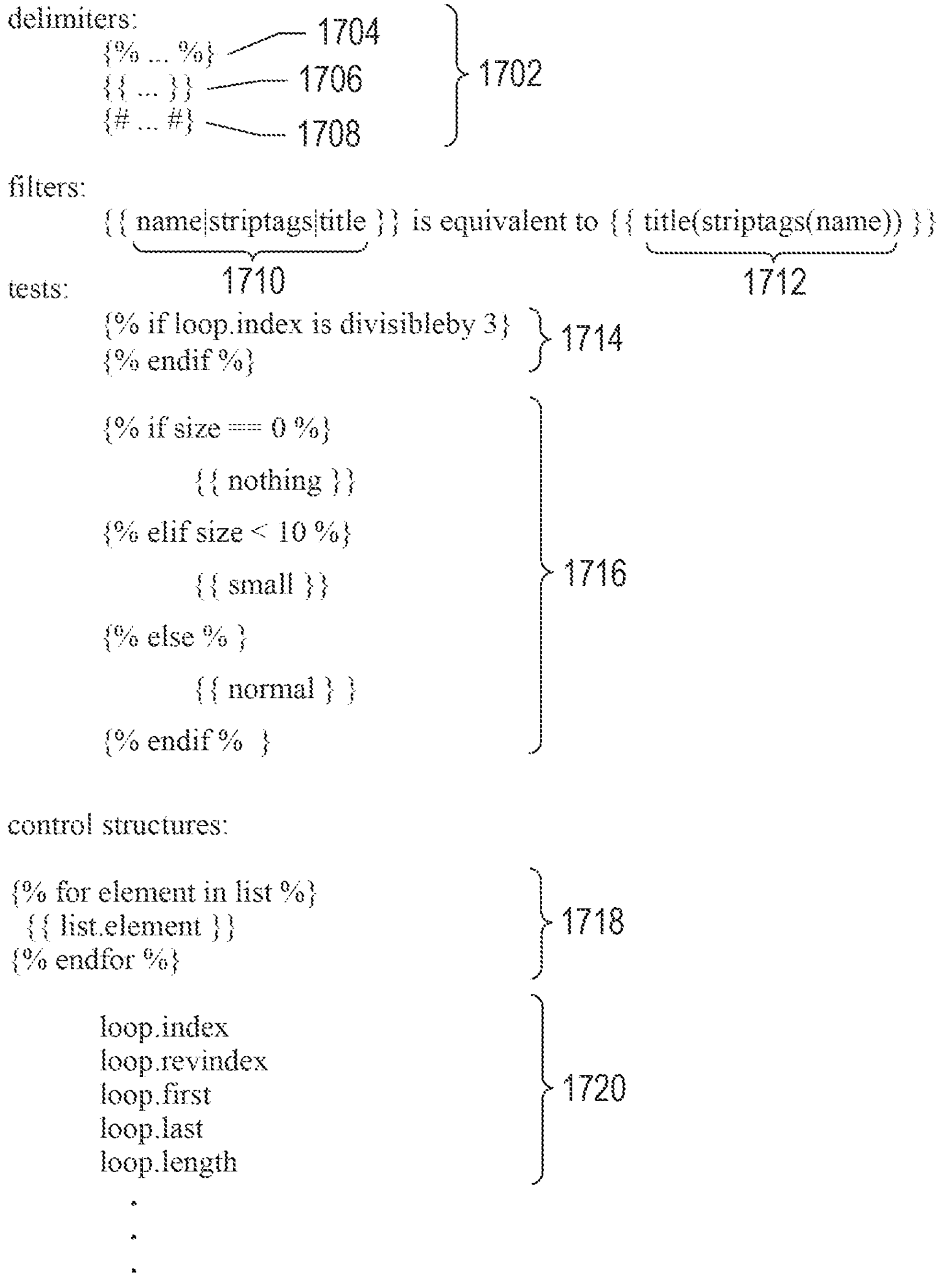
FIG. 17 illustrates certain features provided by the Jinja template engine that are used, in addition to YAML, for representing infrastructure in SLS documents.

FIG. 17 illustrates certain features provided by the Jinja template engine that are used, in addition to YAML, for representing infrastructure in SLS documents. Jinja employs several types of delimiters to encode Jinja constructs. These are shown on lines 1702 of FIG. 17, with ellipses indicating that additional text is enclosed by the delimiters. A first type of delimiter 1704 is used to encapsulate tests, control structures, and other programming-language-like constructs. A second type of delimiter 1706 is used to encapsulate variables for output. A third type of delimiter 1708 is used to enclose comments. Pipe symbols "|" can be used to indicate sequences of function calls. For example, the delimited string "name|striptags|title" 1710 is equivalent to the character string 1712, which represents calling a function "title" with an argument that represents a value returned by calling the function "striptags" with the argument "name." Jinja supports if statements, as shown by the example on lines 1714, and if-elseif-else statements, as shown by the example on lines 1716. Jinja provides a set of comparison operators used in if and if-elseif-else statements. Finally, Jinja provides various types of control structures, such as for-loops, as indicated on lines 1718. The for-loop control structure is accompanied with a number of Jinja loop variables 1720 that can be used in conditional expressions within loops. FIG. 17 does not provide a comprehensive list of examples of Jinja features and constructs, but is instead intended simply to show some of the main types of Jinja constructs that, in combination with YAML constructs and features, are used in SLS documents, described below.

The currently discussed cloud-infrastructure management service is referred to as the "Idem service" in the remainder of this document. The Idem service, as discussed above, receives SLS data files that describe deployment and configuration of cloud-based infrastructure. SLS data files can be represented in various different data-serialization languages, including JSON, but a combination of YAML-like and Jinja-like formatting conventions, features, and constructs are most frequently used. An Idem state file is an SLS data file that represents configuration of a cloud-based infrastructure, and Idem SLS data files serve as blueprints or cloud templates input to the Submitted Task and Validate SLS APIs of the Idem-service management interface. There are, however, many different types of Idem implementations. Idem may be considered to be a data flow programming language, for example, and an Idem system may be implemented as a collection of plug-ins that together comprise a cloud-infrastructure-management engine and a command-line interface ("CLI"). In the current document, the Idem service introduced, above with reference to FIGS. 9-11, is used as an example cloud-infrastructure-management system in which the currently discussed automated methods for generating parameterized cloud templates corresponding to already deployed and configured cloud infrastructure can be incorporated, but the currently discussed automated methods can alternatively be incorporated in other types of Idem implementations.

FIGS. 18A-C illustrate a structured layered state ("SLS") data file and an SLS credential file as well as the output from an Idem describe command. A simple, example Idem state file is shown in the initial portion 1802 of FIG. 18A. The example SLS state file creates a virtual private cloud ("VPC") for a virtual machine within an AWS cloud-computing facility and connects the VPC to an AWS subnet. A first portion of the example SLS state file 1804 describes the VPC and a second portion of the example SLS state file 1806 describes the subnet. Each resource includes a state name, such as "vpc-item-test" 1808 for the VPC, a plug-in/resource/type/directive tuple, such as "aws.cc2.vpc.present" 1810, and a list of attribute/value pairs 1812 followed by a list of tags 1814. The directive present indicates that the resource should be allocated, deployed, and configured according to the representation of the resource when the resource is not currently present in the infrastructure and the directive absent indicates that, when the resource is currently allocated and deployed, the resource should be removed. Of course, real-world Idem state files may contain descriptions of hundreds or thousands of resources and, in addition, a blueprint or cloud templates may include multiple hierarchically organized SLS state files.

The form of an SLS credential file is shown in a lower portion 1816 of FIG. 18A and an upper portion 1818 of FIG. 18B. The SLS credential file contains a block of authentication/authorization information for one or more environments, each of which corresponds to plug-ins for different types of cloud-computing-facility management interfaces. The first portion 1816 of the example SLS credential file shown in FIG. 18A contains a block of authentication/authorization information for a first environment. Each block contains authentication/authorization information for one or more profiles, such as profiles 1820 and 1822 in the block for the first environment, including a default profile 1820. The authentication/authorization information is encoded as a set of attribute/value pairs, such as the name of a particular type of authentication/authorization information, such as an access key, and the alphanumerically encoded access key. SLS credential files are used to input authentication/authorization information to the Idem-service management interface so that the authentication/authorization information can be maintained by the Idem-service management interface and used by the Idem service to access functionality provided by the management interfaces of cloud-computing facilities via the various plug-ins.

The lower portion 1824 of FIG. 18B and the upper portion 1826 of FIG. 18C show the output of an Idem-service describe command executed with respect to the infrastructure described in the Idem state file 1802 shown in FIG. 18A. The output of the Idem-service describe command has a YAML-like format and can be used to generate a corresponding Idem state file that can be subsequently used to modify and enforce the configuration of the represented infrastructure, as discussed below. A final portion 1828 of FIG. 18C illustrates argument binding in SLS data files. The character string "$ {cloud: State_B: ID}" represents a placeholder for a value generated by prior execution of a portion of an SLS data file. In the example shown in the final portion of FIG. 18C, the string "$ {cloud: State_B: ID}" is replaced by the name of the resource State_B once that name is obtained.

Currently Disclosed Methods and Systems

As discussed above, the current application is directed to an IaC cloud-infrastructure-management service or system referred to as the "Idem service." This name is derived from the term "idempotent." An idempotent operation is an operation that can be first applied to an object or entity and, when the object or entity is not subsequently altered by other operations, can be again applied to the object or entity without changing the object or entity. One example of an idempotent operation is the computational operation x=x mod 5, where the initial value of x is 16. The first application of the operation x=x mod 5 sets the value of x to 1. Provided that the value of x is not altered by some other operation, a second application of the operation x=x mod 5 results in the value of x remaining 1, and this is true for any number of repeated applications of the operation x=x mod 5 provided that the value of x is not altered by application of some other operation.

Figure 19:
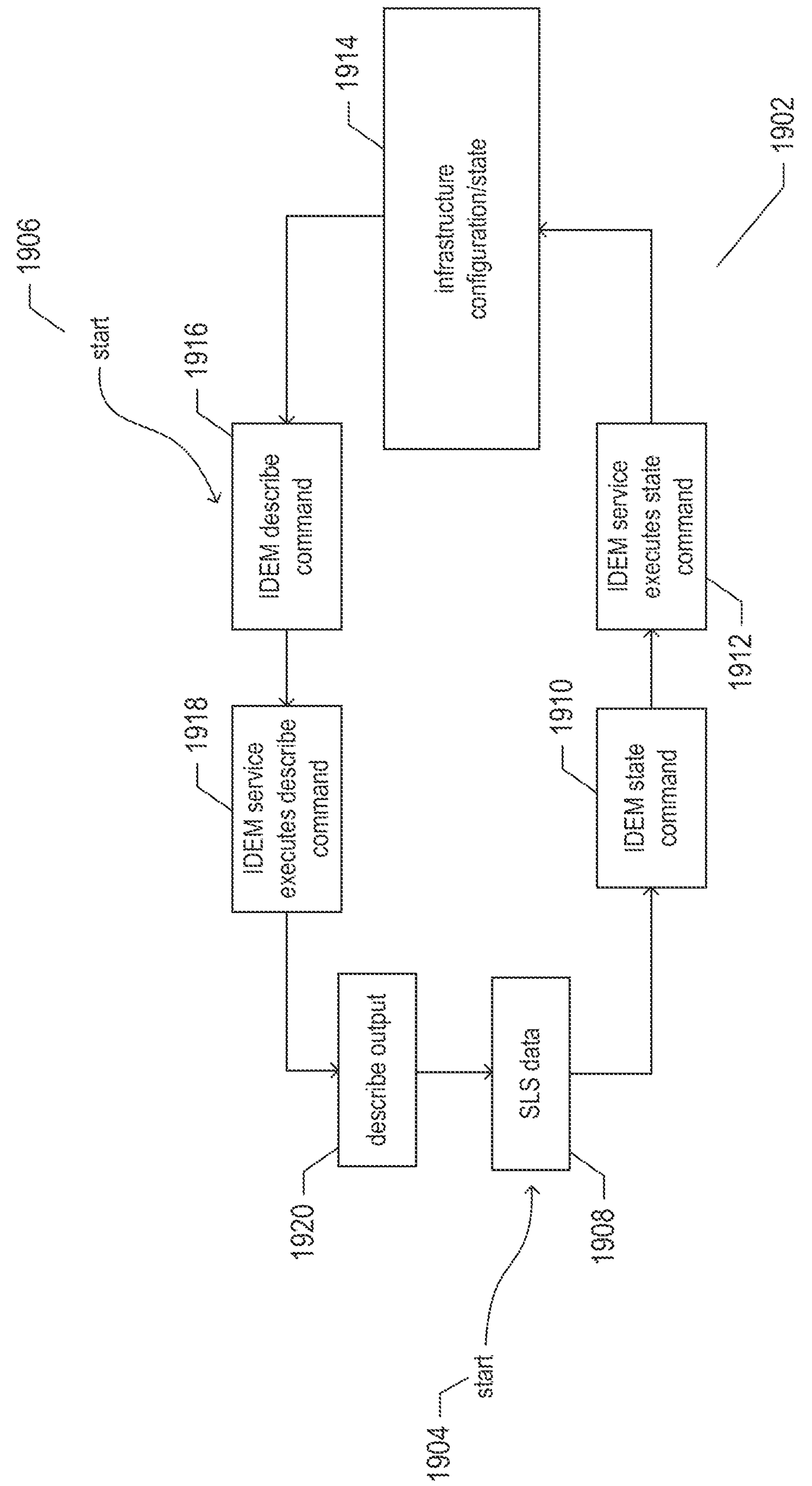
FIG. 19 illustrates a fundamental control loop involving the Idem service.

FIG. 19 illustrates a fundamental control loop involving the Idem service. This control loop involves the Idem-service state command, mentioned above, which applies an SLS-data blueprint or cloud template to a cloud-computing facility. In the case that no infrastructure has yet been deployed and configured within the cloud-computing facility on behalf of the individual or organization submitting the Idem-service state command to the management interface of the Idem service, the Idem service creates, deploys, and configures infrastructure on the cloud-computing facility according to the SLS-data blueprint or cloud template. When the resulting infrastructure is not subsequently altered by other commands or events, then, when the individual or organization again submits the same SLS-data blueprint or cloud template in a subsequent Idem-service state command to the management interface of the Idem service, the infrastructure is not changed by the subsequent Idem-service state command. However, in the case that the infrastructure has been altered by various events following the initial creation, deployment, and configuration of the infrastructure, submission of the same SLS-data blueprint or cloud template in a subsequent Idem-service state command to the management interface of the Idem service returns the infrastructure to the state that the infrastructure had upon initial creation, deployment, and configuration. Thus, the Idem-service state command associated with a particular SLS-data blueprint or cloud template is idempotent, and resubmission of an Idem-service state command associated with a particular SLS-data blueprint or cloud template can be used to control unintended departures of the state of cloud-based infrastructure from that specified in the cloud template, referred to as "enforcement," without the risk of causing unintended changes to the state of the infrastructure defined by the cloud template. The idempotency of the Idem-service state command is reflected in the fundamental control loop 1902 illustrated in FIG. 19. There are two possible starting points 1904 and 1906 for the control loop 1902. Assuming that the loop begins at the starting point 1904, the loop begins with an SLS-data blueprint or cloud template 1908 that describes desired infrastructure to be created, deployed, and configured within a cloud-computing facility. The SLS-data blueprint or cloud template is referenced by an Idem-service state command 1910 which is submitted to the Idem service for execution 1912. Execution of the Idem-service state command 1910 produces deployed and configured infrastructure 1914 with a state corresponding to a desired state represented by the SLS-data blueprint or cloud template. Subsequent submission of an Idem-service describe command 1916 result in execution of the describe command by the Idem service 1918 which, in turn, produces Idem-service-describe-command output 1920 that represents the current state of the infrastructure. At this point, if the output from the Idem describe command does not reflect the desired state of the infrastructure, the original SLS data can be referenced by a resubmitted Idem-service state command to enforce the originally desired infrastructure state. This enforcement operation is used to correct infrastructure drift, where "infrastructure drift" means an unintended departure of the state of the infrastructure from the desired state due to intervening events or operations. By contrast, if the loop started at starting point 1906, then the output from the Idem-service describe command can be translated into SLS data that can be subsequently used to enforce the infrastructure state represented by the SLS data. Yet another possibility is that the infrastructure state represented by the describe-command output may be used to generate corresponding SLS data which can then be modified in order to generate a new infrastructure state. Thus, the fundamental control loop may continue to iterate in order to maintain the state of the infrastructure in a desired state, with modifications to the SLS-data blueprint or cloud template made to alter the infrastructure state in response to changing goals or conditions.

Figure 20:
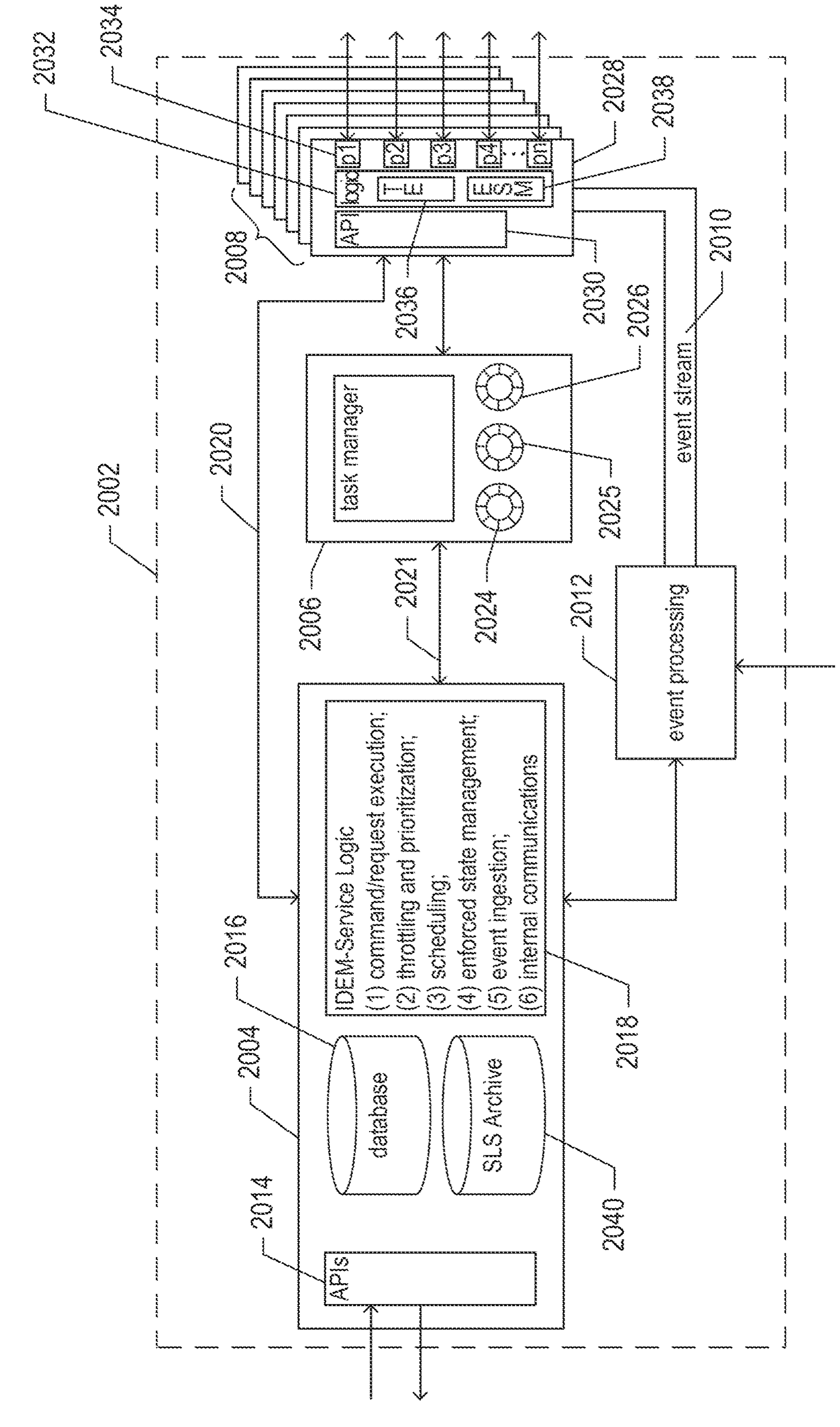
FIG. 20 illustrates one implementation of the Idem service.

FIG. 20 illustrates one implementation of the Idem service. The Idem service 2002 includes an Idem-service frontend 2004, a task manager 2006, multiple Idem-service workers 2008, with the number of Idem-service workers scalable to handle dynamic workloads, an event stream 2010, and an event-processing component 2012. The Idem-service frontend 2004 includes the previously discussed set of GraphQL APIs 2014 and a database 2016 for storing information related to managed infrastructure and received Idem requests and commands. The frontend additionally includes Idem-service logic 2018 that implements command/request execution, throttling and prioritization, scheduling, enforced-state management, event ingestion, and internal communications between the various components of the Idem service. Throttling involves managing the workload accepted by the Idem service to ensure that sufficient computational resources are available to execute received commands and requests. Prioritization involves prioritizing execution of received Idem commands and requests. Scheduling involves preemption of long-running Idem-command-and-request executions. Enforced-state management involves maintaining a current specified state of a particular cloud infrastructure managed by the Idem service. Event ingestion involves receiving, storing, and acting on events input to the Idem-service frontend by the event-processing component 2012. The various components of the Idem service communicate by message passing, as indicated by double-headed arrows 2020-2022. The task manager 2006 coordinates various stages of execution of Idem commands and requests using numerous task queues 2024-2026. Each Idem-service worker, such as Idem-service worker 2028, presents an Idem-service worker API 2030 and includes logic 2032 that implements Idem-command-and-request execution. Each Idem-service worker includes a set of one or more plug-ins, such as plug-in 2034, allowing the Idem-service worker to access the management interfaces of cloud-computing facilities on which infrastructure managed by the Idem service is deployed and configured. As they execute commands and requests, Idem-service workers publish events to the event stream 2010. These events are monitored and processed by the event-processing component 2012, which filters the events and forwards processed events to the Idem-service frontend. The logic 2032 that implements Idem-command-and-request execution includes task-execution logic 2036 and enforced-state-management logic 2038. The enforced-state-management logic cooperates closely with the Idem-service frontend 2004, which additionally includes an SLS archive 2040 that stores SLS data files submitted to the Idem service in support of state commands. The archive 2040 may also store additional information used for enforced-state management, The enforced-stat-management information may, in certain implementations, be stored in the archive, may be stored in database 2016 in other implementations, and may be partitioned between the archive and database in still other implementations. As with other components of the Idem service and system, specific mapping to underlying hardware components can vary, sometimes even dynamically for a particular implementation. As an example, the archive and the database may both be implemented on a single network-storage appliance, in certain implementations, or may be implemented in two different data-storage devices, in other implementations.

Although, as discussed above, an Idem service addresses many of the above-identified problems with current cloud-infrastructure management systems, including providing a common set of commands and requests that can be executed with respect to multiple different cloud providers and cloud-computing facilities as well as a common type of cloud template that can support commands and requests executed with respect to multiple different cloud providers and cloud-computing facilities, additional problems incompletely addressed by the Idem service included deficiencies in enforced-state management, including lack of features to ensure a logical ordering of state commands and enforce requests and effective features needed for guaranteeing persistence of information needed to enforce currently specified cloud-infrastructure states.

To resolve the problems mentioned in the preceding paragraph, and, in particular, to facilitate an orderly sequence state changes and enforcements of cloud-infrastructure state, the currently disclosed improved Idem service includes generation and persistence of enforced-state identifiers and enforced-state versions and input of enforced-state identifiers and enforced-state versions in association with state commands and enforce requests to ensure a properly ordered sequence of state commands and enforce requests. In addition, to facilitate persistence of information needed to enforce currently specified cloud-infrastructure states, the currently disclosed methods and the currently disclosed improved Idem service employees the SLS archive and stored state-enforcement-related information to facilitate execution of state commands and enforce requests.

Figure 21A:
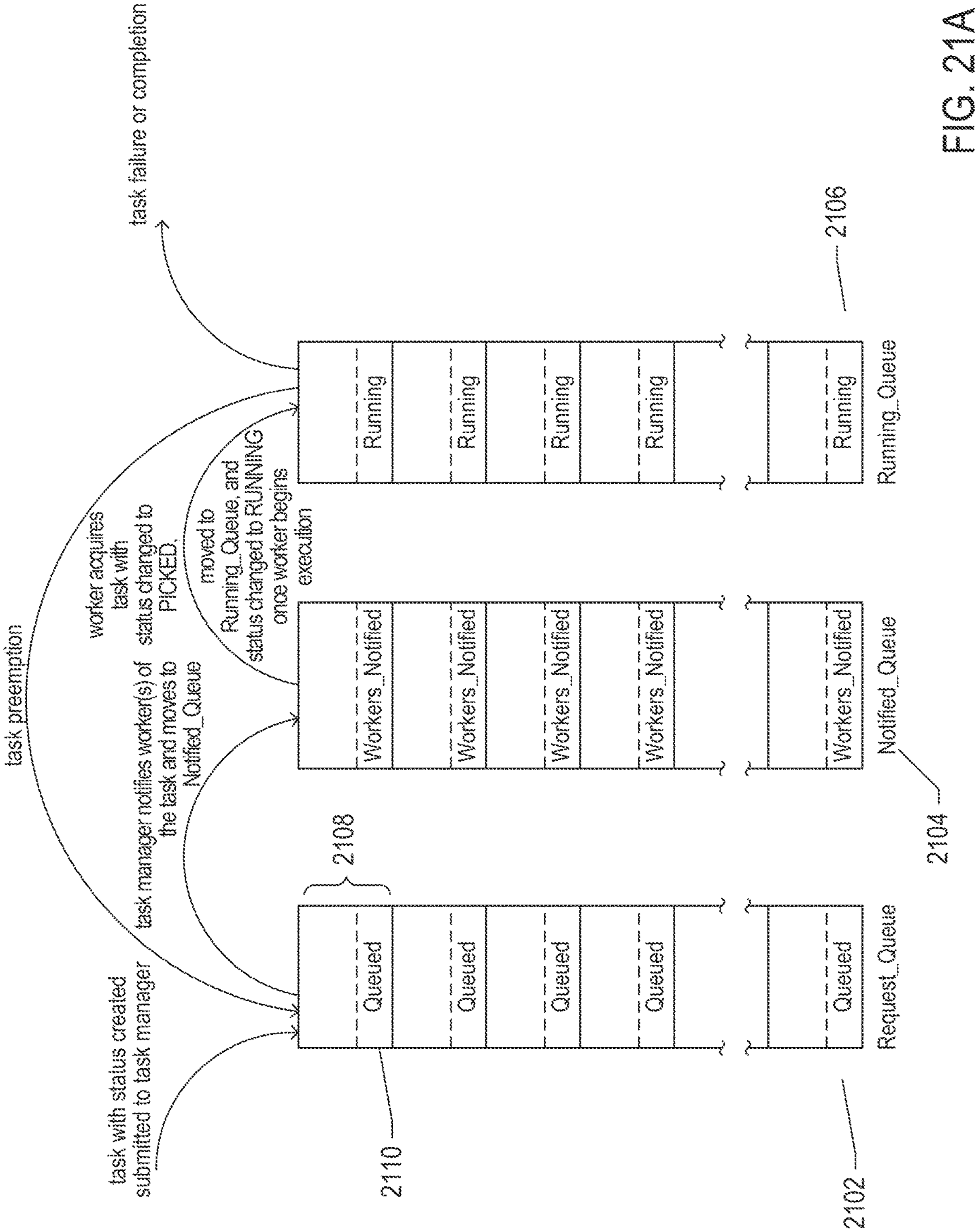
FIGS. 21A-C illustrates three task queues used by the task manager to manage execution of Idem-service commands and requests, data types used for enforced-state-management, and data stored and used for enforced-state-management.
Figure 21B:
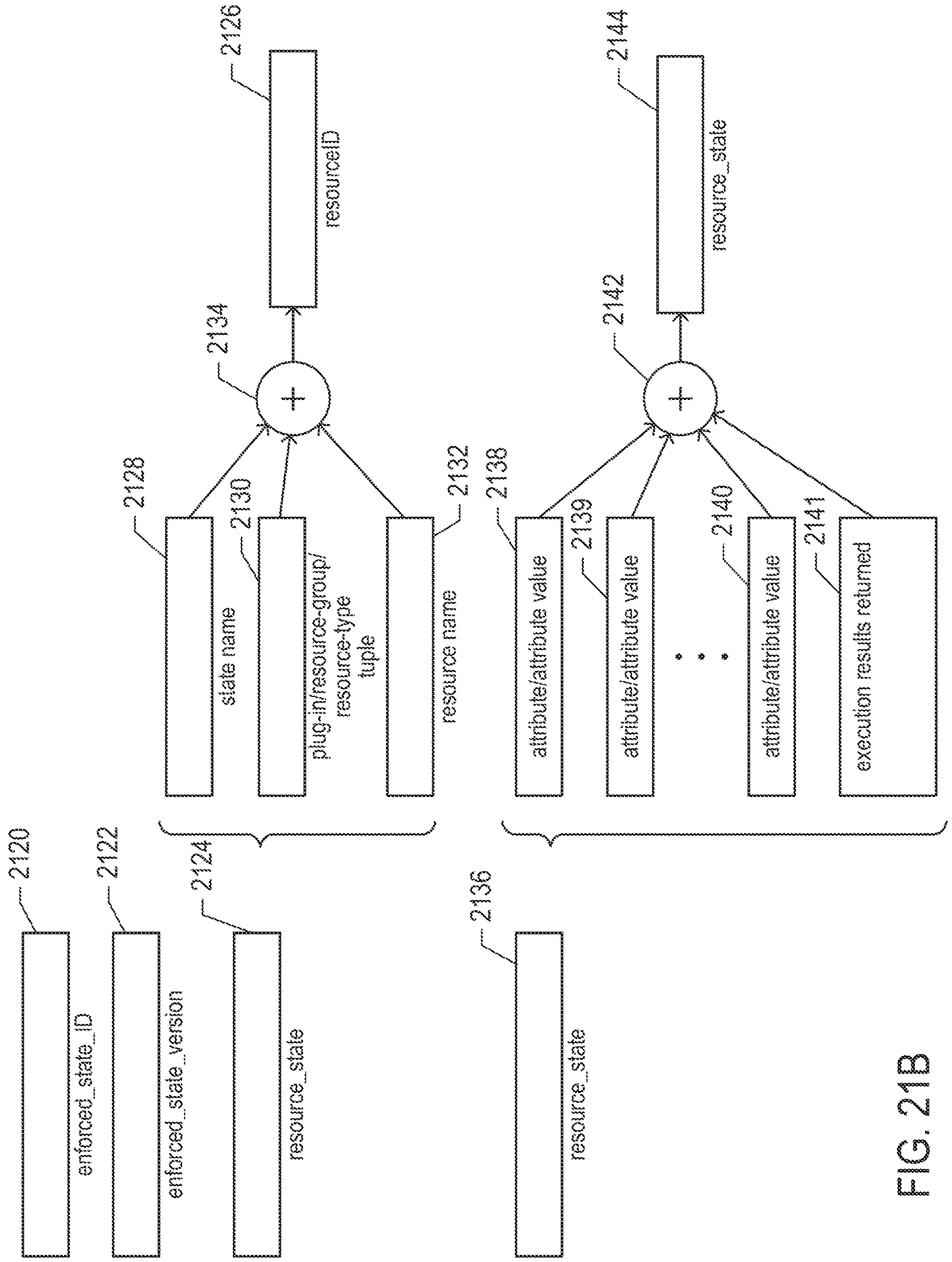
Figure 21C:
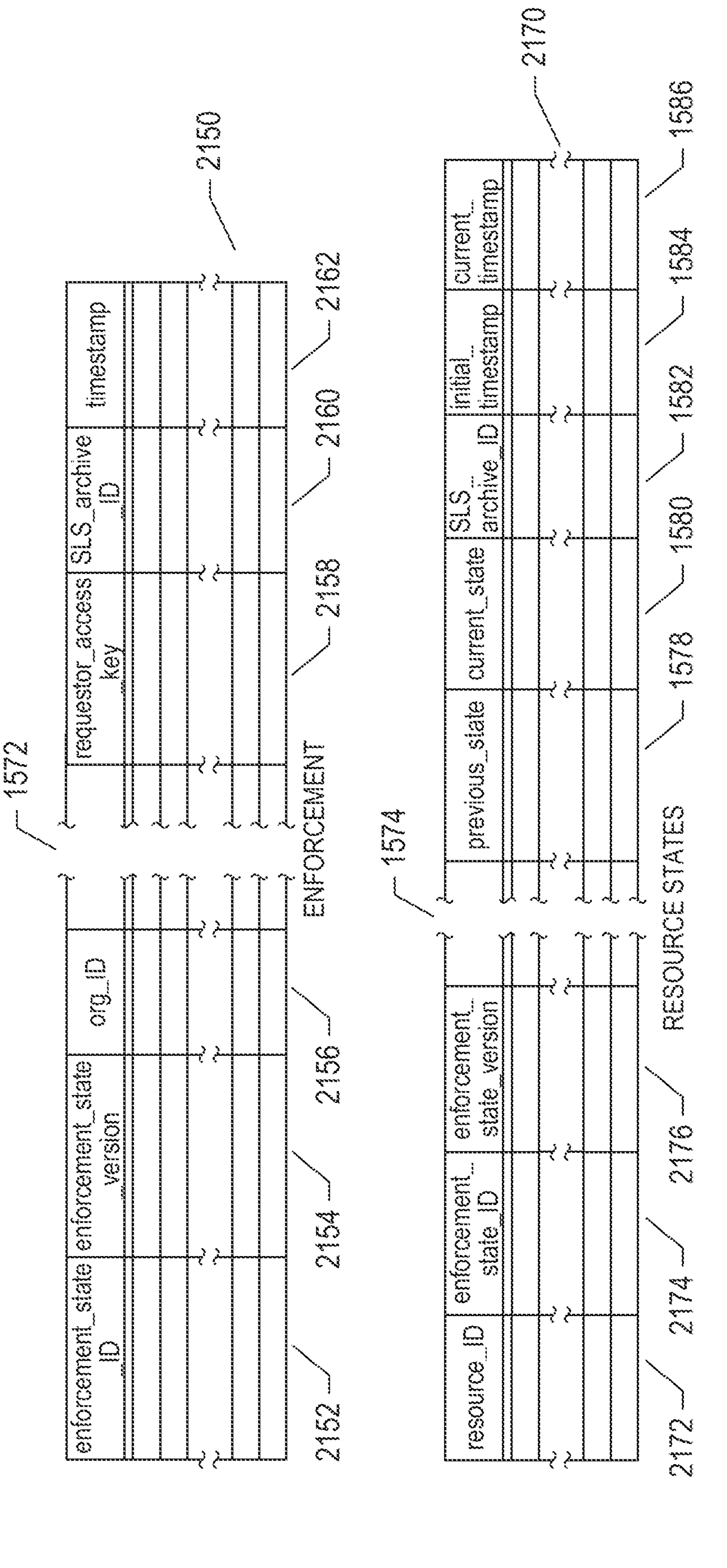

FIGS. 21A-C illustrates three task queues used by the task manager to manage execution of Idem-service commands and requests, data types used for enforced-state-management, and data stored and used for enforced-state-management. The three task queues 2102, 2104, and 2106 are represented by arrays of task data structures, such as task data structure 2108, each including a status field, such as status field 2110. A variety of different task-queue implementations may be used in various different implementations of the Idem service, including third-party queues such as those offered by Redis™. The first of the three task queues 2102 is referred to as the "Request_Queue." Tasks with fields containing the status Created submitted to the task manager by the Idem-service frontend are received by the task manager and input to the Request_Queue with status Queued. When execution resources are available, the task manager selects tasks currently residing on the Request_Queue for execution, notifies Idem-service workers that the tasks are available to the Idem-service workers for execution, removes the tasks from the Request_Queue, and queues the removed tasks to the Notified_Queue 2104 with status fields containing the status Workers_Notified. When an Idem-service worker accepts a task with status Workers_Notified for execution, the status associated with the task is changed to Picked and the task is removed from the Notified_Queue and queued to the Running_Queue 2106. When the Idem-service worker begins execution of the task, the status of the task is changed from Picked to Running. In certain implementations, when execution of the task takes longer than a threshold amount of time or consumes more than a threshold amount of computational bandwidth, execution of the task may be preempted, in which case the status of the task is changed back to Queued or, in certain implementations, Preempted, and the task is requeued to the Request_Queue for subsequent resumption of execution, allowing execution of another command or request. When execution of a task completes, the frontend receives a completion event and notifies the task manager, which removes the task from the Running_Queue.

FIG. 21B illustrates a number of datatypes associated with enforced-state management. The first datatype, enforced_state_ID 2120, is a unique identifier associated with an initial configuration and deployment of cloud infrastructure via a state command and with subsequent updates and modifications of the cloud infrastructure and subsequent enforce requests made with respect to the cloud infrastructure. The second datatype, enforced_state_version 2122, is a version number that is assigned the value 1 for an initial configuration and deployment of cloud infrastructure and that monotonically increases with each subsequent state command or enforce request executed with respect to the cloud infrastructure. The third datatype, resourceID 2124, is a unique identifier for each resource specified in one or more SLS data files that together specify cloud infrastructure that is deployed and configured by the Idem service. In one implementation of the currently disclosed methods and improved Idem service, a unique resourceID 2126 is generated for a resource by combining the state name for the resource 2128, the plug-in/resource-group/resource-type tuple included in a directive within the specification for the resource 2130, and the value of a resource-name attribute 2132 specified for the resource, such as the state name "vpc-item-test" 1808, plug-in/resource-group/resource-type tuple "aws.cc2.vpc" 1810, and the value "vpc-idem-demo" for tag "Name" 1814 shown in FIG. 18A. The disk with "+" symbol 2134 represents a combination operation. The combination operation may carry out a combination of the state name, plug-in/resource-group/resource-type tuple, and resource name by string operations, other types of combinations that use portions of the state name, plug-in/resource-group/resource-type tuple, and resource name, or even the generation of a hash value using a combination of all or portions of the state name, plug-in/resource-group/resource-type, and resource name as input to a hash-generation function. The fourth datatype, resource_state 2136, is generated as a particular attribute/attribute-value pair or a combination of multiple attribute/attribute-value pairs 2138-2141 selected from the resource specification via an operation 2142, similar to above-discussed combination operation 2134, which produces a unique resource_state 2144 for a particular resource specified in an SLS data file.

FIG. 21C shows several relational-database tables that represent one implementation of database-stored enforced-state-management information used by the currently disclosed improved Idem service for persisting enforced-state-management information. Each row in the table Enforcement 2150 represents enforced-state-management information for a state command or enforce request executed with respect to particular deployed-and-configured infrastructure specified in a bundle of one or more SLS data files. Each row contains multiple fields, each represented by a column in the table Enforcement. The fields include: (1) enforced_state_ID 2152, a unique enforced_state_ID that identifies particular deployed-and-configured infrastructure specified in a bundle of one or more SLS data files submitted in a state command; (2) enforced_state_version 2154, a version number that increases with each subsequent state command or enforce request directed to the cloud infrastructure identified by the enforced_state_ID in the first field, or column; (3) org_ID 2156, an identifier for an organization associated with the cloud infrastructure identified by the enforced_state_ID in the first field or column; (4) requester_access_key 2158, an access credential for the requesting user submitting a state command or enforce request for the cloud infrastructure identified by the enforced_state_ID in the first field or column; (5) SLS_archive_ID 2160, an identifier for the SLS data files used to initially deploy and configure the cloud infrastructure or to subsequently modify the cloud infrastructure; and (6) timestamp 2162, a date and time associated with the state command or enforce request represented by the row, or entry in the Enforcement table. Each row of the Resource States table 2170 represents enforced-state-management information associated with a particular resource. The fields of the entries in the Resource States table include: (1) resource_ID 2172, a resourceID that uniquely identifies a resource; (2) enforced_state_ID 2174, the enforced_state_ID that identifies the enforced-state-management information; (3) enforced_state_version 2176, the enforced-state-version number of the enforced-state-management information represented by a row in the Resource States table; (4) previous_state 1578, an instance of the resource_state datatype that represents the most recent previous state of the resource; (5) current_state 1580, the current state of the resource; (6) SLS_archive_ID 1582, an identifier for the SLS data files that include the specification of the resource; (7) initial_timestamp 1584, the first timestamp associated with the deployment and configuration of the resource; and (8) current_timestamp 1586, a timestamp associated with the most recent state command or enforce request associated with the resource. The broken columns 1572 and 1574 in the Enforcement and Resource States tables indicate that additional fields may be included in various implementations.

Figure 22A:
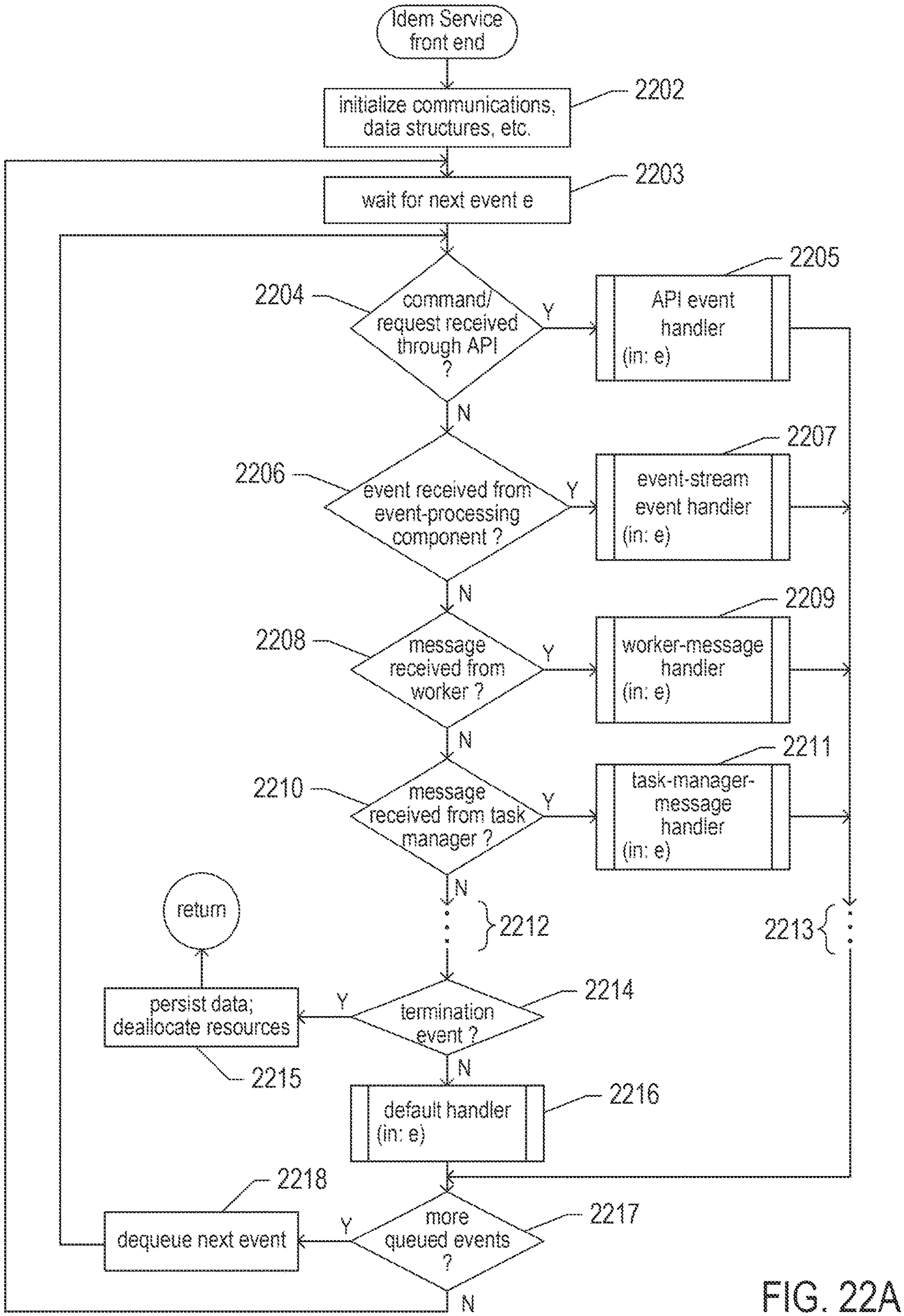
FIGS. 22A-G provide control-flow diagrams illustrating one implementation of the Idem-service frontend.

FIGS. 22A-G provide control-flow diagrams illustrating one implementation of the Idem-service frontend (2004 in FIG. 20). FIG. 22A provides a control-flow diagram for an event loop that underlies implementation of the Idem-service frontend. In step 2202, the Idem-service frontend initializes communications with other components of the Idem service and communications with external entities, initializes the data structures used by the Idem-service frontend, and initializes other computational resources. In step 2203, the Idem-service frontend waits for the occurrence of a next event e. When the next occurring event e represents reception of a command or request through one of the GraphQL APIs, as determined in step 2204, an API event handler is called in step 2205. When the next occurring event is reception of an event from the event-processing component (2012 in FIG. 20), as detected in step 2206, an event-stream event handler is called in step 2207. When the next occurring event is reception of a message from an Idem-service worker, as determined in step 2208, a worker-message handler is called in step 2209. When the next occurring event is reception of a message from the task manager, as determined in step 2210, a task-manager-message handler is called in step 2211. Ellipses 2212-2213 indicate that the event loop may detect and handle additional types of events. When the next occurring event is a termination event, as determined in step 2214, the Idem-service frontend persists in-memory data that needs to be stored for subsequent operations and deallocates computational resources, in step 2215, before termination of the event loop. A default handler 2216 handles any rare and unexpected events. When there are more events queued for handling, as determined in step 2217, a next event is dequeued, in step 2218, and control returns to step 2204 for handling the next event. Otherwise, control returns to step 2203 where the Idem-service frontend waits for the occurrence of a next event.

Figure 22B:
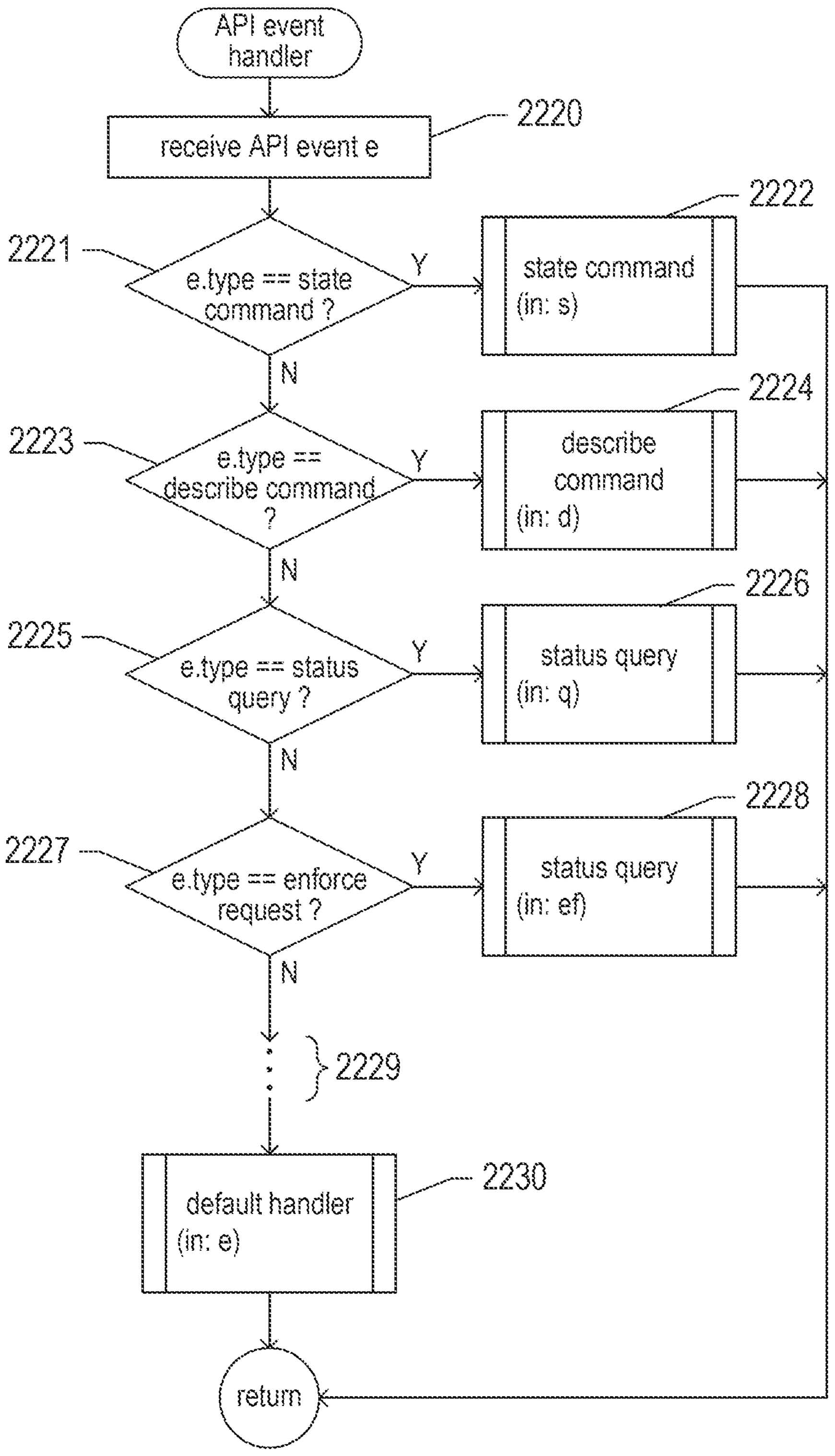

FIG. 22B provides a control-flow diagram for the API event handler called in step 2205 of FIG. 22A. In step 2220, the API event handler receives an event e representing reception of a command or request through the Idem-service management interface. When the event e represents reception of an Idem-service state command, as determined in step 2221, a routine “state command” is called in step 2222. When the event e represents reception of an Idem-service describe command, as determined in step 2223, a routine “describe command” is called in step 2224. As discussed above, the Idem-service describe command returns information about existing infrastructure to the requester. When the event e represents reception of a status query, as determined in step 2225, the routine “status query” is called in step 2226. The Idem service responds to status queries by accessing stored events reported to the Idem-service frontend by the event-processing component (2012 in FIG. 20). When the event e represents reception of an enforce request, as determined in step 2227, the routine “in force request” is called in step 2228. Ellipsis 2229 indicates that additional types of events may be handled by the API event handler. A default handler 2230 handles any rare and unexpected events.

Figure 22C:
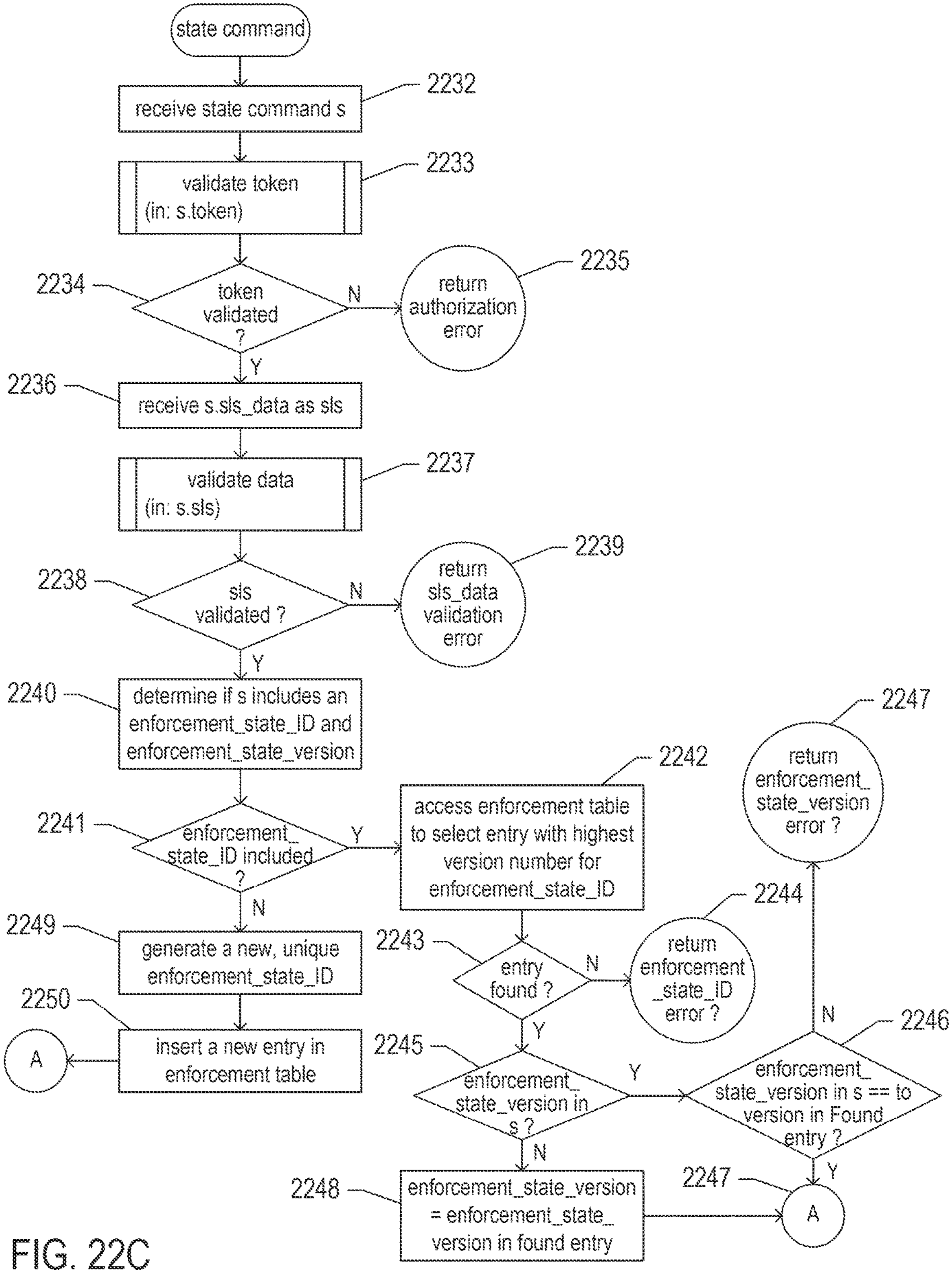
Figure 22D:
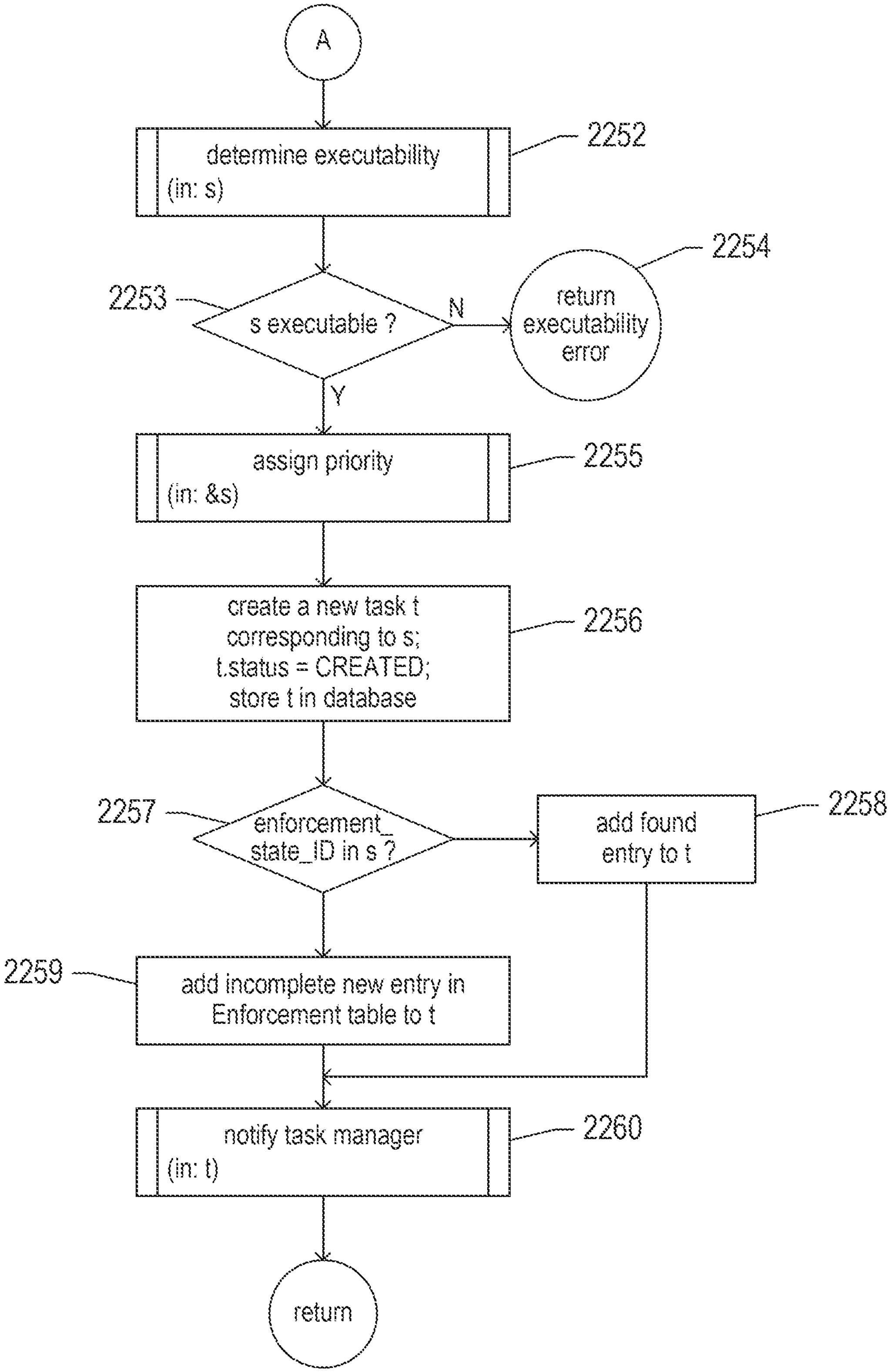

FIGS. 22C-D provide a control-flow diagram for the routine “state command,” called in step 2222 of FIG. 22B. In step 2232, the routine “state command” receives an Idem-service state command s. In step 2233, the routine “state command” calls a routine “validate token” to validate the authentication/authorization token referenced by the Idem-service state command s. When validation of the token fails, as determined in step 2234, the routine “state command” returns an authorization error, in step 2235. Otherwise, in step 2236, the routine “state command” receives a reference sls to the SLS-data file or files referenced from the Idem-service state command s. In step 2237, the routine “state command” calls a routine “validate data” to validate the SLS-data file or files referenced by the reference sls. When validation of the SLS-data file or files referenced by the reference sls fails, as determined in step 2238, the routine “state command” returns an SLS-data-validation error, in step 2239. By invalidating the received SLS-data file or files, the routine “state command” can reject the received Idem-service state command immediately, rather than waiting for execution of the received Idem-service state command to fail after wasting time and computational resources to initiate execution of the received Idem-service state command. Otherwise, in step 2240, the routine “state command” determines whether or not the received state command s includes an enforced_state_ID and an enforced_state_version. When the received state command includes an enforced_state_ID, as determined in step 2241, the received state command represents a modification or update to the infrastructure associated with the enforced_state_ID included in the received state command s. The routine “state command” accesses the Enforcement table, discussed above with reference to FIG. 21C, to select an entry containing the enforced_state_ID included in the received state command and containing the highest enforced_state_version value for any entry containing the enforced_state_ID included in the received state command. When such an entry is not found, as determined in step 2243, the routine “state command” returns an enforced_state_ID error, in step 2244. Otherwise, as determined in step 2245, when the received state command fails to include an enforced_state_version, the routine “state command” sets a local variable enforced_state_version to the enforced_state_version value found in the entry from the Enforcement table selected in step 2242, after which control flows to step 2252 in FIG. 22D. When the received state command includes an enforced_state_version, that enforced_state_version is compared to the enforced_state_version value contained in the entry selected in step 2242. When the two values are not equal, as determined in step 2246, the routine “state command” returns an enforced_state_version error, in step 2247. Otherwise, control flows to step 2252 in FIG. 22D. When the received state command does not include an enforced_state_ID, as determined in step 2241, the received state command represents a first deployment and configuration of the cloud infrastructure specified in the SLS data file or SLS data files associated with the received state command. The routine “state command” generates a new, unique enforced_state_ID, in step 2249, and then inserts a new entry in the Enforcement table for the received state command, in step 2250, after which control flows to step 2252 in FIG. 22D. In step 2252, the routine “state command” determines whether the received Idem-service state command is currently executable by calling a routine “determine executability." When the routine "determine executability" returns an indication that the routine is not currently executable, as determined by the routine "state command" in step 2253, the routine "state command" carries out a throttling operation by returning an executability error, in step 2254. Otherwise, in step 2255, the routine "state command" calls a routine "assign priority" to assign a priority to the received Idem-service state command. This is an example of the above-discussed prioritization of received commands and requests. The Idem-service frontend may choose to prioritize execution of certain received commands and requests in preference to other received commands and requests. For example, commands and requests issued by automated management systems that are currently managing infrastructure may be given priority over commands and requests issued by development organizations that are developing and testing automated management systems. In step 2256, the routine "state command" creates a new task t corresponding to the received Idem-service state command s, sets the status field of the new task t to Created, and stores the newly created task t in the frontend database (2016 in FIG. 20). When the received state command s contains an enforced_state_ID, as determined in step 2257, the entry selected from the table Enforcement, in step 2242, is added to the new task t, in step 2258. Otherwise, the incomplete new entry added to the Enforcement table in step 2250 is added to task t in step 2259. Finally, in step 2259, the routine "state command" calls a routine "notify task manager" to notify the task manager that the newly created task t is available for execution.

By requiring that state commands include enforced_state_ID values when they are used to update or modify existing cloud infrastructure and that enforce requests include enforced_state_ID values, and by generating a new enforced_state_ID for newly deployed and configured infrastructure as a result of executing a state command that doesn't contain an enforced_state_ID, the improved Idem service enforces a logical sequence of infrastructure creation, modification, and enforcement operations. By persisting enforced-management data in the Enforcement and Resource States tables, the Idem service can carry out a number of additional operations, including auditing sequences of state modifications and state enforcements, enforcing consistency in modifications and state enforcements, ensuring that state commands and enforce requests that might violate the logical sequence of state modifications and state enforcements or conflict with current infrastructure configurations are not executed, and many other operations. The improved Idem service can also quickly and efficiently determine the current specifications for each resource in each cloud infrastructure managed by the Idem service.

Other types of Idem-service commands and requests may be handled by other routines similar to the routine "state command." illustrated in FIGS. 22C-D. Because the current document is focused on implementation of the Idem service and, in particular, to the task queues and use of the task queues by the task manager, details for processing of other types of commands and requests are not described in the current document. The Idem-service state command is, in many ways, the most fundamental of Idem-service commands and requests and represents a good example for illustrating operation of the Idem service and use of task queues by the task manager.

Figure 22E:
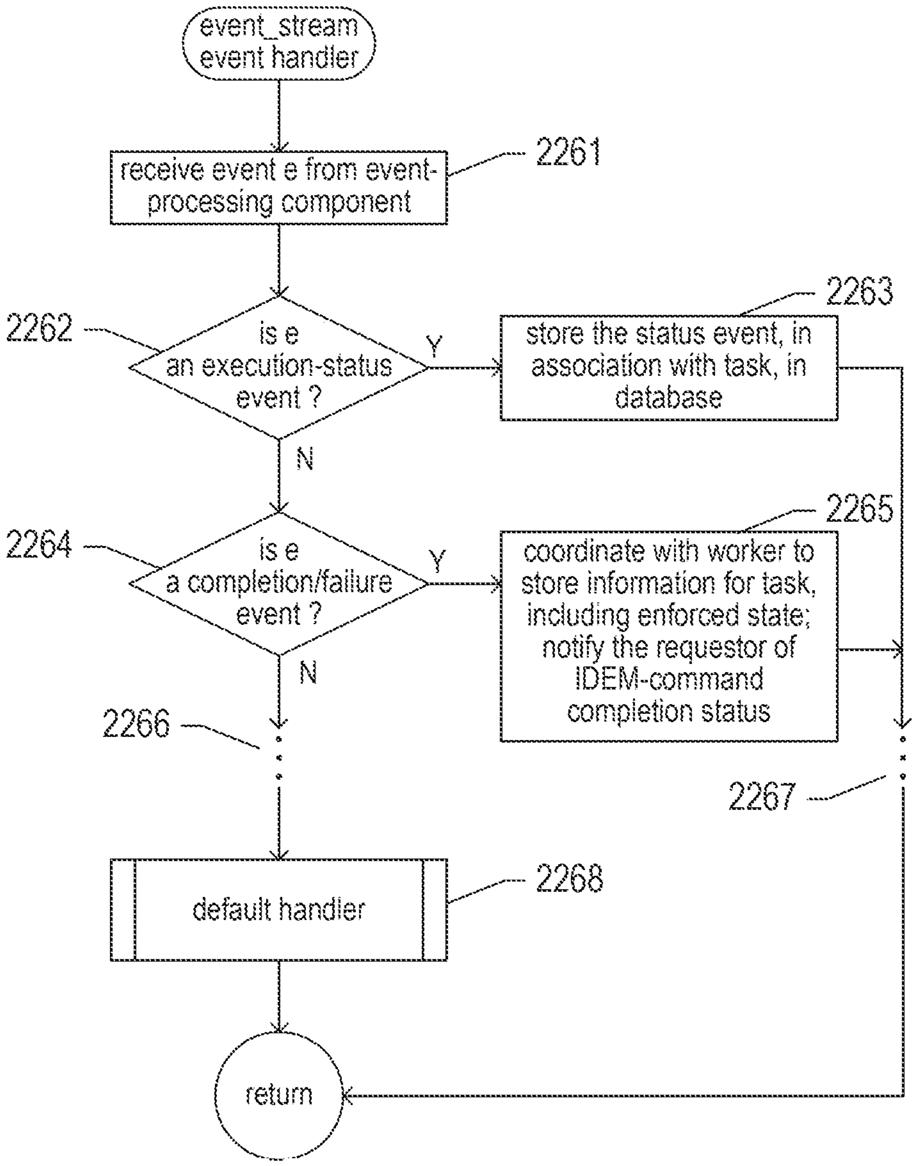

FIG. 22E provides a control-flow diagram for the routine "event-stream event handler." called in step 2207 of FIG. 22A. In step 2261, the routine "event-stream event handler" receives an event from the event-processing component (2012 in FIG. 20) of the Idem service. When the received event is an execution-status event published by an Idem-service worker, as determined in step 2262, the routine "event-stream event handler" stores the event in association with an indication of the executing task in the database (2016 in FIG. 20), and step 2263. Otherwise, when the received event is a task-execution completion event or a task-execution failure event, as determined in step 2264, the routine "event-stream event handler." in step 2265, coordinates with the Idem-service worker executing the event to store information for the task, including the currently enforced state of the infrastructure to which the command was directed, in the frontend database, and notifies the requesting individual, organization, or automated management system of the completion or failure status of the command. Ellipses 2266 and 2267 indicate that other types of events may be handled by the routine "event-stream event handler." A default handler 2268 handles any rare or unexpected events.

Figure 22F:
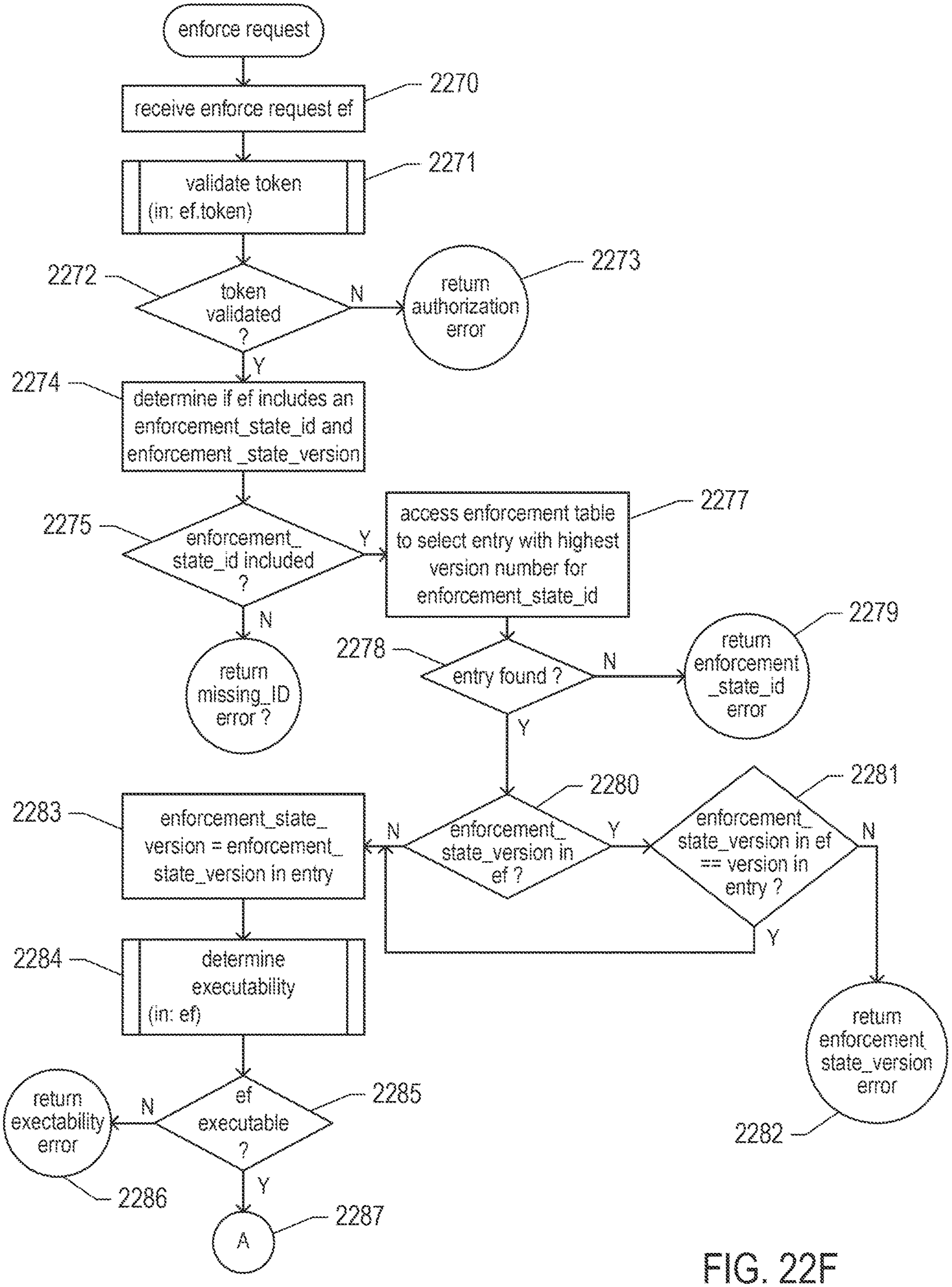
Figure 22G:
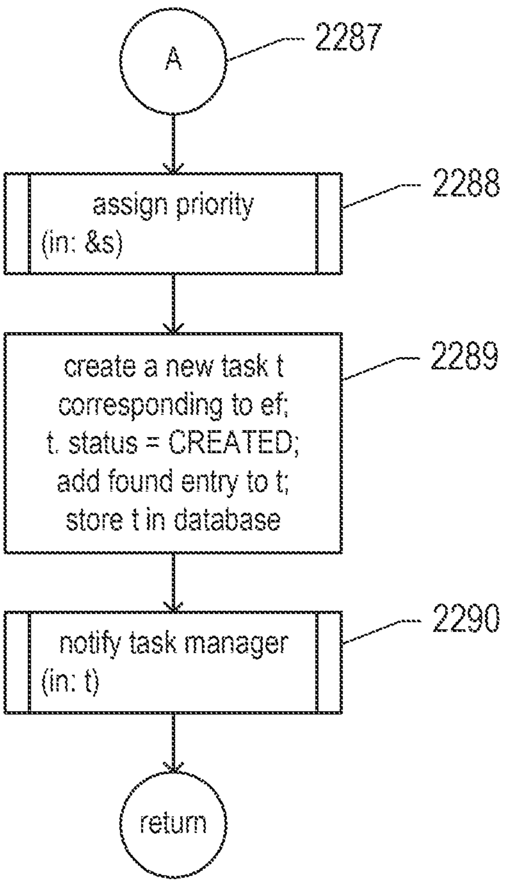

FIGS. 22F-G provide a control-flow diagram for the routine "enforce request." called in step 2228 of FIG. 22B. In step 2270, the routine "enforce request" receives an Idem-service enforce request ef. In step 2271, the routine "enforce request" calls a routine "validate token" to validate the authentication/authorization token referenced by the Idem-service enforce request ef. When validation of the token fails, as determined in step 2272, the routine "enforce request" returns an authorization error, in step 2273. Otherwise, in step 2274, the routine "enforce request" determines whether or not the received enforce request ef includes an enforced_state_ID and an enforced_state_version. When the received enforce request includes an enforced_state_ID, as determined in step 2275, the routine "enforce request," in step 2277, accesses the Enforcement table, discussed above with reference to FIG. 21C, to select an entry containing, in the first field of the entry, the enforced_state_ID and containing the highest enforced_state_version value of any entry containing the enforced_state_ID contained in the received enforce request. When such an entry is not found, as determined in step 2278, the routine "enforce request" returns an enforced_state_ID error in step 2279. Otherwise, as determined in step 2280, when the received state command fails to include an enforced_state_version, the routine "enforce request" sets a local enforced_state_version variable to the enforced_state_version number found in the selected entry from the Enforcement table, in step 2283, after which control flows to step 2284. When the received enforce request includes an enforced_state_version, that enforced_state_version is compared to the enforced_state_version value contained in the entry found in step 2277. When the two values are not equal, as determined in step 2281, the routine "enforce request" returns an enforced_state_version error, in step 2282. Otherwise, control flows to step 2283. When the received enforce request does not include an enforced_state_ID, as determined in step 2275, the routine "enforce request" returns a missing_ID error, in step 2276. In step 2284, the routine "enforce request" determines whether the received Idem-service state command is currently executable by calling a routine "determine executability." When the routine "determine executability" returns an indication that the routine is not currently executable, as determined by the routine "enforce request" in step 2285, the routine "enforce request" carries out a throttling operation by returning an executability error, in step 2286. Otherwise, in step 2288 in FIG. 22G, the routine "enforce request" calls a routine "assign priority" to assign a priority to the received Idem-service enforce request. In step 2289, the routine "enforce request" creates a new task t corresponding to the received Idem-service enforce request ef, sets the status field of the new task t to Created, and stores the newly created task t in the frontend database (2016 in FIG. 20). Finally, in step 2290, the routine "enforce request" calls a routine "notify task manager" to notify the task manager that the newly created task t is available for execution.

Figure 23A:
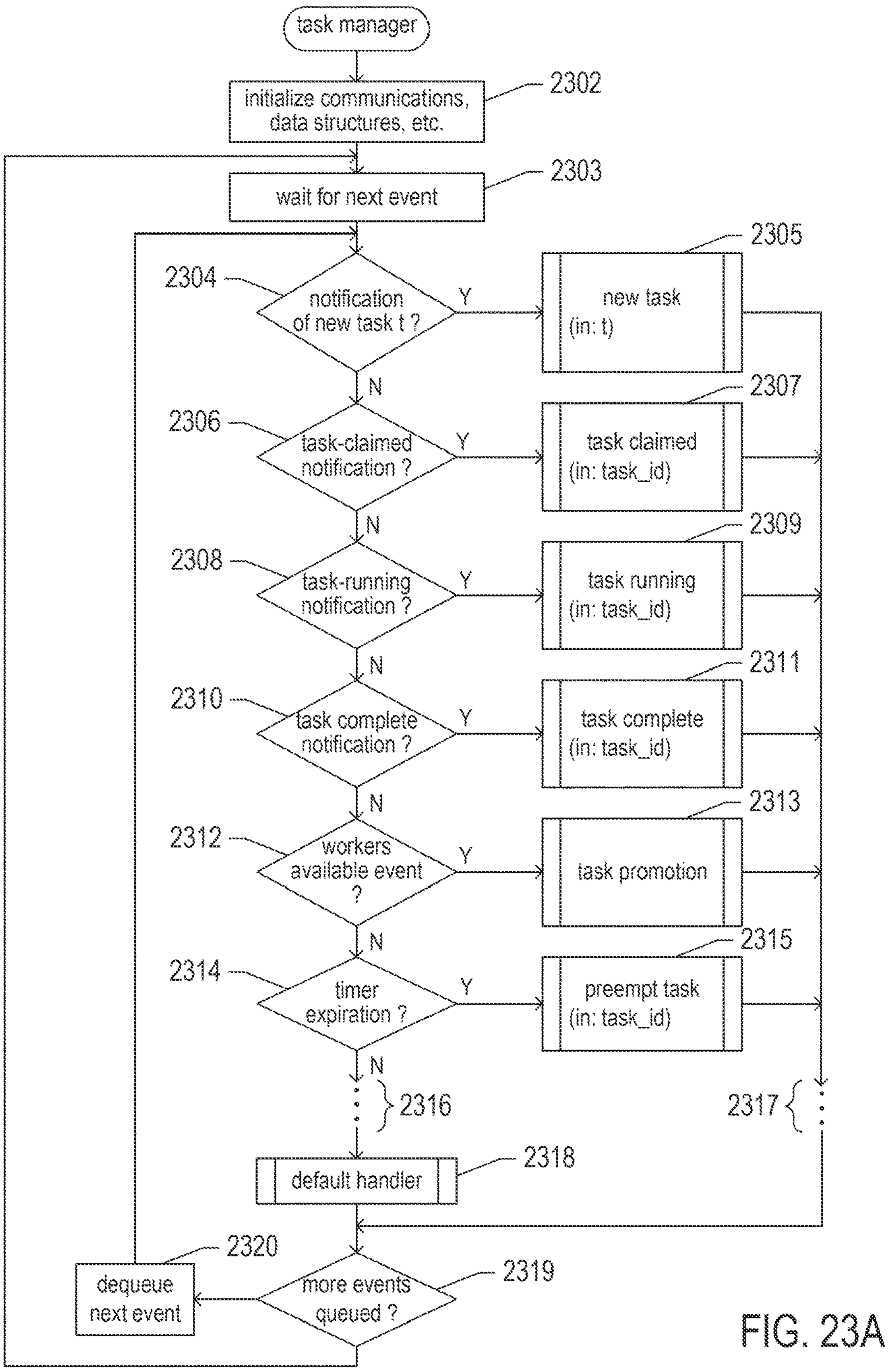
FIGS. 23A-H provides control-flow diagrams that illustrate one implementation of the task-manager component of the currently disclosed Idem service.

FIGS. 23A-H provides control-flow diagrams that illustrate one implementation of the task-manager component of the currently disclosed Idem service. FIG. 23A provides a control-flow diagram for an event loop underlying implementation of the task manager, similar to the event loop of FIG. 22A. In step 2302, the task manager initializes communications, data structures, and other computational resources needed for execution. Then, in step 2303, the task manager waits for a next event to occur. When the next occurring event is notification of a new task t available for execution, as determined in step 2304, a routine "new task" is called in step 2305 to process the new task t. Otherwise, when the next occurring event is notification of a task being claimed for execution by an Idem-service worker, as determined in step 2306, a routine "task claimed" is called in step 2307. Otherwise, when the next occurring event is a received notification that an Idem-service worker has begun executing a task, as determined in step 2308, a routine "task running" is called in step 2309. Otherwise, when the next occurring event is a notification of a task completion, as determined in step 2310, the routine "task complete" is called in step 2311. Otherwise, when the next occurring event is a workers-available event, as determined in step 2312, a routine "task promotion" is called in step 2313. When the next occurring event is a timer-expiration event, as determined in step 2314, a routine "preempt task" is called in step 2315. Ellipses 2316 and 2317 indicate that additional types of events may be handled by the task-manager event loop, including several discussed below. A default handler 2318 is called to handle any rare or unexpected events. When more events have been queued for handling, as determined in step 2319, a next event is dequeued in step 2320 and control returns to step 2304 for handling the next event. Otherwise, control flows back to step 2303 where the task manager waits for the occurrence of a next event.

Figure 23B:
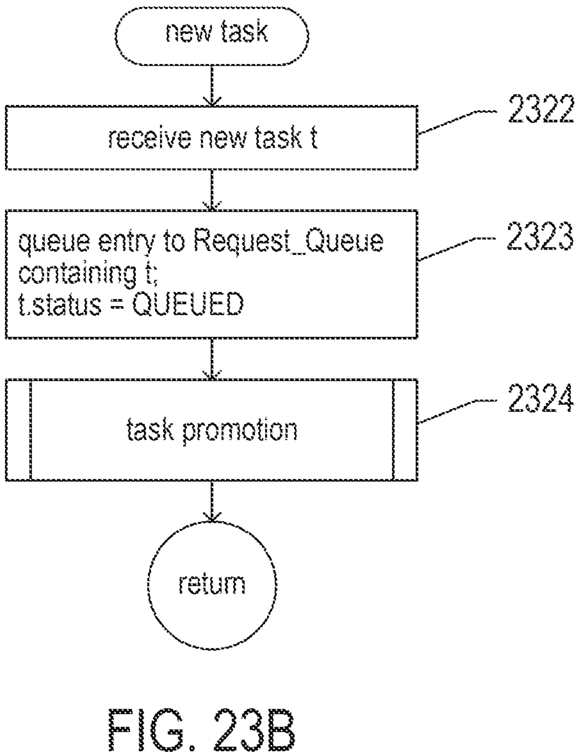

FIG. 23B provides a control-flow diagram for the routine "new task," called in step 2305 of FIG. 23A. In step 2322, the routine "new task" receives an indication t of a new task available for execution. In step 2323, the routine "new task" queues an entry to the Request_Queue containing the new task t. Finally, in step 2324, the routine "new task" calls the routine "task promotion," discussed below, in which the task manager determines whether or not to initiate execution of a task waiting for execution on the Request_Queue.

Figure 23C:
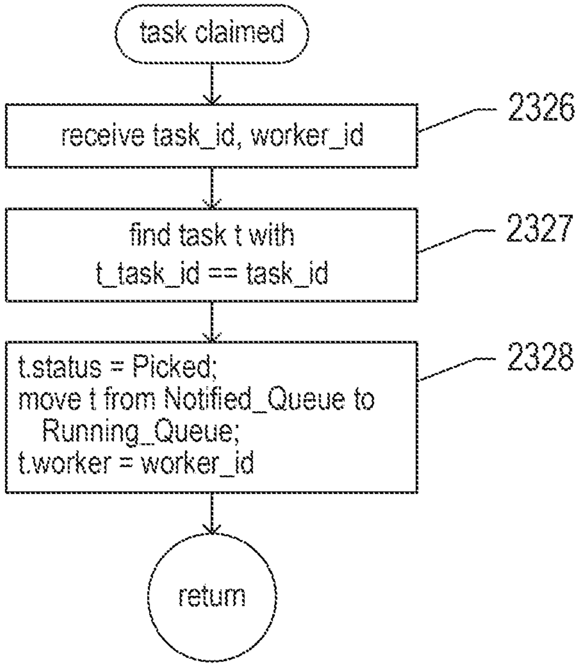

FIG. 23C provides a control-flow diagram for the routine "task claimed." called in step 2307 of FIG. 23A. In step 2326, the routine "task claimed" receives a task identifier, task_id, and a worker identifier, worker_id. In step 2327, the routine "task claimed" finds a task t in the Request_Queue with the field t.task_id containing the received task identifier. In step 2328, the routine "task claimed" sets the status field of the task t to Picked, moves the task t from Notified_Queue to Running_Queue, and stores the received worker identifier into the field worker within task t.

Figure 23D:
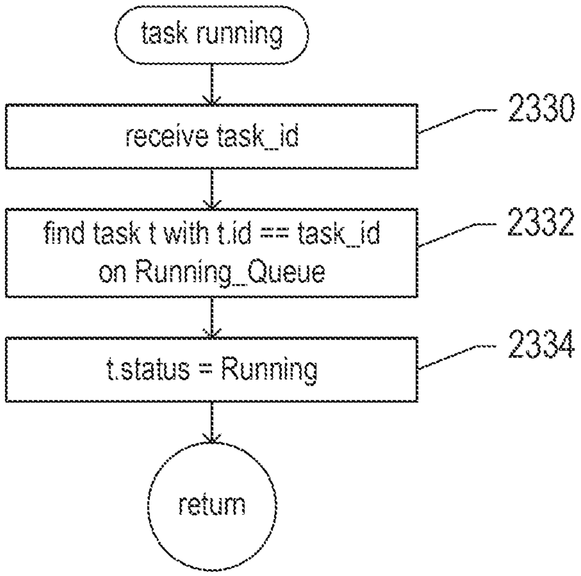

FIG. 23D provides a control-flow diagram for the routine "task running." called in step 2309 of FIG. 23A. In step 2330, the routine "task running" receives a task identifier task_id. In step 2332, the routine "task running" finds a task t in the Running_Queue with the field t.task_id containing the received task identifier. In step 2334, the routine "task running" sets the value of the status field of task t to Running.

Figure 23E:
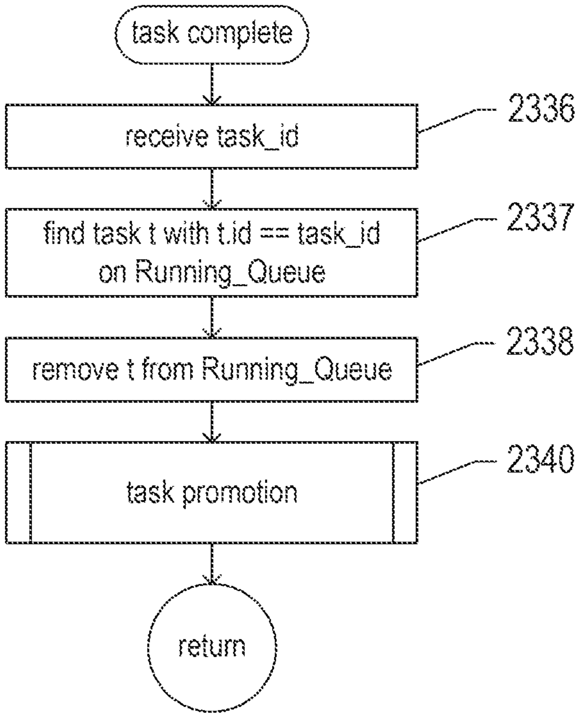

FIG. 23E provides a control-flow diagram for the routine "task complete." called in step 2311 of FIG. 23A. In step 2336, the routine "task complete" receives a task identifier task_id. In step 2337, the routine "task complete" finds a task t in the Running_Queue with the field t.task_id containing the received task identifier. In step 2338, the routine "task complete" removes task t from the Running_Queue. Finally, in step 2340, the routine "task complete" calls the routine "task promotion."

Figure 23F:
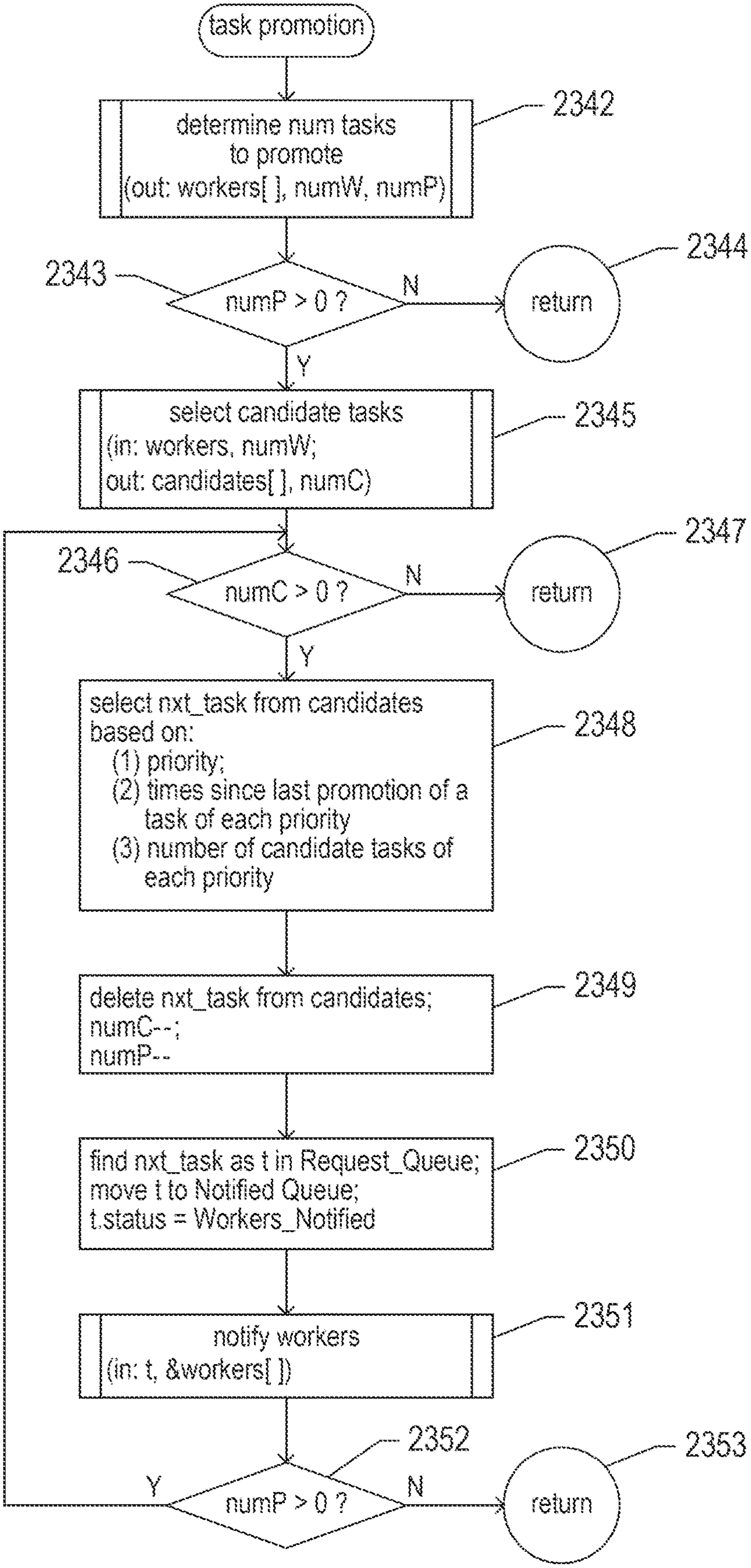

FIG. 23F provides a control-flow diagram for the routine "task promotion," called in step 2313 of FIG. 23A and in various handlers called in the event loop of FIG. 23A. In step 2342, a routine is called to determine the number of tasks to promote from the state Queued to the state Workers_Notified. This determination is based on the number of available Idem-service workers, available computational resources, and other such factors. The routine returns a list of available Idem-service workers workers[ ], an indication of the number of Idem-service workers in the list, numW, and the number of tasks to promote, numP. In step 2343, the routine "task promotion" determines whether the number of Idem-service workers to promote, numP, is greater than 0. If not, the routine "task promotion" returns in step 2344. Otherwise, in step 2345, the routine "task promotion" calls a routine to select candidate tasks from the Request_Queue, which are returned in the list candidates[ ] along with an indication of the number of candidates in the list, numC. When there are no candidate tasks for promotion, as determined in step 2346, the routine "task promotion" returns, in step 2347. Otherwise, in step 2348, the routine "task promotion" selects a next task nxt_task from the candidate tasks for execution based on the priorities of the candidate tasks, the amount of time since the last promotion of a task of each priority, and the number of candidate tasks of each priority, among other factors. In step 2349, the routine "task promotion" deletes the selected task from the list candidates and decrements numC and numP. In step 2350, the routine "task promotion" finds the task nxt_task in the Request_Queue, moves the next task to the Notified_Queue, and sets the status of the task to Workers_Notified. In step 2351, the routine "task promotion" calls a routine "notify workers" to notify the Idem-service workers of the availability of the selected task for execution. When the number of tasks to promote, numP, is greater than 0, as determined in step 2352, control flows back to step 2346. Otherwise, the routine "task promotion" returns, in step 2253.

Figure 23G:
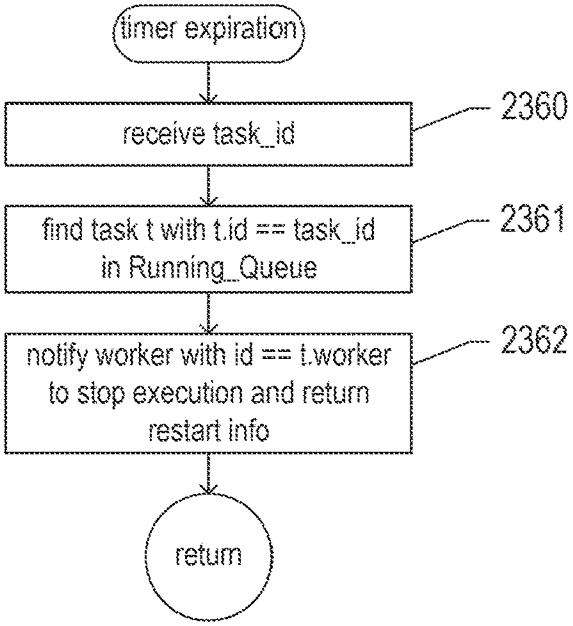

FIG. 23G provides a control-flow diagram for the routine "timer expiration," called from the event loop shown in FIG. 23A in an additional step represented by ellipses 2316-1327. In step 2360, the routine "timer expiration" receives a task identifier task_id. In step 2361, the routine "timer expiration" finds a task t in the Running_Queue with the field t.task_id containing the received task identifier. In step 2362, the routine "timer expiration" notifies the Idem-service worker with worker identifier equal to t.worker that the Idem-service worker should stop execution of the task currently executed by the Idem-service worker and return restart information to the task manager. Thus, in the currently disclosed implementation, when a timer associated with an executing task expires, the executing task is preempted.

Figure 23H:
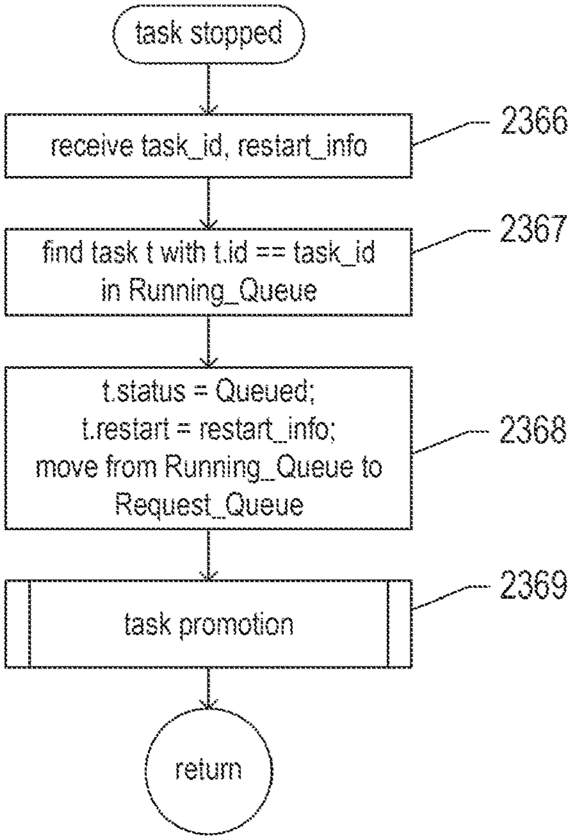

FIG. 23H provides a control-flow diagram for the routine "task stopped." called from the event loop shown in FIG. 23A in an additional step represented by ellipses 2316-1327. In step 2366, the routine "timer stopped" receives a task identifier task_id. In step 2367, the routine "timer stopped" finds a task t in the Running_Queue with the field t.task_id containing the received task identifier. In step 2368, the routine "task stopped" sets the status field of task t to Queued, sets the restart field of task t to an address or other type of reference to restart information for the task, and moves the task from the Running_Queue to the Request_Queue. Finally, in step 2369, the routine "task promotion" is called.

FIGS. 24A-D provide control-flow diagrams for one implementation of an Idem-service worker (2028 in FIG. 20). In step 4402, the Idem-service worker initializes communications, data structures, and other computational resources. In step 2403, the Idem-service worker carried out a handshake with the task manager to exchange information about the Idem-service worker's capabilities and computational resources. In step 2404, the Idem-service worker waits for the occurrence of a next event. The next occurring event is a notification of the availability of a task for execution, as determined in step 2405, a routine "task notification" is called in step 2406. Otherwise, when the next occurring event is a task-preemption notification, as determined in step 2407, a routine "task preemption" is called in step 2408. Otherwise, when the next occurring event is an execution-data-availability event, as determined in step 2409, the routine "execution data" is called in step 2410. Ellipses 2411 and 2412 indicate that other types of events may be handled by the worker event loop. A default handler is called, in step 2413, to handle any rare and unexpected events. When there are more events queued for handling, as determined in step 2414, a next event is dequeued, in step 2415, and control flows back to step 2405. Otherwise control flows back to step 2404, where the Idem-service worker waits for the occurrence of a next event.

Figure 24A:
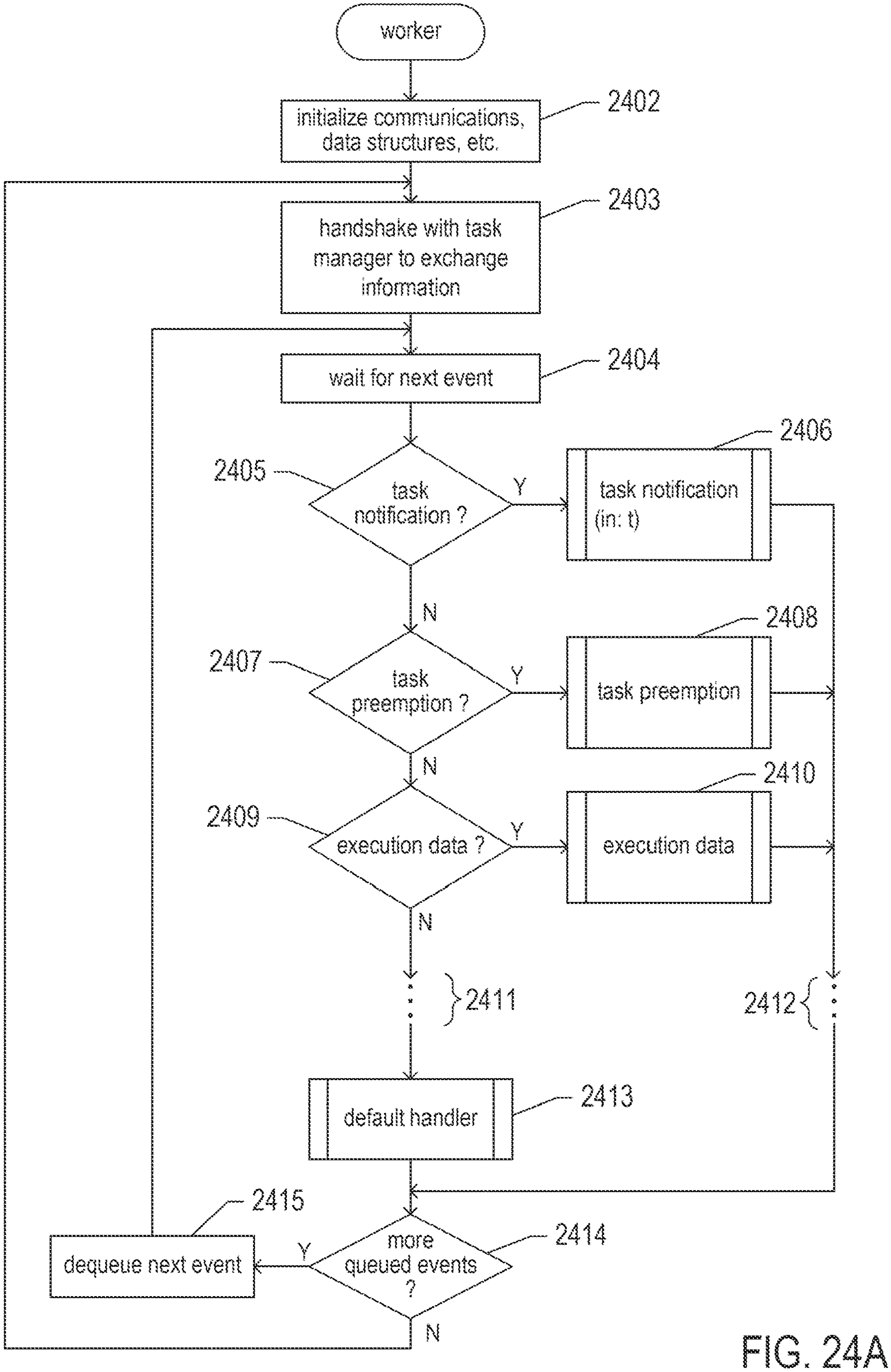
FIGS. 24A-D provide control-flow diagrams for one implementation of an Idem-service worker.
Figure 24B:
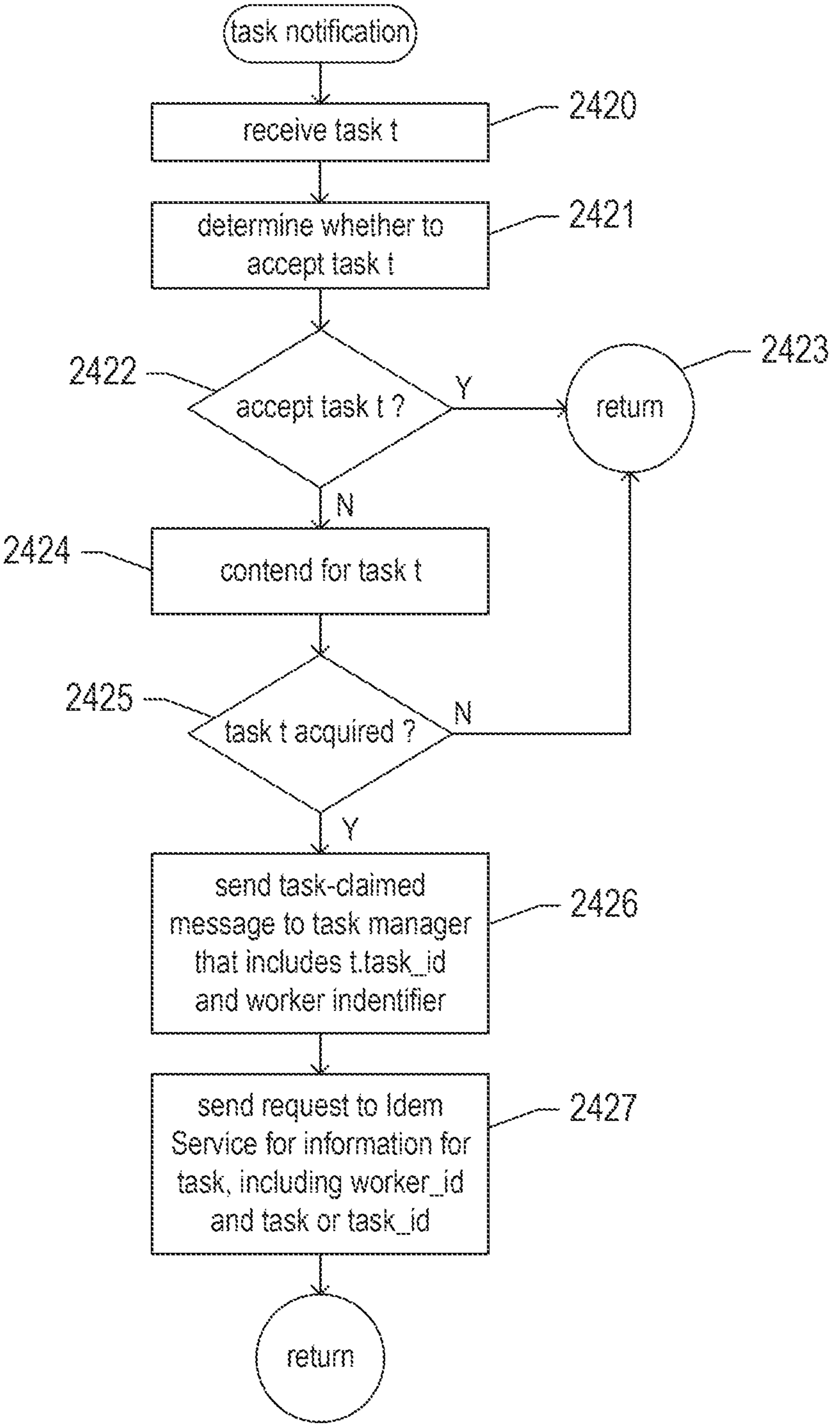

FIG. 24B provides a control-flow diagram for the routine "task notification," called in step 2406 of FIG. 24A. In step 2420, the routine "task notification" receives a task t that is available for execution. In step 2421, the routine "task notification" determines whether or not to accept task t. This determination may consider whether the Idem-service worker has sufficient capabilities and computational resources to execute the task. When a decision is made to reject the task, as determined in step 2422, the routine "task notification" returns in step 2423. Otherwise, in step 2424, the routine "task notification" attempts to claim the task by potentially contending for the task with other Idem-service workers. This may involve directly accessing the Running_Queue via contention-control mechanisms or may involve other types of contention-control mechanisms that ensure that only a single Idem-service worker is able to claim a particular task. When the task is not acquired or claimed, as determined in step 2425, the routine "task notification" returns in step 2423. Otherwise, in step 2426, the routine "task notification" sends a task-claimed message to the task manager that includes the task identifier for the task as well as the Idem-service worker's identifier. In step 2427, the routine "task notification" sends a request to the Idem-service frontend for information needed to execute the task, such as the previous enforced state, SLS data, and/or other information. The request includes the identifier of the Idem-service worker and an identifier for the task.

Figure 24C:
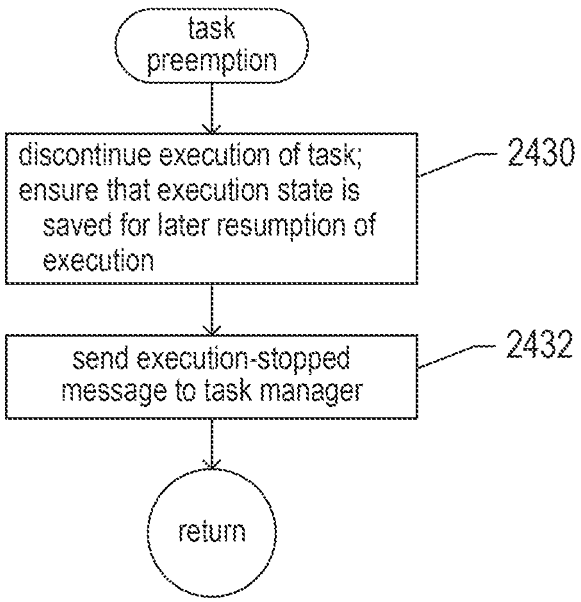

FIG. 24C provides a control-flow diagram for the routine "task preemption" called in step 2408 of FIG. 24A. In step 2430, the routine "task preemption" discontinues execution of the task currently being executed by the Idem-service worker and ensures that the execution state for the discontinued task is saved for later resumption of execution. Then, in step 2432, the routine "task preemption" sends an execution-stopped message to the task manager.

Figure 24D:
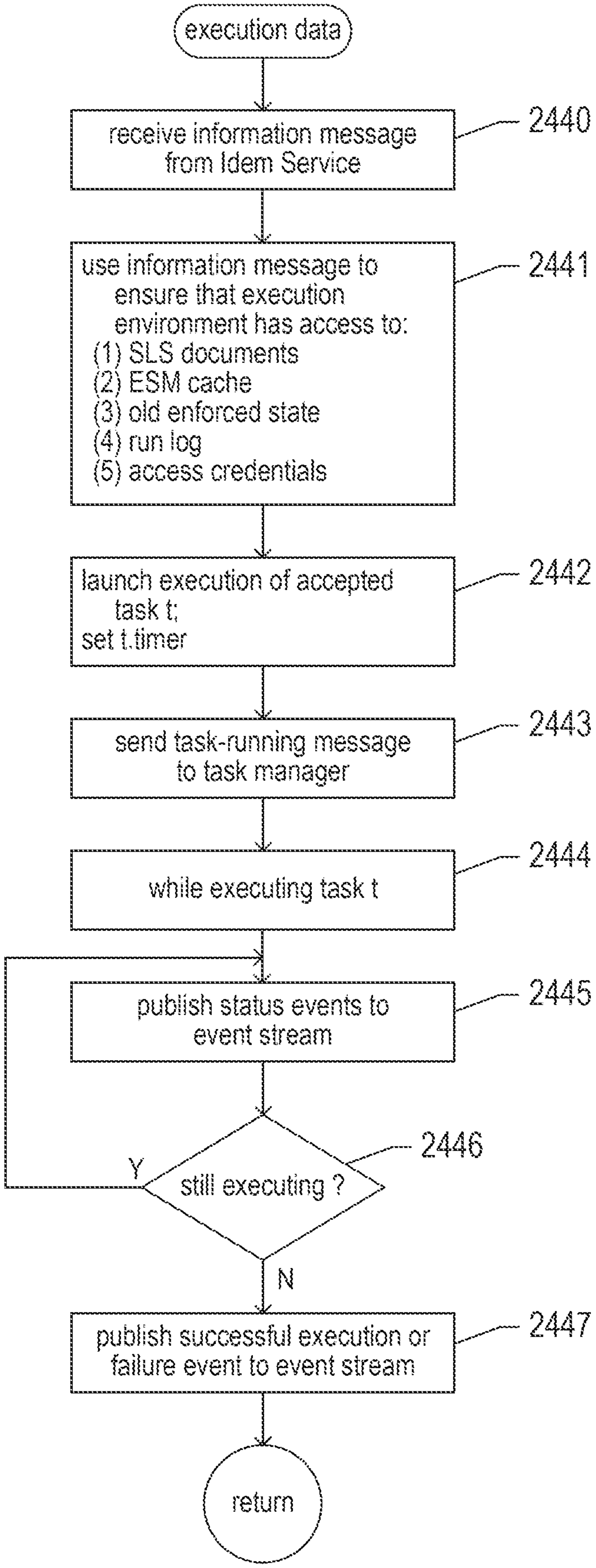

FIG. 24D provides a control-flow diagram for the routine "execution data" called in step 2410 of FIG. 24A. In step 2440, the routine "execution data" receives an information message from the Idem-service frontend. In step 2441, the routine "execution data" uses the contents of the information to ensure that the Idem-service worker execution environment has access to needed information for executing an accepted task, such as SLS documents, the most recently enforced state, a log file, and access credentials. In step 2442, the routine "execution data" launches execution of an accepted task t and sets the timer referenced by the field t.timer. In step 2443, the routine "execution task" sends a task-running message to the task manager. In the while-loop of steps 2444-2446, the Idem-service worker publishes status events with regard to execution of task t to the event stream while the Idem-service worker executes task t. Finally, in step 2447, upon completion of execution of the task, the Idem-service worker publishes a successful-execution event or a failure event to the event stream to notify the Idem-service frontend of task completion or task failure.

Figure 25A:
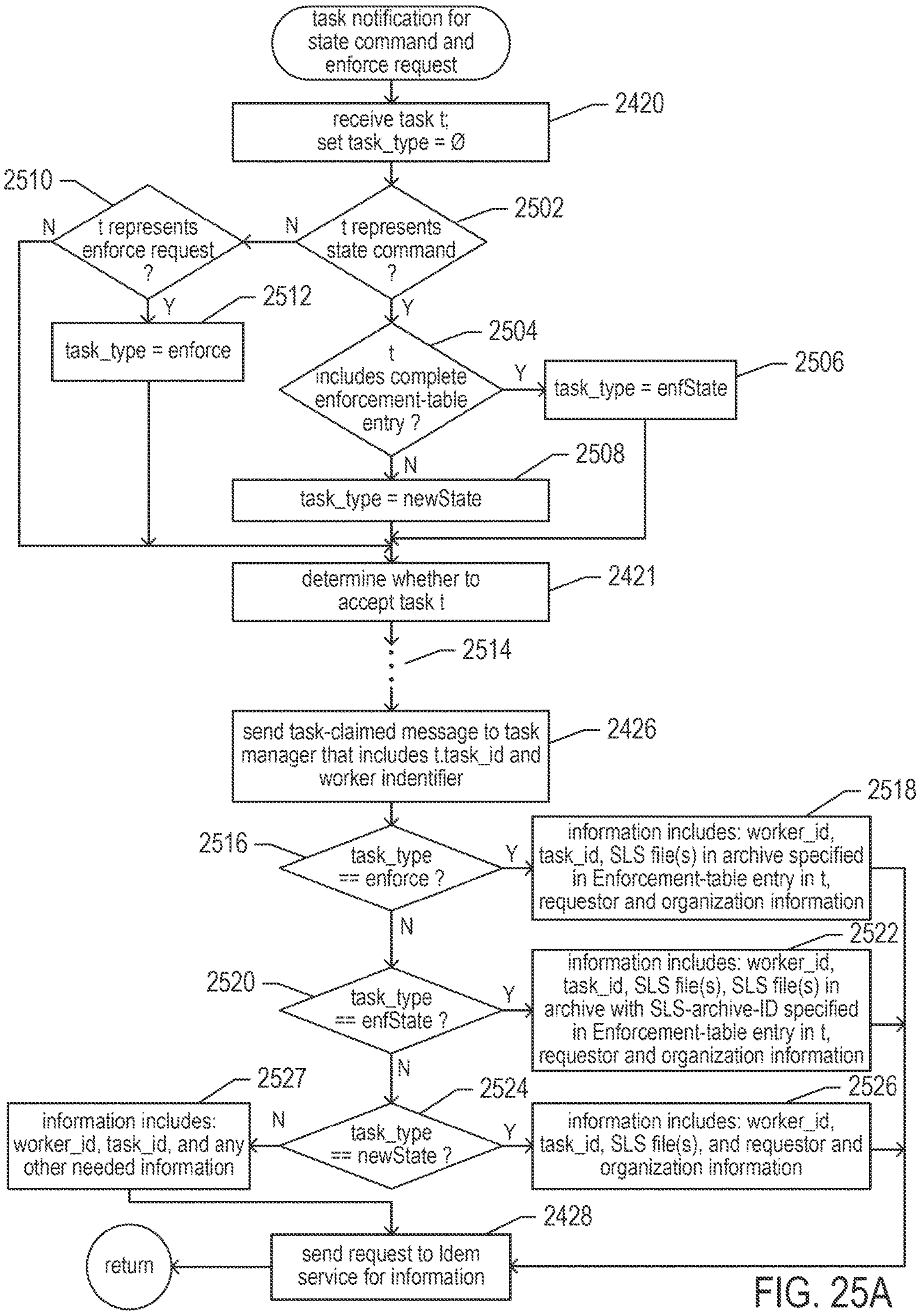
FIGS. 25A-F illustrate additional details regarding worker execution of tasks corresponding to state commands and enforce requests.

FIGS. 25A-F illustrate additional details regarding worker execution of tasks corresponding to state commands and enforce requests. FIG. 25A provides additional details with respect to execution of state commands and enforce requests by the routine "task notification," discussed above with reference to FIG. 24B. The first step 2420 in FIG. 25A is equivalent to step 2420 in FIG. 24B, with the exception that local variable task_type is set to a null value following reception of task t. When received task t represents a state command, as determined in step 2502, and when received task t includes a complete Enforcement-table entry, as determined in step 2504, the local variable task_type is set, in step 2506 to enfState to indicate that the received task t represents a state command that includes one or more SLS data files specifying an update or modification to previously deployed and configured cloud infrastructure. Otherwise, the received task t represents a state command specifying deployment and configuration of new infrastructure and the local variable task_type is accordingly set to newState, in step 2508. When received task t does not represent a state command, as determined in step 2502, but does represent an enforce command, as determined in step 2510, the local variable task_type is set to enforce, in step 2512, to indicate that the received task t represents an enforce request. Steps 2421, ellipsis 2514, and step 2426 are identical to steps 2421-2426 in FIG. 24B. When the local variable task_type is equal to enforce, as determined in step 2516, the information to be requested from the Idem-service front end is set, in step 2518, to include worker_ID, task_ID, SLS file or files in the archive specified in the Enforcement-table entry included in task t, and requester and organization information. Otherwise, when the local variable task_type is equal to enfState, as determined in step 2520, the information to be requested from the Idem-service front end is set, in step 2522, to include worker_ID, task_ID, one or more SLS files provided in association with the received state command, and one or more SLS files in the archive, as specified in the Enforcement-table entry included in the received task 1, and requester an organization information. Otherwise, when the local variable task_type is equal to newState, as determined in step 2524, the information to be requested from the Idem-service front end is set, in step 2526, to include worker_ID, task_ID, the SLS file or files associated with the received state command, and requester an organization information. Otherwise, the information to be requested from the Idem-service front end is set to include worker_ID, task_ID, any other information needed for the particular type of task t that was received by the routine "task notification," in step 2527 Finally, in step 2428, just as in step 2427 in FIG. 24B, a request for the information is sent to the Idem-service front end.

Figure 25B:
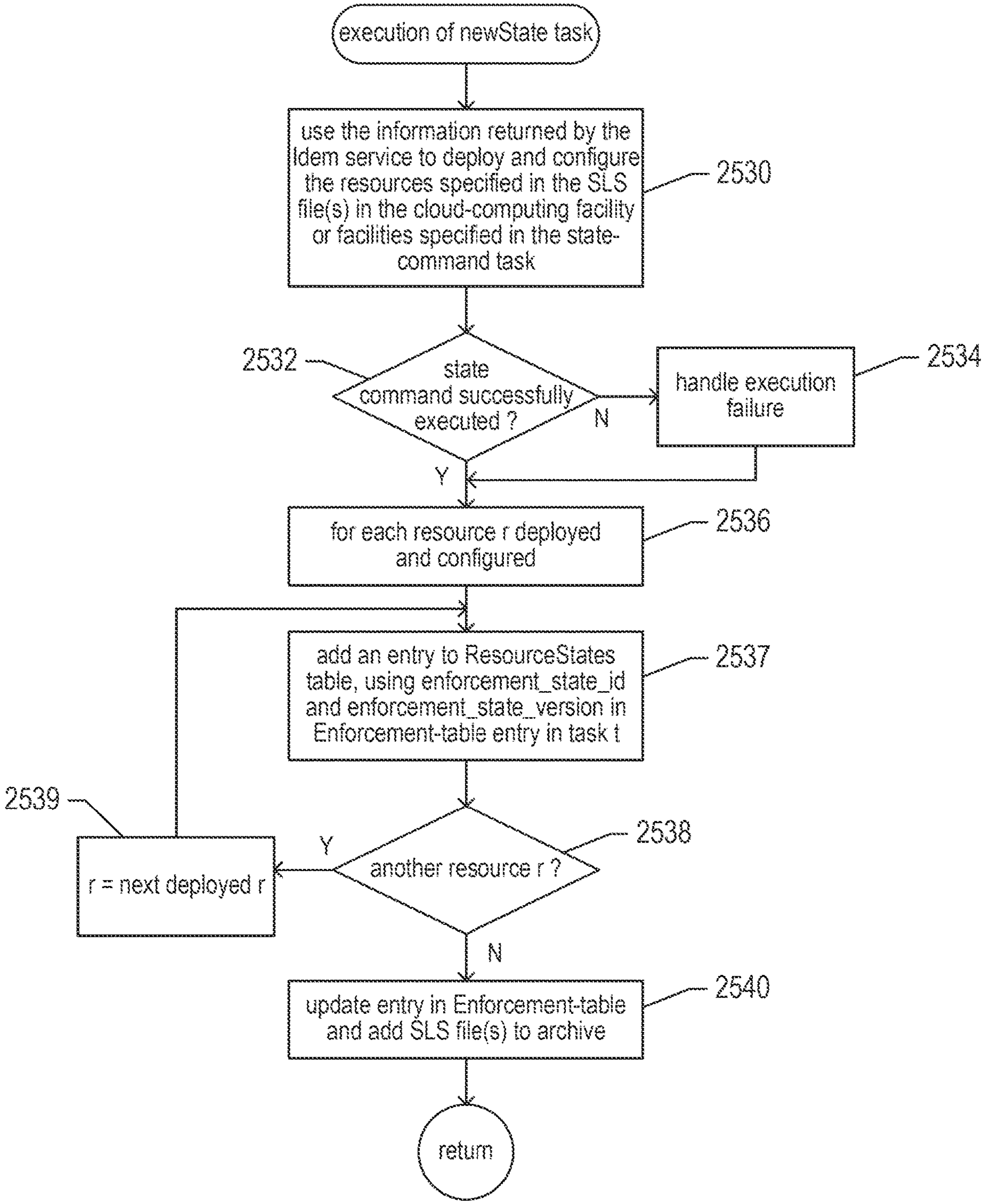

FIG. 25B shows execution details for state commands that represent requests for a new deployment and configuration. These additional details supplement steps 2444-2446 in FIG. 24D. In step 2530, the information returned by the Idem-service front end is used to deploy and configure the resources specified in the SLS file or files associated with the received state command. When the state command is not successfully executed, as determined in step 2532, the execution failure is handled in step 2534. Handling of a state-command execution failure may differ from implementation to implementation. In some cases, any partial deployments and configurations of resources may be backed out and an indication that the state command completely failed is returned. In other cases, partially deployed and configured resources are retained and steps are taken to attempt to complete the full deployment and configuration of resources specified in the one or more SLS files associated with the state command. In the for-loop of steps 2536-2539, each deployed and configured resource r is considered. In step 2537, an entry for the currently considered resource is added to the Resource States table, using the enforced_state_ID and enforced_state_version values in the Enforcement-table entry contained in task t. Following the completion of the for-loop of steps 2536-2539, the incomplete new entry in the Enforcement table added for the newly deployed and configured infrastructure is updated, in step 2540, to include values for the fields that were not initialized when the entry in the Enforcement table was added, in step 2250 of FIG. 22C. Also in step 2540, the SLS file or files referenced by the state command are added to the archive or the worker requests them to be added to the archive by the Idem-service front end.

Figure 25C:
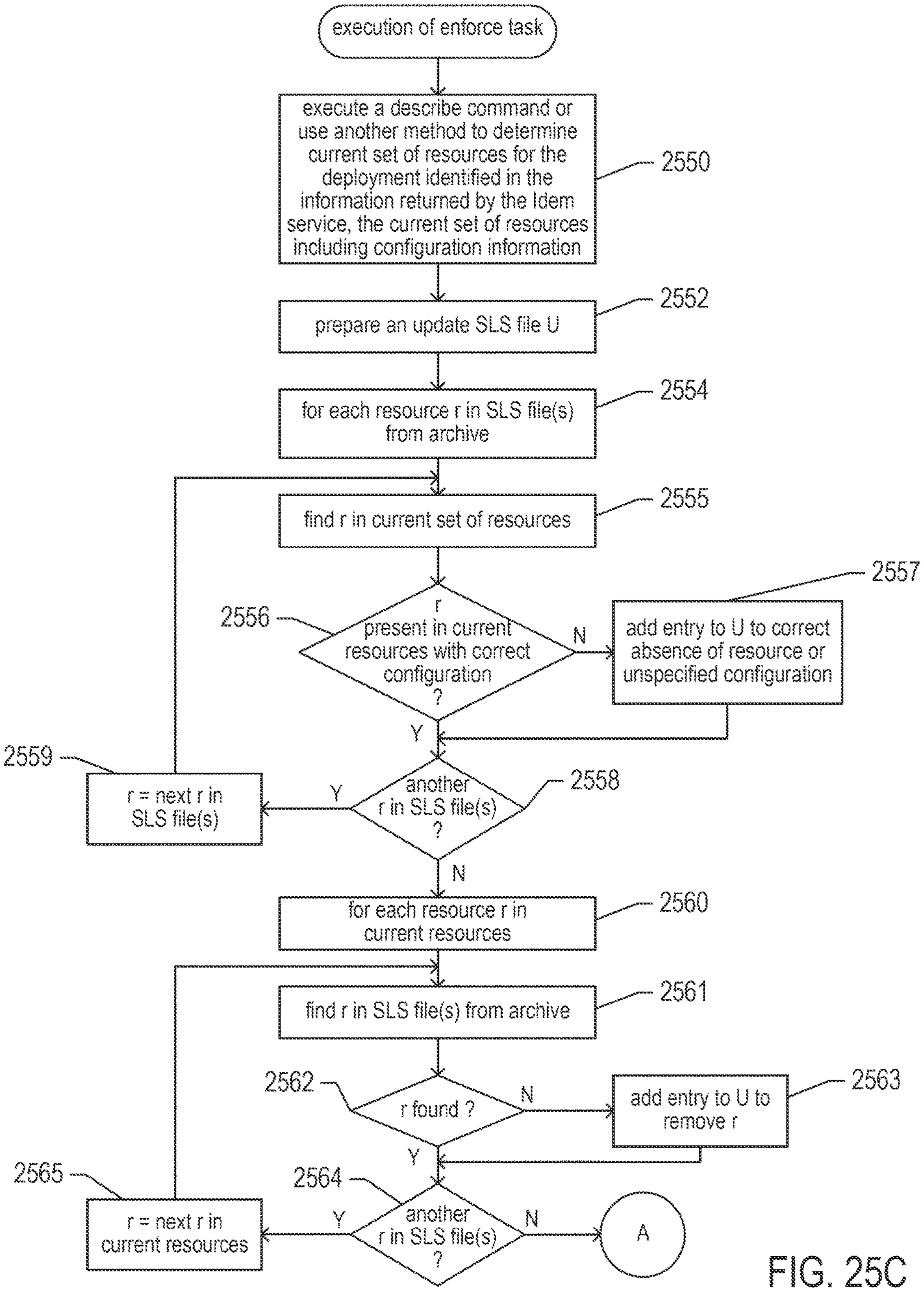
Figure 25D:
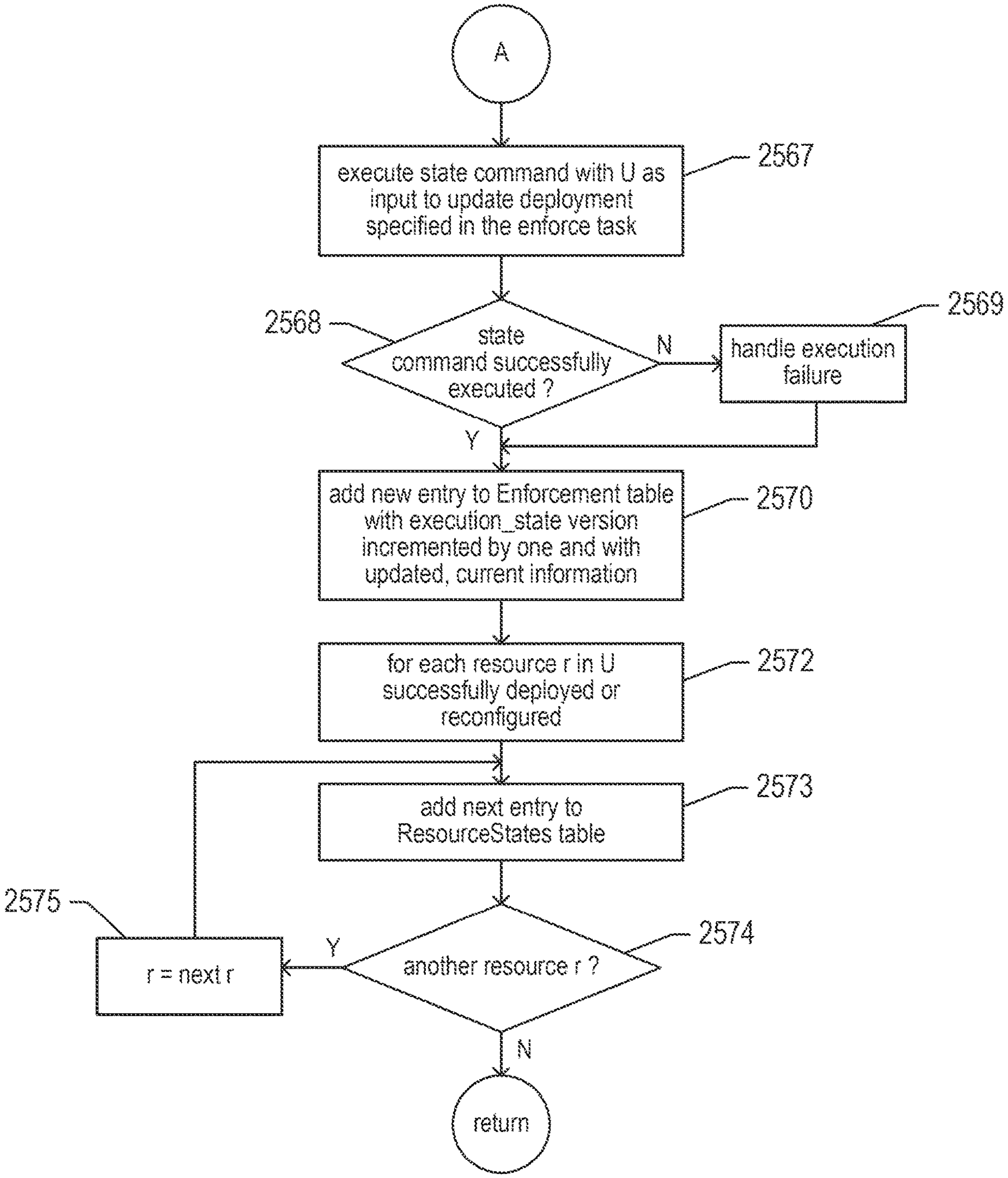

FIGS. 25C-D show additional execution details for enforce requests. These additional details supplement steps 2444-2446 in FIG. 24D. In step 2550, a describe command is executed or another such method is carried out for determining the current set of resources, and configuration information for the occurrence of the resources, for the infrastructure identified in the information returned by the Idem. In step 2552, an update SLS file U is created. In the for-loop of steps 2554-2559, each resource r in the SLS file or files obtained from the archive is considered. In step 2555, an attempt is made to find r in the current set of resources obtained in step 2550. When resource r is not present in the current resources or is present in the current resources but has a configuration that is not equivalent to that specified in the SLS file or files obtained from the archive, as determined in step 2556, an entry is added to the update SLS file U to correct the absence of the resource in the current resources or to correct the configuration of the resource in the current resources, in step 2557. Following execution of the for-loop of steps 2554-2559, a second for-loop of steps 2560-2565 is executed. In the second for-loop, each resource r in the set of current resources determined in step 2550 is considered. In step 2561, an attempt is made to find the currently considered resource r in the SLS file or files obtained from the archive. When r is found, as determined in step 2562, an entry is added to the update SLS file U to remove r, in step 2563. Turning to FIG. 25D, the update SLS file U is executed, in step 2567, in order to update the deployed infrastructure to correct configurations of resources that have strayed from the specified configurations, to remove resources that are not specified or that have been removed via update operations following the initial deployment and configuration of the infrastructure, and to add resources that have been removed from the infrastructure. When the execution of the update SLS file U is unsuccessful, as determined in step 2568, the unsuccessful execution is handled in step 2569. An unsuccessful execution may be handled in different ways in different implementations and/or according to different controlling parameters. In some cases, execution of failed operations is retried while, in other cases, more drastic corrective measures are taken. In step 2570, a new entry is added to the Enforcement table to represent the results of execution of the enforce task, including an execution_state_version value greater than the preceding execution_state_version value. In the for-loop of steps 2572-2575, entries are added to the Resource States table for each of the resources updated by execution of the enforce task.

Figure 25E:
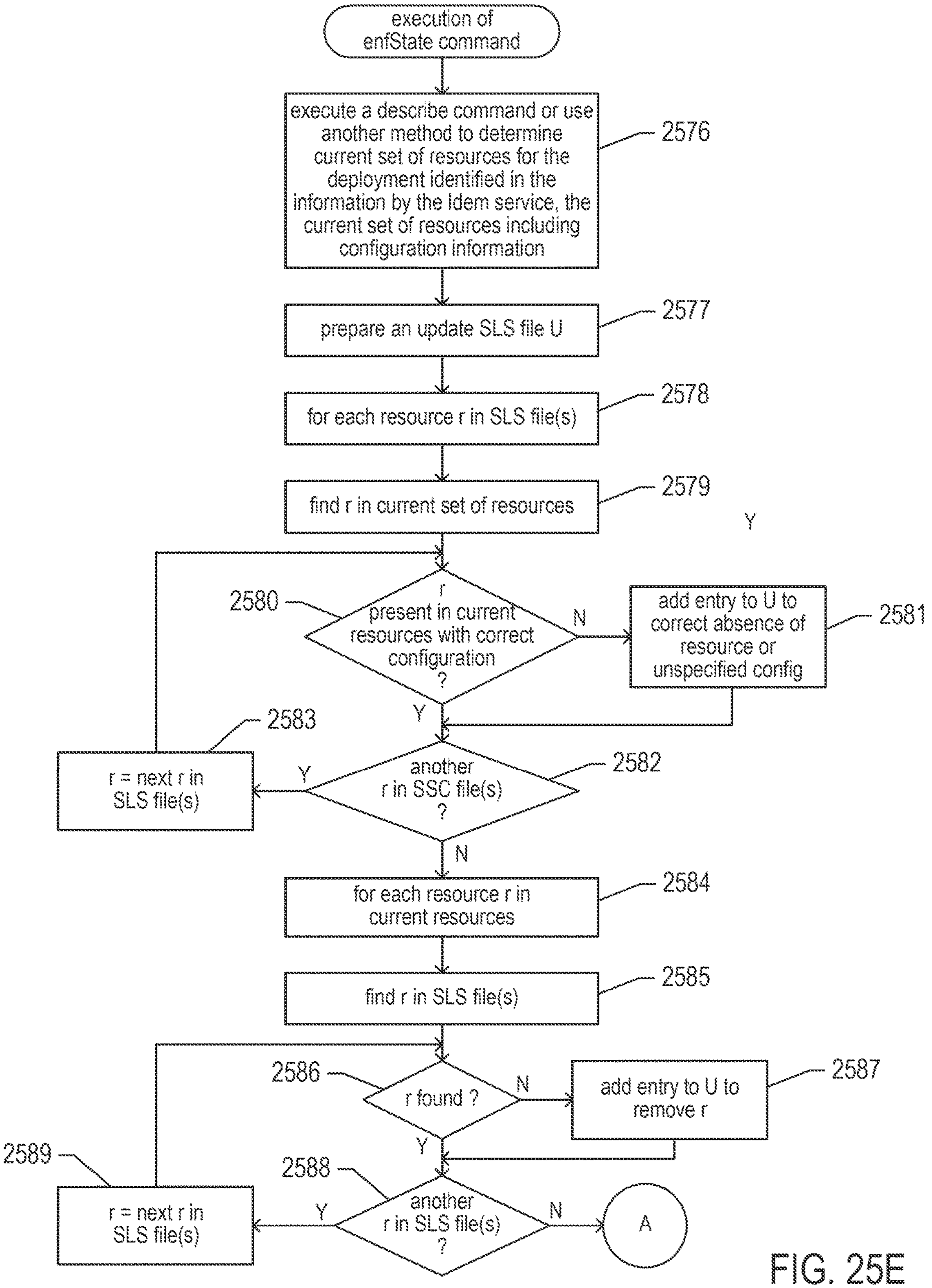
Figure 25F:
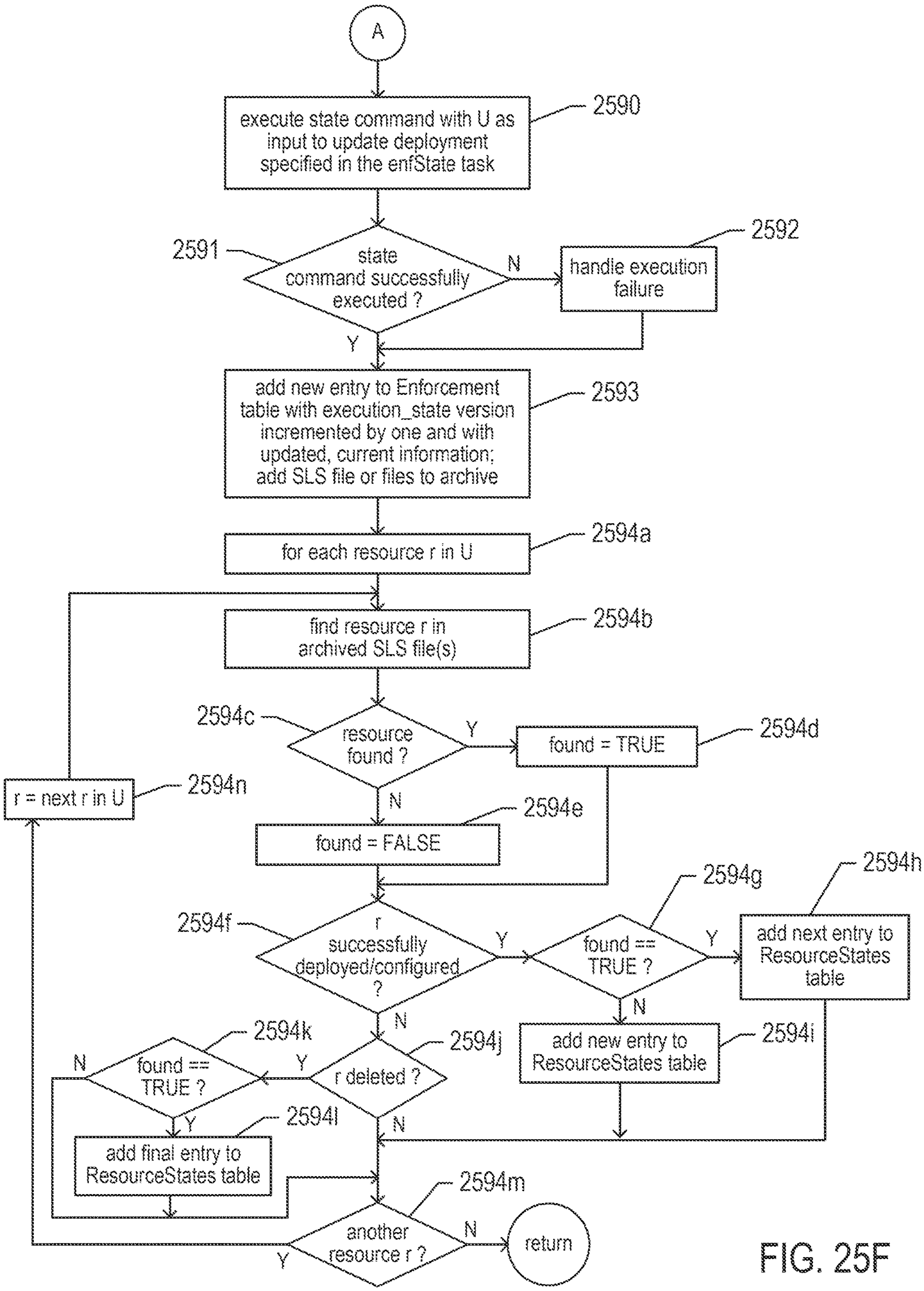

FIGS. 25E-F show additional execution details for state commands that update or modify already deployed and configured infrastructure. These additional details supplement steps 2444-2446 in FIG. 24D. In step 2576, a describe command is executed or another such method is carried out for determining the current set of resources, and configuration information for the occurrence of the resources, for the infrastructure identified in the information returned by the Idem-service front end. In step 2577, an update SLS file U is created. In the for-loop of steps 2578-2583, each resource r in the SLS file or files provided by the state command is considered. In step 2579, an attempt is made to find r in the current set of resources obtained in step 2576. When resource r is not present in the current resources or is present in the current resources, but has a configuration that is not equivalent to that specified in the SLS file or files obtained from the archive, as determined in step 2580, an entry is added to the update SLS file U to correct the absence of the resource in the current resources or to correct the configuration of the resource in the current resources, in step 2581. Following execution of the for-loop of steps 2578-2583, a second for-loop of steps 2584-2589 is executed. In the second for-loop, each resource r in the set of current resources determined in step 2576 is considered. In step 2585, an attempt is made to find the currently considered resource r in the SLS file or files provided by the state command. When r is found, as determined in step 2586, an entry is added to the update SLS file U to remove r, in step 2587. Turning to FIG. 25F, the update SLS file U is executed, in step 2590, in order to update the deployed infrastructure to correct configurations of resources that have strayed from the specified configurations, to remove resources that are not specified or that have been removed via update operations following the initial deployment and configuration of the infrastructure, and to add resources that have been removed from the infrastructure. When the execution of the update SLS file U is unsuccessful, as determined in step 2591, the unsuccessful execution is handled in step 2592. An unsuccessful execution may be handled in different ways in different implementations and/or according to different controlling parameters. In some cases, execution of failed operations is retried while, in other cases, more drastic corrective measures are taken. In step 2593, a new entry is added to the Enforcement table to represent the results of execution of the state command, including an execution_state_version value greater than the preceding execution_state_version value. Also in step 2593, the SLS file or files referenced by the state command are added to the archive or the worker requests them to be added to the archive by the Idem-service front end. In the for-loop of steps 2594*a*-2594*n*, entries are added to the Resource States table for each of the resources updated by execution of the state command and for each resource added or deleted by execution of the state command. In step 2594*b*, an attempt is made to find the currently considered resource r in the archived SLS file or files. The local variable found is set to TRUE or FALSE depending on whether the resource is found in steps 2494*c*-2494*c*. When the currently considered resource r has been successfully deployed or reconfigured, as determined in step 2594*f*, then, when local variable found is TRUE, as determined in step 2594*g*, a next entry for the resource is added to the Resource States table, in step 2494*h* and, otherwise, a new entry is added to the Resource States table in step 2594*i*. When the currently considered resource r was deleted, as determined in step 2594*j*, and when local variable found is TRUE, as determined in step 2594*k*, a final entry for the resource is added to the Resource States table, in step 25941.

The present invention has been described in terms of particular embodiments, it is not intended that the invention be limited to these embodiments. Modifications within the spirit of the invention will be apparent to those skilled in the art. For example, any of many different implementations of the currently disclosed methods and systems can be obtained by varying various design and implementation parameters, including modular organization, control structures, data structures, hardware, operating system, and virtualization layers, automated orchestration systems, virtualization-aggregation systems, and other such design and implementation parameters. The Idem service may be alternatively implemented with a greater number of components, fewer components, and/or different components than those discussed above in the disclosed implementation. The operations carried out by the Idem service may be alternatively distributed among the components in various alternative implementations.

What is claimed is:

1. An infrastructure-as-code cloud-infrastructure-management service or system comprising:

one or more computer systems, each containing one or more processors, one or more memories, and one or more data-storage devices; and processor instructions, stored in one or more of the one or more memories that, when executed by one or more of the one or more processors, control the one or more computer systems to implement the infrastructure-as-code cloud-infrastructure-management service or system, the infrastructure-as-code cloud-infrastructure-management service or system including a frontend having a management interface that receives cloud-infrastructure-management commands and requests, including idempotent state commands and enforce requests, a database that stores information related to managed cloud infrastructure, received cloud-infrastructure-management requests and commands, and enforced-state management, an archive that stores structured-layered-state data files, and a frontend service that throttles the cloud-infrastructure-management commands and generates tasks corresponding to the cloud-infrastructure-management commands and requests received through the management interface, prioritizes tasks, implements forced-state management, ingests events, and stores events, and a task manager which receives tasks from the frontend and coordinates multiple stages of task execution using multiple task queues, including task preemption, and multiple workers that each provides a worker interface and that each executes tasks, including execution of tasks that result in generation of enforced_state_ID values and enforced_state_version values.

2. The infrastructure-as-code cloud-infrastructure-management service or system of claim 1 wherein an idempotent state command includes structured-layered-state data or a reference to structured-layered-state data;

wherein an idempotent state command that is executed to deploy and configure new infrastructure does not include an enforced_state_ID value;

wherein an idempotent state command that is executed to update or modify already existing infrastructure includes an enforced_state_ID value; and wherein an enforce request includes an enforced_state_ID value.

3. The infrastructure-as-code cloud-infrastructure-management service or system of claim 2 wherein an idempotent state command directs the infrastructure-as-code cloud-infrastructure-management service or system to ensure that cloud infrastructure within a cloud-computing facility described by the structured-layered-state data included in the idempotent state command is deployed within the cloud-computing facility and configured according to the structured-layered-state data; and wherein an enforce request directs the infrastructure-as-code cloud-infrastructure-management service or system to ensure that cloud infrastructure within a cloud-computing facility described by structured-layered-state data stored in the archive is deployed within the cloud-computing facility and configured according to the structured-layered-state data stored in the archive.

4. The infrastructure-as-code cloud-infrastructure-management service or system of claim 3 wherein the infrastructure-as-code cloud-infrastructure-management service or system stores enforced-state-management information in the database, including:

Enforcement entries or records that each includes an enforced_state_ID value, and enforced_state_version value, an organization identifier, an indication of archived structured-layered-state information, and a timestamp, and Resource-States entries or records that each includes a resource identifier, an enforced_state_ID value, an enforced_state_version value, previous and current resource states, and a timestamp.

5. The infrastructure-as-code cloud-infrastructure-management service or system of claim 4 wherein, after deploying and configuring new infrastructure, an idempotent state command that is executed to deploy and configure new infrastructure generates a new enforced_state_ID;

generates an enforced_state_version with an initial-version value; and adds a new Enforcement entry to the enforced-state-management information stored in the database containing the generated enforced_state_ID and generated enforced_state_version; and adds the structured-layered-state data contained in the idempotent state command to the archive.

6. The infrastructure-as-code cloud-infrastructure-management service or system of claim 5 further including adding new Resource-States entries to the enforced-state-management information stored in the database for each resource specified in the structured-layered-state data contained in the idempotent state command.

7. The infrastructure-as-code cloud-infrastructure-management service or system of claim 4 wherein, after updating or modifying already existing infrastructure, an idempotent state command that is executed to update or modify already existing infrastructure generates an enforced_state_version with a value greater than the highest-valued enforced_state_version in an Enforcement entry containing the enforced_state_ID contained in the idempotent state command;

generates an enforced_state_version with a value greater than the highest-valued enforced_state_version in an Enforcement entry containing the enforced_state_ID contained in the idempotent state command;

adds a new Enforcement entry to the enforced-state-management information stored in the database; and adds the structured-layered-state data contained in the idempotent state command to the archive.

8. The infrastructure-as-code cloud-infrastructure-management service or system of claim 7 further including adding new Resource-States entries to the enforced-state-management information stored in the database for each resource in the existing infrastructure added, deleted, or reconfigured by the idempotent state command.

9. The infrastructure-as-code cloud-infrastructure-management service or system of claim 4 wherein, after ensuring that cloud infrastructure within a cloud-computing facility described by structured-layered-state data stored in the archive is deployed within the cloud-computing facility and configured according to the structured-layered-state data stored in the archive, an enforce request generates an enforced_state_version with a value greater than the highest-valued enforced_state_version in an Enforcement entry containing the enforced_state_ID contained in the idempotent state command;

generates an enforced_state_version with a value greater than the highest-valued enforced_state_version in an Enforcement entry containing the enforced_state_ID contained in the idempotent state command; and adds a new Enforcement entry to the enforced-state-management information stored in the database.

10. The infrastructure-as-code cloud-infrastructure-management service or system of claim 9 further including adding new Resource-States entries to the enforced-state-management information stored in the database for each resource of the infrastructure added, deleted, or reconfigured by the enforce request.

11. A method that facilitates enforced-state management carried out by an infrastructure-as-code cloud-infrastructure-management service or system, the method comprising:

providing an archive that stores structured-layered-state data files;

storing enforced-state-management information in a database, the enforced-state-management information including Enforcement entries or records that each includes an enforced_state_ID value, and enforced_state_version value, an organization identifier, an indication of archived structured-layered-state information, and a timestamp, and Resource-States entries or records that each includes a resource identifier, an enforced_state_ID value, an enforced_state_version value, previous and current resource states, and a timestamp; and adding Enforcement entries and Resource-States entries to the database during execution of idempotent state commands and enforce requests.

12. The method of claim 11 wherein the infrastructure-as-code cloud-infrastructure-management service or system comprises:

one or more computer systems, each containing one or more processors, one or more memories, and one or more data-storage devices; and processor instructions, stored in one or more of the one or more memories that, when executed by one or more of the one or more processors, control the one or more computer systems to implement the infrastructure-as-code cloud-infrastructure-management service or system, the infrastructure-as-code cloud-infrastructure-management service or system including a frontend having a management interface that receives cloud-infrastructure-management commands and requests, including idempotent state commands and enforce requests, the database that stores information related to managed cloud infrastructure, received cloud-infrastructure-management requests and commands, and enforced-state management, the archive that stores structured-layered-state data files, and a frontend service that throttles the cloud-infrastructure-management commands and requests received through the management interface, generates tasks corresponding to the cloud-infrastructure-management commands and requests received through the management interface, prioritizes tasks, implements forced-state management, ingests events, and stores events, and a task manager which receives tasks from the frontend and coordinates multiple stages of task execution using multiple task queues, including task preemption, and multiple workers that each provides a worker interface and that each executes tasks.

13. The method of claim 11 wherein an idempotent state command includes structured-layered-state data or a reference to structured-layered-state data;

wherein an idempotent state command that is executed to deploy and configure new infrastructure does not include an enforced_state_ID value;

wherein an idempotent state command that is executed to update or modify already existing infrastructure includes an enforced_state_ID value; and wherein an enforce request includes an enforced_state_ID value.

14. The method of claim 13 wherein an idempotent state command directs the infrastructure-as-code cloud-infrastructure-management service or system to ensure that cloud infrastructure within a cloud-computing facility described by the structured-layered-state data included in the idempotent state command is deployed within the cloud-computing facility and configured according to the structured-layered-state data; and wherein an enforce request directs the infrastructure-as-code cloud-infrastructure-management service or system to ensure that cloud infrastructure within a cloud-computing facility described by structured-layered-state data stored in the archive is deployed within the cloud-computing facility and configured according to the structured-layered-state data stored in the archive.

15. The method of claim 13 wherein, after deploying and configuring new infrastructure, an idempotent state command that is executed to deploy and configure new infrastructure generates a new enforced_state_ID;

generates an enforced_state_version with an initial-version value; and adds a new Enforcement entry to the enforced-state-management information stored in database containing the generated enforced_state_ID and generated the enforced_state_version; and adds the structured-layered-state data contained in the idempotent state command to the archive.

16. The method of claim 15 wherein further including adding new Resource-States entries to the to the enforced-state-management information stored in the database for each resource specified in the structured-layered-state data contained in the idempotent state command.

17. The method of claim 13 wherein, after updating or modifying already existing infrastructure, an idempotent state command that is executed to update or modify already existing infrastructure generates an enforced_state_version with a value greater than the highest-valued enforced_state_version in an Enforcement entry containing the enforced_state_ID contained in the idempotent state command;

generates an enforced_state_version with a value greater than the highest-valued enforced_state_version in an Enforcement entry containing the enforced_state_ID contained in the idempotent state command;

adds a new Enforcement entry to the enforced-state-management information stored in the database; and adds the structured-layered-state data contained in the idempotent state command to the archive.

18. The method of claim 17 further including adding new Resource-States entries to the enforced-state-management information stored in the database for each resource in the existing infrastructure added, deleted, or reconfigured by the idempotent state command.

19. The method of claim 13 wherein, after ensuring that cloud infrastructure within a cloud-computing facility described by structured-layered-state data stored in the archive is deployed within the cloud-computing facility and configured according to the structured-layered-state data stored in the archive, an enforce request generates an enforced_state_version with a value greater than the highest-valued enforced_state_version in an Enforcement entry containing the enforced_state_ID contained in the idempotent state command;

generates an enforced_state_version with a value greater than the highest-valued enforced_state_version in an Enforcement entry containing the enforced_state_ID contained in the idempotent state command; and adds a new Enforcement entry to the enforced-state-management information stored in the database.

20. The method of claim 19 further including adding new Resource-States entries to the enforced-state-management information stored in the database for each resource of the infrastructure added, deleted, or reconfigured by the enforce request.

21. A physical data-storage device encoded with processor instructions that, when executed by one or more processors within one or more computer systems, each containing one or more processors, one or more memories, and one or more data-storage devices, control the one or more computer systems to implement an infrastructure-as-code cloud-infrastructure-management service or system, the infrastructure-as-code cloud-infrastructure-management service or system including a frontend having a management interface that receives cloud-infrastructure-management commands and requests, including idempotent state commands and enforce requests, a database that stores information related to managed cloud infrastructure, received cloud-infrastructure-management requests and commands, and enforced-state management, an archive that stores structured-layered-state data files, and a frontend service that throttles the cloud-infrastructure-management commands and requests received through the management interface, generates tasks corresponding to the cloud-infrastructure-management commands and requests received through the management interface, prioritizes tasks, implements forced-state management, ingests events, and stores events, and a task manager which receives tasks from the frontend and coordinates multiple stages of task execution using multiple task queues, including task preemption, and multiple workers that each provides a worker interface and that each executes tasks, including execution of tasks that result in generation of enforced_state_ID values and enforced_state_version values.

* * * * *